United States Patent
Katsuyama et al.

(10) Patent No.: US 12,148,031 B2
(45) Date of Patent: Nov. 19, 2024

(54) SYSTEM AND METHOD FOR TCP-TO-MULTICAST (T2M) COMMUNICATIONS AND RELATED NETWORK ARCHITECTURE

(71) Applicant: IEX Group, Inc., New York, NY (US)

(72) Inventors: Bradley Katsuyama, Darien, CT (US); John Schwall, Staten Island, NY (US); Robert Park, New York, NY (US); Ronan Ryan, Morristown, NJ (US); Benjamin Aisen, New York, NY (US); Daniel Aisen, New York, NY (US); Donald Bollerman, Yonkers, NY (US); Francis Chung, New York, NY (US); Stanley Feldman, New York, NY (US); Tara McKee, New York, NY (US); Bilie Zhao, East Hanover, NJ (US); James Michael Cape, San Francisco, CA (US); David Lauer, Collingswood, NJ (US); Allen Zhang, Princeton, NJ (US); Blair Livingston, Toronto (CA)

(73) Assignee: IEX Group, Inc., New York, NY (US)

( * ) Notice: Subject to any disclaimer, the term of this patent is extended or adjusted under 35 U.S.C. 154(b) by 680 days.

(21) Appl. No.: 16/672,082

(22) Filed: Nov. 1, 2019

(65) Prior Publication Data
US 2020/0134721 A1    Apr. 30, 2020

Related U.S. Application Data

(63) Continuation of application No. 14/322,996, filed on Jul. 3, 2014, now Pat. No. 10,467,694, which is a
(Continued)

(51) Int. Cl.
G06Q 40/00    (2023.01)
G06Q 40/04    (2012.01)
H04L 47/12    (2022.01)

(52) U.S. Cl.
CPC ............ *G06Q 40/04* (2013.01); *H04L 47/12* (2013.01)

(58) Field of Classification Search
CPC ................................ G06Q 40/04; H04L 47/12
See application file for complete search history.

(56) References Cited

U.S. PATENT DOCUMENTS 4,736,294 A    4/1988 Gill et al.
5,339,392 A    8/1994 Risberg et al.
(Continued)

FOREIGN PATENT DOCUMENTS

AU    2010330629 A1    2/2012
AU    2016200212 A1    2/2016
(Continued)

OTHER PUBLICATIONS

Maxemchuk et al., "An Internet Multicast System for the Stock Market," ARXIV.org, 2000 (Year: 2000).*
(Continued)

*Primary Examiner* — Abhishek Vyas
*Assistant Examiner* — William B. Bunker
(74) *Attorney, Agent, or Firm* — Goodwin Procter LLP

(57) ABSTRACT

Embodiments of the present invention provide a novel system and method for TCP-to-multicast (T2M) communications. The T2M techniques may allow a client to make a single TCP connection that then fans out into communications with multiple back-end resources. Such one-to-many communications may be invisible to the client but can achieve many practical benefits.

21 Claims, 25 Drawing Sheets

Related U.S. Application Data continuation of application No. PCT/US2013/059558, filed on Sep. 12, 2013.

(60) Provisional application No. 61/876,200, filed on Sep. 10, 2013, provisional application No. 61/758,508, filed on Jan. 30, 2013, provisional application No. 61/753,857, filed on Jan. 17, 2013, provisional application No. 61/700,094, filed on Sep. 12, 2012.

(56) References Cited

U.S. PATENT DOCUMENTS

| | | |
|---|---|---|
| 6,278,982 B1 | 8/2001 | Korhammer et al. |
| 6,567,815 B1 | 5/2003 | Rubin et al. |
| 6,618,707 B1 | 9/2003 | Gary |
| 6,681,232 B1 | 1/2004 | Sistanizadeh et al. |
| 6,718,361 B1* | 4/2004 | Basani ............... H04L 67/1095 |
| | | 709/201 |
| 6,970,924 B1 | 11/2005 | Chu et al. |
| 6,996,540 B1 | 2/2006 | May |
| 7,552,077 B1 | 6/2009 | Schluetter et al. |
| 7,752,115 B2 | 7/2010 | Schluetter |
| 7,873,561 B1 | 1/2011 | Adcock et al. |
| 8,090,637 B2 | 1/2012 | Schluetter et al. |
| 8,112,347 B2 | 2/2012 | Farrell et al. |
| 8,301,547 B2 | 10/2012 | Sulavka |
| 8,306,901 B1 | 11/2012 | Gastineau et al. |
| 8,315,940 B2 | 11/2012 | Winbom et al. |
| 8,489,747 B2 | 7/2013 | Aisen et al. |
| 8,589,260 B2 | 11/2013 | Chambers et al. |
| 8,768,805 B2 | 7/2014 | Taylor et al. |
| 8,891,513 B1* | 11/2014 | Huang ................ H04L 49/253 |
| | | 370/352 |
| 8,984,137 B2 | 3/2015 | Aisen et al. |
| 9,082,119 B2 | 7/2015 | Ortiz et al. |
| 9,727,602 B2 | 8/2017 | Djurdjevic et al. |
| 9,922,436 B2 | 3/2018 | Iannaccone et al. |
| 9,928,548 B2 | 3/2018 | Schmidt et al. |
| 9,940,670 B2 | 4/2018 | Aisen et al. |
| 9,959,572 B2 | 5/2018 | Iannaccone et al. |
| 10,127,612 B2 | 11/2018 | Mannix |
| 10,439,833 B1* | 10/2019 | Lebedev ............... H04L 49/201 |
| 11,436,872 B2* | 9/2022 | Duarte Gelvez ..... H04L 67/125 |
| 2002/0023048 A1 | 2/2002 | Buhannic et al. |
| 2002/0120837 A1* | 8/2002 | Maxemchuk .......... G06Q 40/04 |
| | | 713/153 |
| 2002/0156721 A1 | 10/2002 | Lyback et al. |
| 2002/0174130 A1 | 11/2002 | Wagner |
| 2003/0177086 A1 | 9/2003 | Gomber et al. |
| 2003/0231741 A1 | 12/2003 | Rancu et al. |
| 2004/0024689 A1 | 2/2004 | Zhou et al. |
| 2004/0059666 A1 | 3/2004 | Waelbroeck et al. |
| 2004/0111523 A1* | 6/2004 | Hall ..................... H04L 69/163 |
| | | 709/230 |
| 2004/0133590 A1 | 7/2004 | Henderson et al. |
| 2004/0210511 A1 | 10/2004 | Waelbroeck et al. |
| 2005/0074033 A1* | 4/2005 | Chauveau ............. G06Q 40/04 |
| | | 370/503 |
| 2005/0075963 A1 | 4/2005 | Balabon |
| 2005/0131802 A1 | 6/2005 | Glodjo |
| 2005/0137961 A1 | 6/2005 | Brann et al. |
| 2005/0234805 A1 | 10/2005 | Robertson et al. |
| 2006/0106713 A1 | 5/2006 | Tilly et al. |
| 2006/0259397 A1 | 11/2006 | Schluetter |
| 2006/0259417 A1 | 11/2006 | Marynowski et al. |
| 2007/0025351 A1 | 2/2007 | Cohen |
| 2007/0070914 A1 | 3/2007 | Abigail |
| 2007/0198397 A1 | 8/2007 | Mcginley et al. |
| 2007/0265043 A1 | 11/2007 | Wang et al. |
| 2008/0172321 A1 | 7/2008 | Bartko et al. |
| 2009/0024498 A1 | 1/2009 | Berezuk et al. |
| 2009/0089199 A1 | 4/2009 | Waelbroeck et al. |
| 2009/0099952 A1 | 4/2009 | Wahlberg |
| 2009/0132412 A1 | 5/2009 | Cleary Neubert et al. |
| 2009/0157452 A1 | 6/2009 | Arora et al. |
| 2009/0182683 A1 | 7/2009 | Taylor et al. |
| 2010/0088216 A1 | 4/2010 | Czupek et al. |
| 2010/0094743 A1 | 4/2010 | Robertson et al. |
| 2010/0174634 A1 | 7/2010 | Bartko et al. |
| 2010/0174770 A1 | 7/2010 | Pandya |
| 2010/0211520 A1* | 8/2010 | Oddie .................... G06Q 40/04 |
| | | 705/36 R |
| 2010/0306096 A1* | 12/2010 | Gorman ................ G06Q 40/04 |
| | | 705/37 |
| 2010/0318495 A1 | 12/2010 | Yan et al. |
| 2010/0332650 A1* | 12/2010 | Aisen .................. H04L 43/0864 |
| | | 709/224 |
| 2011/0119176 A1 | 5/2011 | Hanson et al. |
| 2011/0178913 A1 | 7/2011 | Smith |
| 2011/0231298 A1 | 9/2011 | Adcock et al. |
| 2011/0313907 A1 | 12/2011 | Schluetter et al. |
| 2012/0022999 A1 | 1/2012 | Bartko et al. |
| 2012/0042080 A1 | 2/2012 | Aisen et al. |
| 2012/0095893 A1* | 4/2012 | Taylor .................... G06Q 40/04 |
| | | 705/35 |
| 2012/0166327 A1 | 6/2012 | Amicangioli |
| 2012/0219283 A1 | 8/2012 | Sokolowski |
| 2012/0284167 A1 | 11/2012 | Dubey |
| 2012/0296796 A1 | 11/2012 | Smith |
| 2012/0317011 A1* | 12/2012 | Duquette ............... G06Q 40/04 |
| | | 705/37 |
| 2012/0323757 A1 | 12/2012 | Monroe |
| 2013/0013487 A1 | 1/2013 | Sellberg et al. |
| 2013/0151391 A1 | 6/2013 | Simonoff |
| 2013/0159449 A1 | 6/2013 | Taylor |
| 2013/0179319 A1 | 7/2013 | Barker et al. |
| 2013/0204760 A1 | 8/2013 | Decker et al. |
| 2013/0218739 A1 | 8/2013 | Kmiec et al. |
| 2013/0246239 A1* | 9/2013 | Cooke .................. H04L 12/1804 |
| | | 705/37 |
| 2013/0297478 A1 | 11/2013 | Mannix |
| 2013/0308453 A1 | 11/2013 | Cook |
| 2013/0325684 A1 | 12/2013 | Vogler et al. |
| 2013/0329605 A1* | 12/2013 | Nakil ...................... H04L 45/02 |
| | | 370/255 |
| 2014/0019323 A1 | 1/2014 | Blake |
| 2014/0081822 A1 | 3/2014 | Cushing |
| 2014/0095409 A1 | 4/2014 | Bohman |
| 2014/0143118 A1 | 5/2014 | Schwarz et al. |
| 2014/0172662 A1 | 6/2014 | Weiss et al. |
| 2014/0279342 A1 | 9/2014 | Maynard |
| 2014/0279552 A1 | 9/2014 | Ortiz et al. |
| 2015/0039489 A1* | 2/2015 | Rotella ................... G06Q 40/04 |
| | | 705/37 |
| 2015/0066727 A1 | 3/2015 | Wepsic et al. |
| 2015/0073970 A1 | 3/2015 | Merold et al. |
| 2015/0081508 A1 | 3/2015 | Schwall et al. |
| 2015/0127509 A1* | 5/2015 | Studnitzer ............. G06Q 40/04 |
| | | 705/37 |
| 2015/0127519 A1 | 5/2015 | Melton |
| 2015/0235212 A1 | 8/2015 | Ortiz et al. |
| 2015/0261625 A1 | 9/2015 | Cape et al. |
| 2015/0302441 A1 | 10/2015 | Katsuyama et al. |
| 2015/0381484 A1 | 12/2015 | Hira et al. |
| 2015/0381488 A1 | 12/2015 | Chanda |
| 2016/0019536 A1 | 1/2016 | Ortiz et al. |
| 2016/0055581 A1 | 2/2016 | Katsuyama et al. |
| 2016/0078537 A1 | 3/2016 | Katsuyama et al. |
| 2016/0078538 A1 | 3/2016 | Katsuyama et al. |
| 2016/0104155 A1 | 4/2016 | McGaugh et al. |
| 2016/0104242 A1 | 4/2016 | Melton |
| 2016/0173364 A1 | 6/2016 | Pitio et al. |
| 2016/0182330 A1 | 6/2016 | Iannaccone et al. |
| 2016/0189260 A1 | 6/2016 | Nagla |
| 2016/0196606 A1 | 7/2016 | Damodaran |
| 2016/0205174 A1 | 7/2016 | Pitio et al. |
| 2016/0210626 A1 | 7/2016 | Ortiz et al. |
| 2016/0260173 A1 | 9/2016 | Aisen et al. |
| 2016/0267082 A1 | 9/2016 | Wong et al. |
| 2016/0277348 A1 | 9/2016 | Pitio |
| 2017/0017958 A1 | 1/2017 | Scott et al. |
| 2017/0039648 A1 | 2/2017 | Aisen et al. |

(56) References Cited

U.S. PATENT DOCUMENTS

| | | | |
|---|---|---|---|
| 2017/0097973 A1 | 4/2017 | Iannaccone et al. |
| 2017/0124494 A1 | 5/2017 | Hristoskov et al. |
| 2017/0161735 A1 | 6/2017 | Ortiz et al. |
| 2017/0186085 A1 | 6/2017 | Nagla |
| 2017/0230447 A1 | 8/2017 | Harsha |
| 2017/0249622 A1 | 8/2017 | Ortiz et al. |
| 2017/0279736 A1 | 9/2017 | Pitio et al. |
| 2017/0330181 A1 | 11/2017 | Ortiz |
| 2018/0018723 A1 | 1/2018 | Nagla et al. |
| 2018/0047065 A1 | 2/2018 | Wildberger |
| 2018/0054363 A1 | 2/2018 | Ngampornsukswadi et al. |
| 2018/0075527 A1 | 3/2018 | Nagla et al. |
| 2018/0082678 A1 | 3/2018 | Olmstead et al. |
| 2018/0158143 A1 | 6/2018 | Schmitt et al. |
| 2018/0191624 A1 | 7/2018 | Haynold |
| 2019/0087898 A1 | 3/2019 | Mannix |
| 2020/0211113 A1 | 7/2020 | Adcock et al. |
| 2021/0377166 A1 | 12/2021 | Brar et al. |

FOREIGN PATENT DOCUMENTS

| | | |
|---|---|---|
| AU | 2016231624 A1 | 10/2016 |
| AU | 2015327722 A1 | 4/2017 |
| AU | 2015330644 A1 | 4/2017 |
| AU | 2016208989 A1 | 8/2017 |
| AU | 2016224908 A1 | 9/2017 |
| AU | 2016287789 A1 | 2/2018 |
| BR | 112012013891 A2 | 5/2016 |
| CA | 2707196 A1 | 1/2011 |
| CA | 2927532 A1 | 1/2011 |
| CA | 2927607 A1 | 1/2011 |
| CA | 2681251 A1 | 3/2011 |
| CA | 2706252 A1 | 3/2011 |
| CA | 2777438 A1 | 11/2012 |
| CA | 2871322 A1 | 3/2014 |
| CA | 2830260 A1 | 4/2014 |
| CA | 2844318 A1 | 9/2014 |
| CA | 2961916 A1 | 4/2016 |
| CA | 2963287 A1 | 4/2016 |
| CA | 2913700 A1 | 6/2016 |
| CA | 2916284 A1 | 6/2016 |
| CA | 2970743 A1 | 6/2016 |
| CA | 2974151 A1 | 7/2016 |
| CA | 2922072 A1 | 8/2016 |
| CA | 2978488 A1 | 9/2016 |
| CA | 2980196 A1 | 9/2016 |
| CA | 2991073 A1 | 1/2017 |
| CA | 2910754 A1 | 4/2017 |
| CA | 3000464 A1 | 4/2017 |
| CA | 3000466 A1 | 4/2017 |
| CA | 2952874 A1 | 6/2017 |
| CA | 2970686 A1 | 12/2017 |
| CA | 2976505 A1 | 2/2018 |
| CA | 2976618 A1 | 2/2018 |
| CA | 2963767 A1 | 3/2018 |
| CN | 105978756 A | 9/2016 |
| CN | 107004190 A | 8/2017 |
| CN | 107004195 A | 8/2017 |
| CN | 107408253 A | 11/2017 |
| EP | 2510451 A1 | 10/2012 |
| EP | 3201856 A1 | 8/2017 |
| EP | 3234792 A1 | 10/2017 |
| EP | 3248159 A1 | 11/2017 |
| EP | 3260979 A1 | 12/2017 |
| EP | 3269090 A1 | 1/2018 |
| EP | 3272082 A1 | 1/2018 |
| EP | 3317833 A1 | 5/2018 |
| JP | H11-212913 A | 8/1999 |
| JP | 2005-348262 A | 12/2005 |
| JP | 2006-511884 A | 4/2006 |
| JP | 2008-102637 A | 5/2008 |
| JP | 2011-192217 A | 9/2011 |
| KR | 10-2002-0012538 | 2/2002 |
| KR | 10-2012-0092880 A | 8/2012 |
| KR | 20180026498 | 3/2018 |
| MX | 2012006659 | 1/2013 |
| MX | 2017011021 | 1/2018 |
| SG | 10201704581 | 7/2017 |
| SG | 11201501568 S | 8/2017 |
| SG | 11201707004 | 9/2017 |
| WO | WO-2000/50974 A2 | 8/2000 |
| WO | WO-0176133 A1 * | 10/2001 | ........... H04L 9/0836 |
| WO | 0201472 A1 | 1/2002 |
| WO | WO-2006039815 A1 | 4/2006 |
| WO | WO-2008019465 A1 | 2/2008 |
| WO | WO-2011/069234 A1 | 6/2011 |
| WO | 2013/184846 A1 | 12/2013 |
| WO | WO-2014043420 A1 * | 3/2014 | ........... G06Q 30/08 |
| WO | WO-2016/049745 A1 | 4/2016 |
| WO | WO-2016/054727 A1 | 4/2016 |
| WO | WO-2016/095012 A1 | 6/2016 |
| WO | WO-2016/115620 A1 | 7/2016 |
| WO | WO-2016/135705 A1 | 9/2016 |
| WO | WO-2016/141491 A1 | 9/2016 |
| WO | WO-2016/149807 A1 | 9/2016 |
| WO | WO-2017/000061 A1 | 1/2017 |
| WO | WO-2017/054094 A1 | 4/2017 |
| WO | WO-2017/054095 A1 | 4/2017 |
| WO | WO-2017/136956 A1 | 8/2017 |
| WO | WO-2017/143435 A1 | 8/2017 |
| WO | WO-2017/152265 A1 | 9/2017 |
| WO | WO-2018/010009 A1 | 1/2018 |
| WO | WO-2018/014123 A1 | 1/2018 |
| WO | WO-2018/049523 A1 | 3/2018 |
| ZA | 2012/05093 B | 2/2014 |

OTHER PUBLICATIONS

Narayan, "Reliable Transfer of Data in a Local Area Network with Multicast Distribution," Planning Research Corp, IEEE 0742-42-1303/0000/0310, 1990 (Year: 1990).*

U.S. Appl. No. 14/322,996 U.S. Pat. No. 10,467,694, filed Jul. 3, 2014, Bradley Katsuyama.

U.S. Appl. No. 16/594,717, filed Oct. 7, 2019, Bradley Katsuyama.

U.S. Appl. No. 16/672,060, filed Nov. 1, 2019, Bradley Katsuyama.

"High Frequency traders face speed limits" by Stephen Foley (herein after Foley) Apr. 28, 2013. (Year: 2013).

Huw Jones—EU lawmaker turns screw on ultra-fast trading Mar. 26, 2012 (Year: 2012).

Tetsuya Kawanishi, Atsushi Kanno, Yuki Yoshida, Ken-ichi Kitayama, "Impact of wave propagation delay on latency in optical communication systems," Proc. SPIE 8646, Optical Metro Networks and Short-Haul Systems V, 86460C (Feb. 5, 2013) (Year: 2013).

A Speed Limit for the Stock Market by Roger Lowenstein Oct. 1, 2012 (Year: 2012).

Mark Perl Transmission Basics Jan. 14, 2012 (Year: 2012).

Clamping Down on Rapid Trades in Stock Market By Graham Bowley Oct. 8, 2011 (Year: 2011).

The European Union's Response to the 2007-2009 Financial Crisis Walter W. Eubanks Specialist in Financial Economics (Year: 2010).

Latency and Asset Prices; Andrei Kirilenko—MIT Sloan School of Management; Guilherme Lamacie—Jan. 7, 2015 (Year: 2015).

Saving the world with Tudor Jones, Part 3, Willoughby, J. (1997). Saving the world with tudor jones, part 3. Institutional Investor, , 60. Retrieved from https://dialog.proquest.com/professional/docview/677541709?accountid=1422-57 (Year: 1997).

Michael Lewis, Flash Boys: A Wall Street Revolt, New York Times article adapted from book (274 pp. W. W. & Company), http://www.nytimes.com/2014/04/06/magazine/flash-boys-michael-lewis.html.

International Search Report in PCT /US2013/059558.

Third Party Observation in PCT /US2013/059558.

International Preliminary Search Report (dated Mar. 17, 2015).

Written Opinion (dated Dec. 17, 2013).

Canadian Grant No. 2871322; Transmission Latency Leveling Apparatuses, Methods and Systems, IEX Group Inc.; 1 page; Feb. 22, 2018.

Notification of Grant and Examination Report; Singapore Patent Application No. 11201501568S; Transmission Latency Leveling Apparatuses, Methods and Systems, IEX Group Inc.; 5 pages; Aug. 11, 2017.

(56) References Cited

OTHER PUBLICATIONS

Ivy Schmerken, PDQ ATS Launches a New Electronic Equity Auction for Large Orders, 1-4 pages, Sep. 22, 2014, InformationWeek WallStreet & Technology, http://www.pdqats.com/pdq-ats-launches-a-new-electronic-equity-auction-fo- r-large-orders/.
"Dan Marcus, Market structure evolution", 1-6 pages, Mar. 13, 2015, ParFx press release, https://www.parfx.com/news/press-releases/market-structure-evolution-by-d- an-marcus-ceo-parfx/.
"Notice of Filing of Proposed Rule Change to Modify Exchange Rule 3307 to Institute a Five Millisecond Delay in the Execution Time of Marketable Orders on NASDAQ OMX PSX, 1-12 pages, Aug. 17, 2012, U.S. Securities and Exchange Commission. File No. SR-Phlx-2012-106 Release No. 34-67680, https://www.sec.gov/rules/sro/phlx/2012/34-67680.pdf".
About ParFx, 1-2 pages, Sep. 11, 2013, ParFx Web Site, https://web.archive.org/web/20130911210916/http://www.parfx.com/about-par- fx.
Joe Castaldo, How Aequitas plans to build a kinder, gentler stock market, 1-12 pages, Mar. 26, 2015, Canadian Business http://www.canadianbusiness.com/innovation/aequitas-vs-hft/.
Greg Klein, HFT speed bump gets green light as OSC approves Aequitas Neo Exchange, 1-2 pages, Nov. 17, 2014, Resource Clips http://resourceclips.com/2014/11/17/hft-speed-bump-gets-green-light-as-os- c-approves-aequitas-neo-exchange/.
Schematic (Auction Process)/PDQ ATS, 1 page, Sep. 30, 2015, PDQ Web Site, https://web.archive.org/web/20150930073841/http://www.pdqats.com/platform- /process/.
Ivy Schmerken, EBSs Plan to Slow Down HFT in FX Could Influence Other Regulators, 1-2 pages, Apr. 29, 2013, InformationWeek WallStreet & Technology, http://www.wallstreetandtech.com/exchanges/ebss-plan-to-slow-down-hft-in--fx-could-influence-other-regulators/a/d-id/1268077.
Application for Recognition of Aequitas Neo Exchange Inc. (Aequitas Neo Exchange) and its parent company, Aequitas Innovations Inc. (Aequitas), of Notice and Request for Comment, 1-41 pages, Jun. 27, 2014, Ontario Securities Commission,https://www.osc.gov.on.ca/documents/en/Marketplaces/xxr-aequitas_20140627- nrfc-application2.pdf.
Innovative Design to Promote Liquidity Formation, 1-2 pages, Apr. 5, 2015, Aequitas NEO Exchange Web Site, https://web.archive.org/web/20150405131256/https://www.aequitasneoexchang-e.com/en/trading/trading-solutions/neo-book/.
TMX Group to Streamline its Equities Trading Offering, 1-2 pages, Oct. 23, 2014, TMX Press Release, https://www.tmx.com/newsroom/press-releases?id=203&year=2014&month=10.
Third-party Submission Under 37CFR 1.290 for U.S. Appl. No. 14/688,463, filed Apr. 22, 2016, (18 pages).
"Chicago Fed Warned on High-Frequency Trading, SEC Slow to Respond," Reuters Hedgeworld, New York, NY. (Oct. 1, 2012), https://search.proquest.com/docview/1081511083?accountid=14753, (4 pages).
"New Trading Platform to Tackle HFT," Compliance Reporter, London, UK (Jul. 29, 2013), https://search.proquest.com/docview/1430519512?accountid=14753, (3 pages).
"Upstart Trading Platform Pitches itself as a Sanctum," Dow Jones Institutional News, New York, NY. Jul. 29, 2013, https://searchproquest.com/docview/2092612293?accountid=14753. (3 pages).
Bhupathi, Tara, Technology Latest Market Manipulator—High Frequency Trading the Strategies, Tools, Risks, and Responses, NCJL and Tech, 11, 377, 2009, http ://scholarship .law. unc.edu/cgi/viewcontent.cgi?article=1168&context=ncjolt.
Bloomberg, Sam Mamudi, IEX to Reveal Dark Pool Operations Data in Challenge to Peers, Oct. 22, 2013 19:02:46.764, GMT, 2 pages.
Flitter et al, Insight Chicago Fed warned on high-frequency trading, reuters webpages, Sep. 30, 2012, http://www.reuters.com/article/us-markets-tech-breakdowns/ insight-ch icago-fed-warned-on-high-freq uency-trading-idUSBRE88TON F20121 001.
Form ATS; OMB No. 3235-0509; Initial Operation Report, Amendment to Initial Operation Report and Cessation of Operations Report for Alternative Trading System, 34 pages.
Int'l Search Report and Written Opinion of the ISA/US in PCT/US15/26168; dated Jul. 27, 2015; 7 pgs.
Int'l Search Report and Written Opinion of the ISA/US in PCT/US15/50708; dated Dec. 31, 2015; 6 pgs.
John Kay, Enduring lessons from the legend of Rothschild's carrier pigeon, Financial Times, May 28, 2013, https://www.ft.com/content/255b 75e0-c77d-11e2-be27-00144feab7de.
Reuters; Sarah N. Lynch, Insight: Chicago Fed warned on high-frequency trading; Sep. 30, 2012 8:05 PM, 14 pages.
The News from Waterloo, archives org webpages, Sep. 12, 2015, https://web.arch ive.org/web/20150912031729/htlp://thenewsfromwaterloo. com/pigeon-post. html.
WSJ, Scott Patterson, Upstart Pitches Trading Sanctum, Jul. 29, 2013 9:00 ET, 2 pages.
Young T, How to Regulate a Secret the Clandestine Nature of High-Frequency Trading Makes it Nearly Impossible to Police, Thankfully, a New and Fairer Market is Emerging, Intl Fin. L Rev, 3334, 2014, http://hei non li ne.org/HOUPage?hand le= hei n.journals/intfinr33&div=83&g_sent=1&casa_token=&collection=journals.
Extended European Search Report issued for EP Application No. 20167210.2, mailed on Sep. 8, 2020 (11 pages).
Australian Examination Report 2, issued for Australian Application No. 2018217228, mailed on Mar. 18, 2020 (5 pages).
Kay, R. Pragmatic network latency engineering fundamental facts and analysis, cPacket Networks, White Paper, published 2009, pp. 1-31 <URL: http://nhne-pulse.org/wp-content/uploads/2011/01/Introduction_to_Network_Latency_Engineering.pdf>.
Australian Examination Report 1, issued for Australian Application No. 2020203050, mailed on Nov. 11, 2020 (8 pages).
English Translation of Brazilian Search Report Issued for Brazilian Application No. BR112015005550-8, mailed on Feb. 4, 2020 (3 pages).
English Translation of Korean Non-Final Office Action issued for 10-2017-7009413, mailed on Dec. 20, 2018 (6 pages).
English Translation of Korean Non-Final Office Action issued for 10-2019-7028733, mailed on Aug. 31, 2018 (5 pages).
Lass, Robert N. et al., "GUMP: Adapting Client/Server Messaging Protocols into Peer-to-Peer Serverless Environments", BADS '10: Proceedings of the 2nd workshop on Bio-inspired algorithms for distributed systems, Jun. 2010, pp. 39-46.
Office Action issued in Canadian patent application No. 3015052, mailed on Mar. 3, 2021.
Extended European Search Reporting issued for Application No. 20167210.2, mailed on Sep. 8, 2020.
Sheldon, et al., "The Effect of Latency on User Perfomance in Warcraft III," Worcester Polytechnic Institute, CS Dept., 2003.
Hu, E., "International Access Delays, Market Quality, and Price Discovery: Evidence from IEX Becoming an Exchange," Division Economic and Risk Analysis Working Paper Series, U.S. Securities and Exchange Commision, 2018.
Harris, L., "What to do about High Frequency Trading," CFA Institute, Enterprising Investor, 2017.
Harris, L., "Stop the high-frequency trader arms race," Financial Times, Opinion, FT Trading Room, Dec. 27, 2012.
International Search Report and Written Opinion for PCT/US2023/014021, mailed on Jun. 15, 2023, 228 pages.

\* cited by examiner

Example Data Flow: TLL Point-of-Presence (POP)

Live Bidding Feeds (4.01)

| | Last | Bid | Ask | Vol |
|---|---|---|---|---|
| WSBA | 38.23 | 0.00 | 0.00 | 0 |
| WXZ | 138.23 | 137.87 | 138.23 | 873 |
| ABC | 238.23 | 237.87 | 238.23 | 373 |
| GAAS | 8.23 | 0.00 | 0.00 | 0 |
| WSA | 138.78 | 137.87 | 138.78 | 1123 |
| ACC | 108.56 | 107.87 | 108.56 | 273 |
| QQWE | 38.23 | 0.00 | 0.00 | 0 |
| WPO | 138.23 | 137.87 | 138.23 | 873 |
| BBN | 138.23 | 137.87 | 138.23 | 873 |
| SDAC | 38.23 | 0.00 | 0.00 | 0 |
| NBS | 138.23 | 137.87 | 138.23 | 873 |
| ADS | 138.23 | 137.87 | 138.23 | 873 |
| ASCD | 38.23 | 0.00 | 0.00 | 0 |
| CAS | 138.23 | 137.87 | 138.23 | 873 |
| XCA | 138.23 | 137.87 | 138.23 | 873 |

<< Refresh

Customer Profile — 4.05

Name: My Portfolio ← 4.06

Broker ID: IJHDAD

Start Date: 10/09/2014
End Date: 12/09/2014 ← 4.07

Settings:

Spread Type: Current
Strategy Type: Synthetic AON
Daily Volume: 1000
Order Size: 10%
Min Trade Size: 5%
Min fill size: 5%
Notional Value: ----
Price: ----

Save    Submit

FIGURE 4B          Example TLL UI: Customer Settings

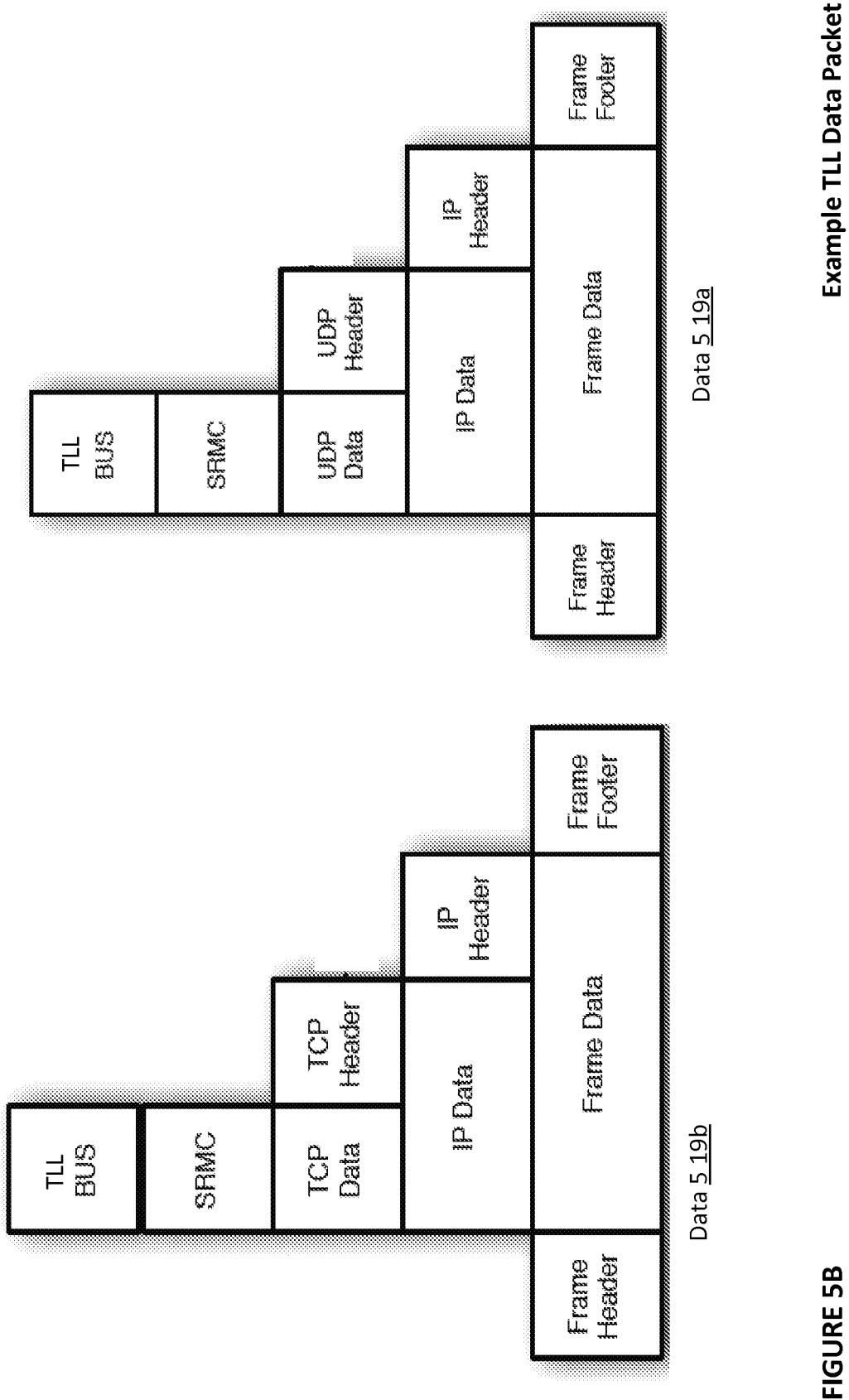

Example TLL Diagram: Latency Arbitrage vs. Broker SOR

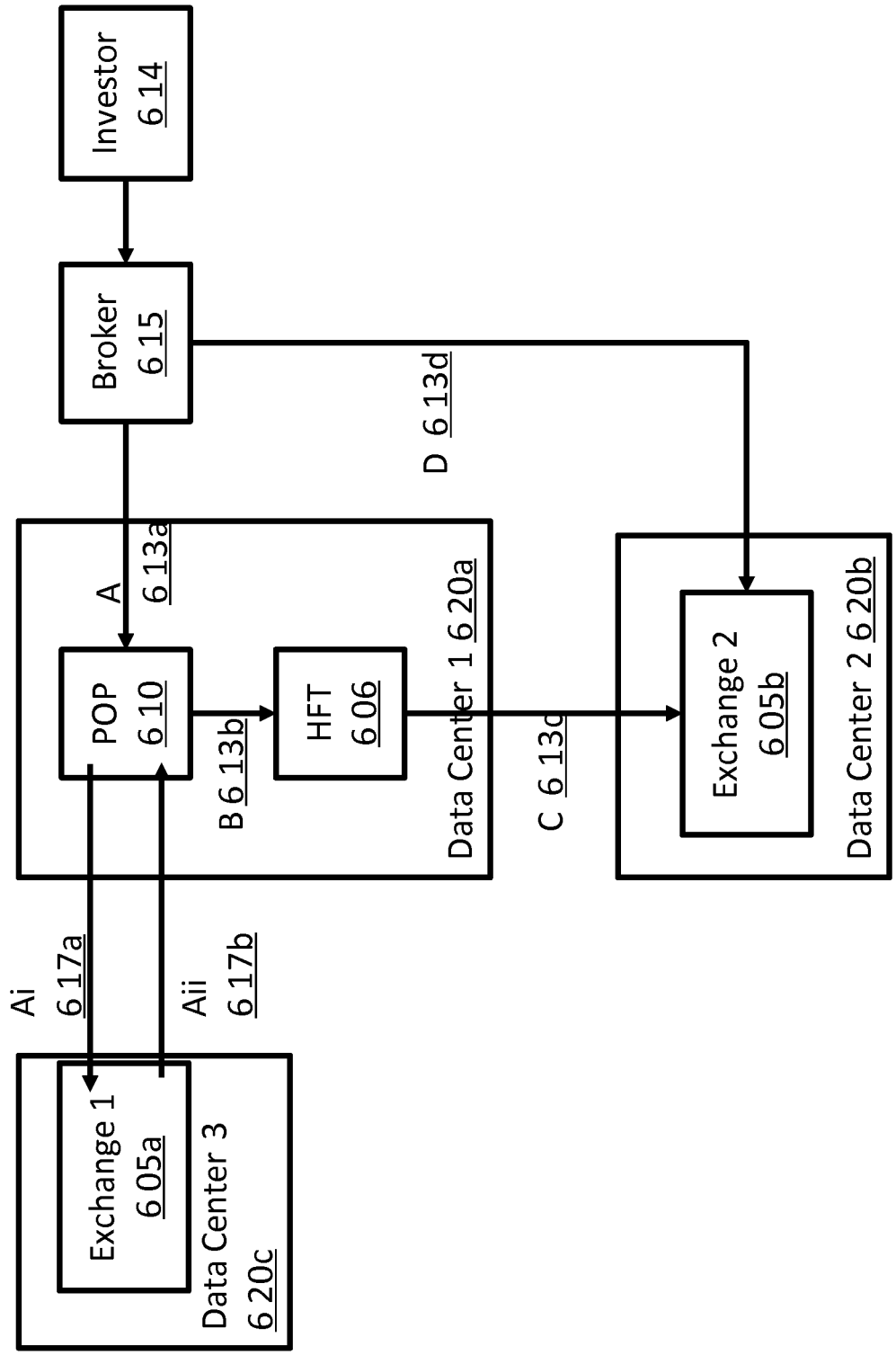
FIGURE 6B — TLL Example:Latency Arbitrage vs. Broker Smart Order Routers Inoculated with POP TLL Example: Latency Arbitrage vs. Exchange SOR TLL Example: Order Book Arbitrage (Aggressive Inoculated)

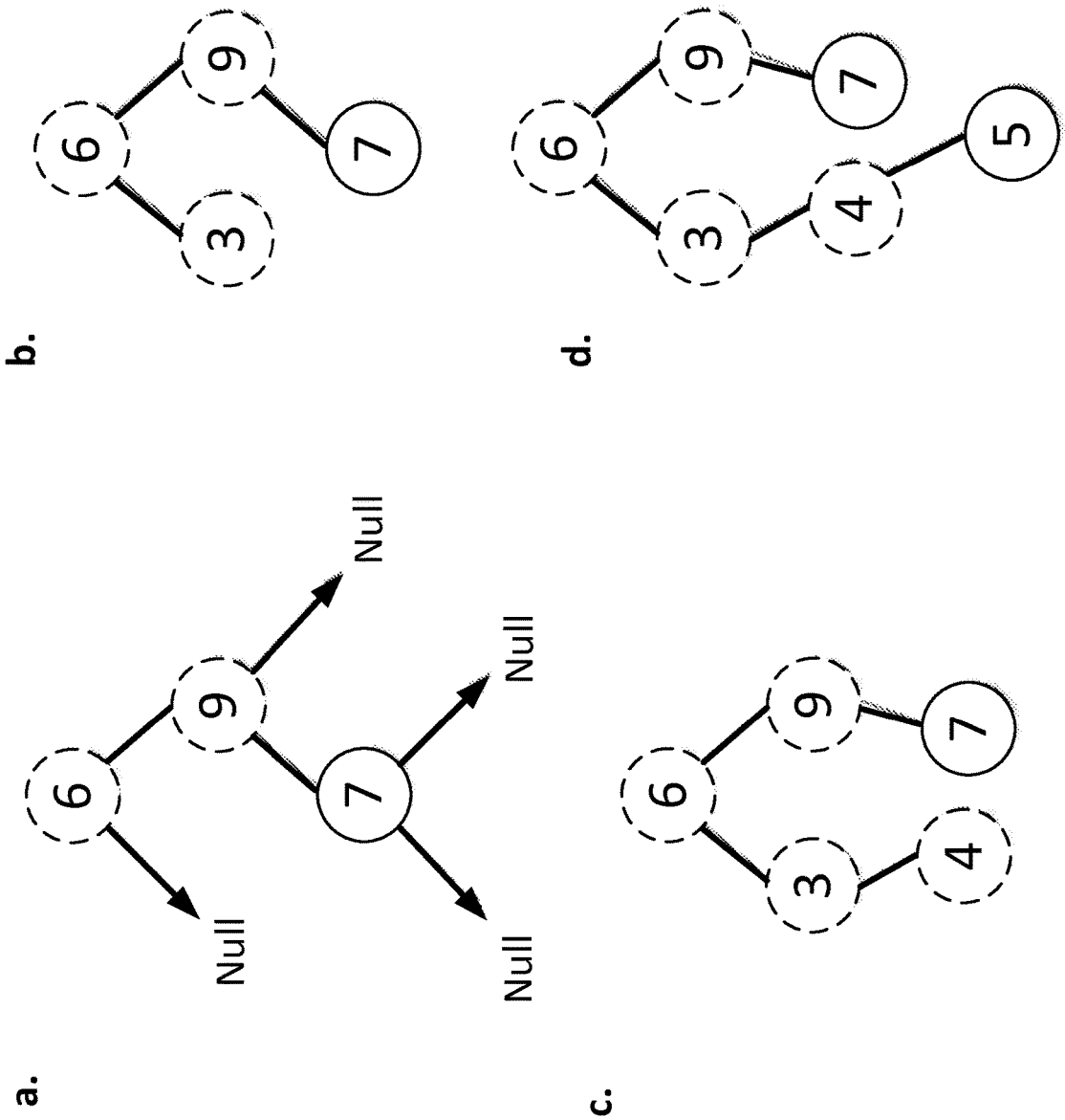
FIGURE 8D  TLL Example: Binary Search Tree

SYSTEM AND METHOD FOR TCP-TO-MULTICAST (T2M) COMMUNICATIONS AND RELATED NETWORK ARCHITECTURE

PRIORITY

The instant application is a continuation application of, and claims priority to, U.S. patent application Ser. No. 14/322,996 filed Jul. 3, 2014, titled "Transmission Latency Leveling Apparatuses, Methods and Systems" (now U.S. Pat. No. 10,467,694) which is a continuation application of, and claims priority to, PCT International Application No. PCT/US2013/059558, filed Sep. 12, 2013, titled "Transmission Latency Leveling Apparatuses, Methods and Systems," which in turn claimed priority to: U.S. provisional application Ser. No. 61/700,094, filed Sep. 12, 2012, titled "Provisions for Reducing the Advantages of High-Frequency Trading in Financial Markets"; U.S. provisional application Ser. No. 61/753,857, filed Jan. 17, 2013, titled "Binary Search Tree with Worst-Case-Optimized, Time-Deterministic Insert and Search Operations for a Finite Key Space"; U.S. provisional application Ser. No. 61/758,508, filed Jan. 30, 2013, titled "Provisions for Reducing Effectiveness of Order Book Arbitrage on a Securities Trading Venue"; and U.S. provisional application Ser. No. 61/876,200, filed Sep. 10, 2013, titled "Congestion Failover and Reliability Enhanced Order Platform Apparatuses, Methods and Systems."

All of the above-mentioned applications are herein expressly incorporated by reference in their entireties.

This utility application for letters patent discloses and describes various novel innovations and inventive aspects of transmission latency leveling and contains material that is subject to copyright, mask work, and/or other intellectual property protection. In particular, this application discloses and describes techniques for TCP-to-Multicast (T2M) communications. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for Electronic Trading Platforms, and more particularly, include techniques for transmission latency leveling ("TLL").

BACKGROUND

Consumers use an auction based system to bid and offer for goods of value. Such auction or exchange based system can include an auction based online shopping site, an online ticket booking system, electronic market, or any trading exchange.

Individual investors and traders buy or sell securities (such as stocks and bonds), foreign exchange, and other financial derivative products over an electronic trading platform. The electronic trading platforms such as NASDAQ, NYSE Arca, Globex, London Stock Exchange, BATS, Chi-X Europe, TradeWeb, ICAP, and Chicago's Board of Trade, provide virtual marketplaces comprising an information technology infrastructure for buyers and sellers to bid over financial instruments. A trader submits a bid to the electronic trading platform via an electronic terminal such as a personal computer user interface; and the electronic trading platform transmits real-time asking and bidding information that reflects pricing information of a financial instrument via a communication network to computer terminals of different trading entities.

BRIEF DESCRIPTION OF THE DRAWINGS

The accompanying appendices, drawings, figures, images, etc. illustrate various examples, non-limiting, inventive aspects, embodiments, and features ("e.g.," or "example(s)") in accordance with the present disclosures:

FIGS. 4A-4B provide exemplary user interface diagrams of TLL within embodiments of the TLL;

FIGS. 5A-5C provide exemplary data diagrams illustrating aspects of TLL network infrastructure within embodiments of the TLL;

FIGS. 6A-6H provide exemplary diagrams illustrating various scenarios of managing latency arbitrage and order book arbitrage via a network access point that causes additional data transmission latency within embodiments of the TLL;

FIGS. 8A-8D provide exemplary diagrams illustrating embodiments of binary search tree with worst-case-optimized, time-deterministic insert, and search operations for a finite key space within embodiments of the TLL.

Figure 1A:
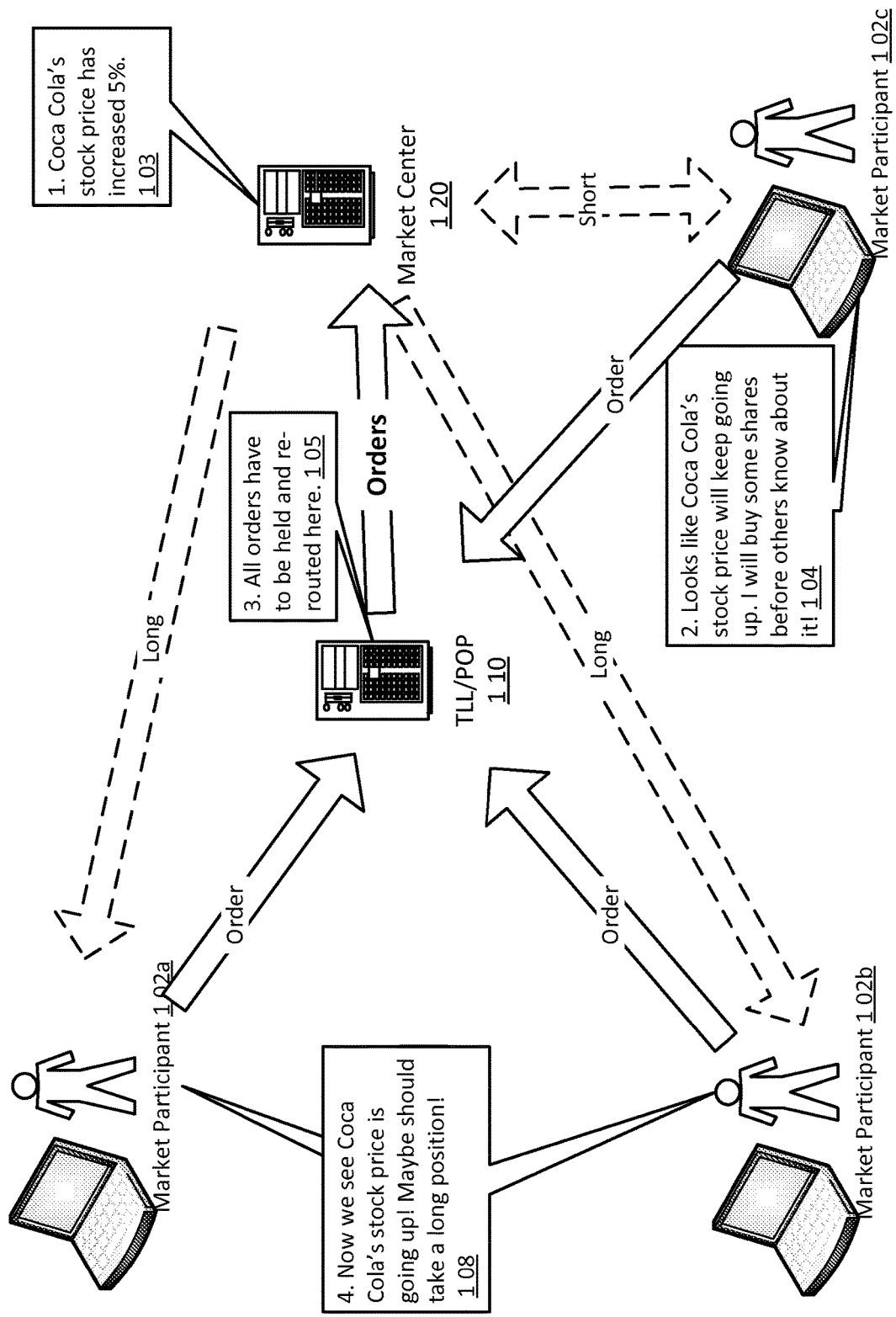
FIG. 1A provides an illustrative example showing aspects of reducing latency arbitrage within embodiments of the TLL.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The transmission latency leveling or TLL technology provides an electronic trading order management infrastructure, such as a "point-of-presence" or "POP," which receives and routes electronic trading orders from different trading entities at a network access point via a transmission medium to create a certain amount of transmission latency before the trading orders could arrive at and be executed at electronic market centers to reduce latency arbitrage and/or order book arbitrage that may be exploited by high frequency trading participants.

In one implementation, a Point-of-Presence (POP) access point may be installed and configured to receive trading orders from market participants and pass on the orders to a data exchange for execution; the transmission to and from POP may lead to additional transmission latency, which may be the location of the market participant (e.g., transmission distance, etc.), transmission medium (e.g., cable, microwave, etc.), circuit resistance, other information technology infrastructure advantage and/or other transmission speed advantage, and/or the like. For example, the length of the cable required to connect the POP and a data exchange or market participant terminal may be utilized to create a transmission latency. Such transmission latency may be controllable by adjusting the length of the transmission cable.

In one implementation, the POP may comprise a piece of non-intelligent network hardware including at least one communication link with an input port for receiving orders, and another communication link with an output port for transmitting the received orders to a data exchange and/or other entities. In another implementation, the POP may comprise a computer readable medium storing computer executable instructions to perform a series of instructions by a processor.

It should be noted that although the examples discussed in FIGS. 1A-6H include market data centers and data exchanges for financial instrument trades, the TLL may be applied to any auction-based systems or electronic markets, such as, but not limited to advertising exchanges (display, mobile, radio, search, video, and/or the like), online flight ticket/hotel booking systems, online auction shopping systems, virtual world in-game markets such as those found in massively multiplayer online gaming system (MMORGs), and/or the like. Further, the TLL may be applied to any electronic messaging systems where latency and/or access to resources is a consideration. For example, in an online video game where the speed at which players receive and submit messages determines how quickly they are able to understand and respond to conditions in the game, and where a player is able to react and register actions ahead of other players, gains an advantage that may result in said player winning the game. As such, the TLL may provide institutionalized fair access to information and resources with an auction-based system.

Transmission Latency Leveling (TLL)

FIG. 1A provides an illustrative example showing aspects of reducing latency arbitrage within embodiments of the TLL. In one implementation, in the financial instrument trading markets, some market participants may take advantage of the information technology infrastructure so that they could obtain market data feeds faster than other market participants and thus may formulate and execute trading strategies before other market participants react to the market change.

For example, in one implementation, locations where orders from market participants are executed may also be the location where orders are accepted, from which reports of quotations, executed trades, and other market data are disseminated to the public. By locating its trading entity at the same place (e.g., co-locating) and/or within close proximity to a market center, the market participant may be able to receive market data updates ahead of other market participants to whom the data dissemination may take a longer time. In one implementation, such market data transmission advantage may be caused by a variety of factors, such as, but not limited to the location advantage (e.g., shorter transmission distance, etc.), transmission medium (e.g., cable, microwave, etc.), circuit resistance, other information technology infrastructure advantage and/or other transmission speed advantage, and/or the like.

In one implementation, the market data may include quotations, last trade feeds, and/or other market information. In one implementation, the market center 120 may comprise any kind of exchange, market data publisher, alternative trading system, Electronic Communication Network (ECN), dark pool, and/or the like. In one implementation, the market center may comprise a data exchange that may execute a trading order. In further implementations, the market center may comprise a matching engine and a smart router that may match, route and/or re-route any orders to one or more data exchanges, which may be affiliated with the market center, or located at another market center.

Market participants, such as, but not limited to, high frequency trading (HFT) participants may take advantage of the faster data transmission advantage to engage in strategies known as "latency arbitrage." As shown in FIG. 1A, in one implementation, e.g., by locating their trading systems closer to the market center 120, and/or the like, HFT participants 102*c* may receive market data (e.g., pricing update of "Coca Cola stocks" 103, etc.) sooner than other participants 102*a-b* whose systems are located farther away from the market center 120. The HFT participants 102*c* may then execute trades based on the newly received market data, e.g., to buy shares of Coca Cola 104, etc., before the other participants even receive the market data on Coca Cola stock price, e.g., 103. As a result, participants 102*a-b* who do not co-locate with, or locate their trading systems close to, the market center 120 may be forced to trade on out-of-date data, e.g., market participants 102*a-b* may generate and execute orders based on the Coca Cola stock prices change 103, but after the HFT participant 102*c* has already submitted trades 104 on the Coca Cola stocks which may cause new price changes. In one implementation, market participants other than HFT participants, e.g., any broker, individual investors, other trading entities, who enjoy any data transmission advantage at their trading terminals, etc., may take advantage of such latency arbitrage intentionally or unwittingly.

In one implementation, the TLL infrastructure may provide a "point of presence" (POP) structure 110 to alleviate the latency arbitrage and allow a wider range of participants access to a fair market. For example, as shown in FIG. 1A, the TLL may separate order acceptance and public source of the market data feeds from the market's execution center 120. In one implementation, the TLL may not permit orders to be directly submitted to the market center 120, and may require the trade order to be submitted to and re-routed at the POP 110, from which it is transmitted to the market center 120. In one implementation, when a pricing quotation (e.g., 103) is received or a trade executes, the data is transmitted from the market center 120 to the point of presence 110, from which it is then disseminated to the public. Similarly, trading orders may be re-routed at the POP 110, e.g., 105.

In one implementation, the POP 110 may comprise a hardware access point which may comprise a processor, a memory unit, one or more data I/O ports, and/or the like (e.g., see FIG. 6, etc.), and may be connected to the market center 120 and/or any market participants, trading data terminals, etc. via a variety of transmission mediums, e.g., cable, wireless, microwave, etc. In one implementation, the POP access point may or may not be physically separated from a matching engine at the market center 120, which executes an order, and/or matches and routes an order to another market center. For example, when the POP access point is located outside of the market center, the distance between the POP access point 110 and a market center 120 may lead to extra transmission time for data signals. In another example, the POP access point may be located with the market center, and may have additional cable coiled around the POP access point to create additional transmission time for data signals to arrive at the market center from the POP access point. Further physical specification (e.g., including the transmission medium type (e.g., cable, wireless, microwave, etc.), the cable length, electric circuit parameters such as resistances, transmission time measure, etc.) of a POP access point 110 may be provided in FIG. 2.

In further implementations, cable length, circuit resistance, and/or other hardware parameters of a POP access point may be adjustable, e.g., via a user interface, etc., so that the transmission latency created by the POP access point may be adjustable.

In one implementation, the TLL/POP structure may reduce the advantage of co-location by HFT participants 102*c*. A HFT participant 102*c* that locates its trading systems at the point of presence may receive a data feed delayed by the round-trip latency from the point of presence 110 to the market center 120. Thus, an HFT strategy (e.g., 104) based on the advantage of a lower-latency feed may no longer be certain that they will execute trades based on market data before other participants 102*a-b* even receive the data, e.g., 108, etc.

Figure 1B:
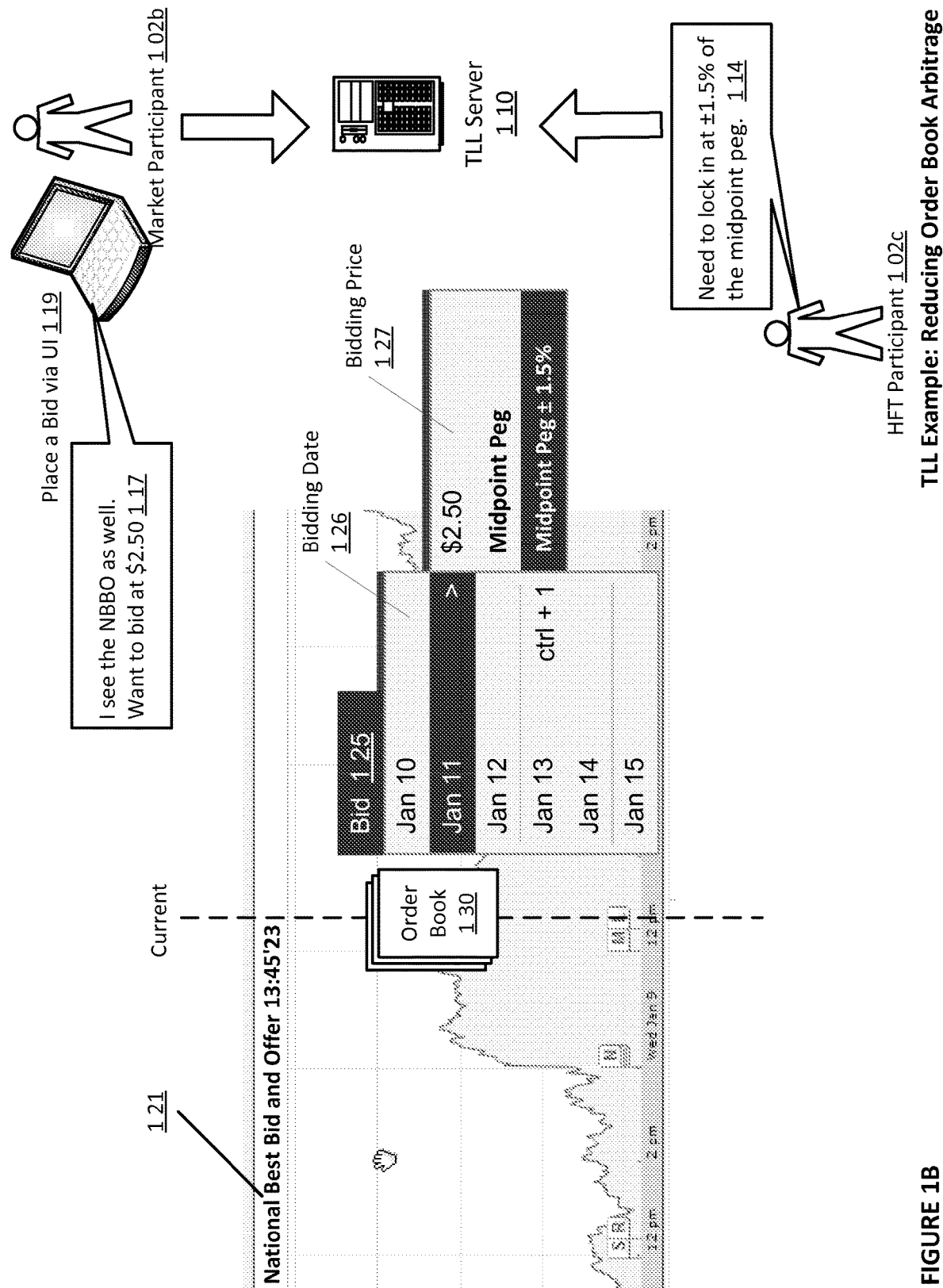
FIG. 1B provides an illustrative example showing aspects of order book arbitrage reducing within embodiments of the TLL.
Figure 1C:
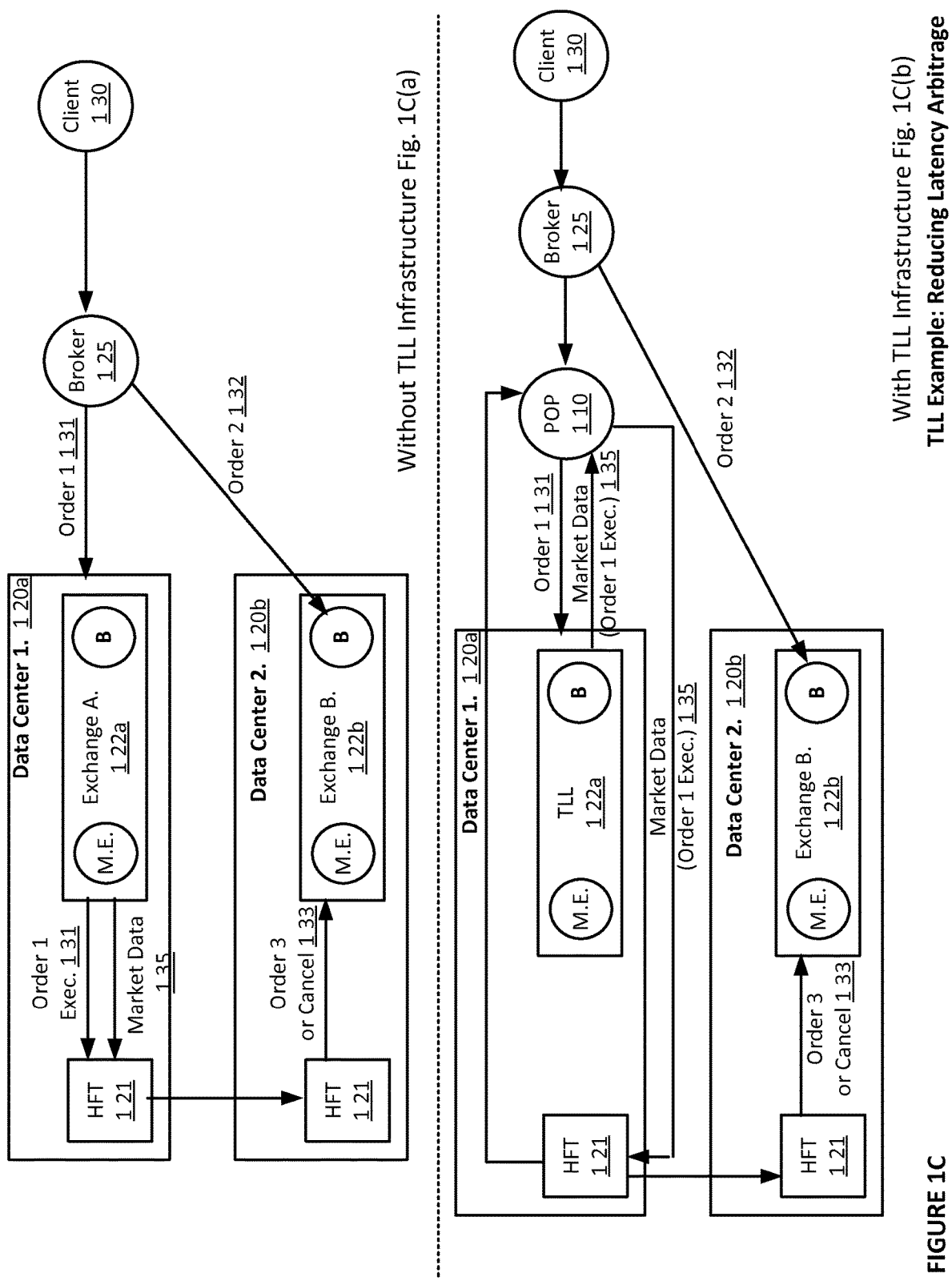
FIGS. 1C-1D provide a comparative diagram illustrating exemplary infrastructures of the TLL Point of Presence ("POP") mechanism to reducing arbitrage within embodiments of the TLL.
Figure 1D:
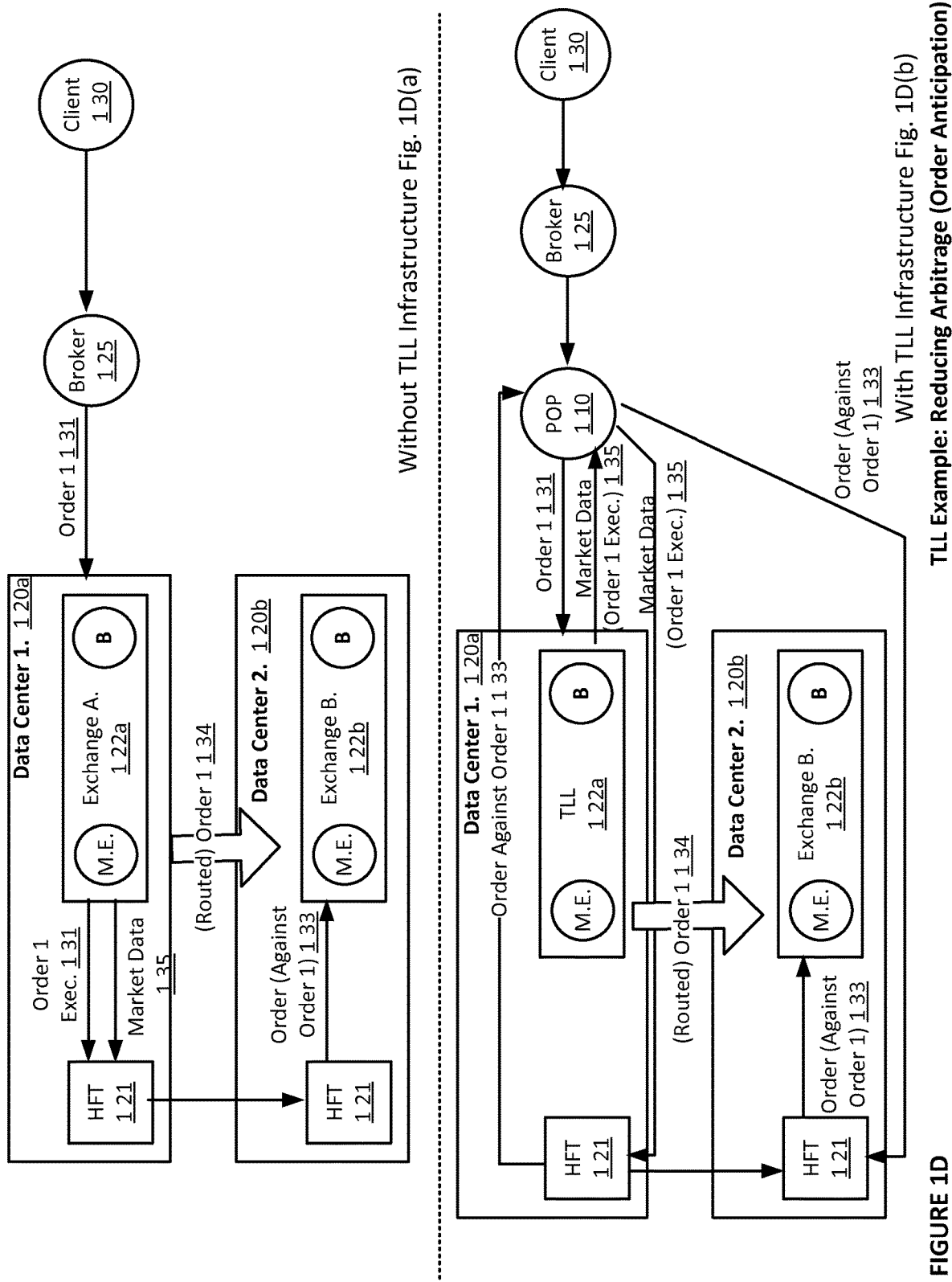

In a further implementation, as further illustrated in FIG. 1D, the data exchange 122*b* may route trading orders to a second venue (e.g., another exchange, ECN, etc.). In this case, if the sum of the latency from the market center 120 to the POP 110 (e.g., additional latency introduced by requiring market center 120 to publish market data including last trade feeds via the POP, etc.) and the latency from the point of presence to a second venue (e.g., additional latency introduced by requiring HFT participant to submit orders via the POP, etc.) is greater than the latency from the market center 120 to the second venue, orders from the market center may safely be routed to the second venue without interference from HFT participants. By introducing additional latency into the system, the unfair advantage of latency arbitrage is reduced.

FIG. 1B provides an illustrative example showing aspects of order book arbitrage reducing within embodiments of the TLL. In one implementation, as discussed in FIG. 1A, HFT participants 102*b* may seek to receive market data feeds faster than other market participant 102*b* so that the HFT participant 102*c* may be able to execute a trade before other market participant 102*b* could react to or even receive the market feeds. One example for such HFT trading strategy may include an order book arbitrage strategy. Order book arbitrage takes advantage of the necessary delays in propagation of market information by processing and acting on market information before a market center can process it, thus making the market center execute a transaction that, if it had more up-to-date information, it would not have executed.

For example, many market centers may allow participants to place orders with a "midpoint peg," whose limit price is dynamically adjusted by the market center to always be halfway between the national best bid and offer prices (the NBBO), e.g., 121*a*. The midpoint peg order is intended to only execute at the midpoint price of the present NBBO. For example, when the order is priced based on out-of-date NBBO data, the order price may not be the midpoint of the most up to date NBBO, and could result in the order not trading or trading an a price inferior to the then up-to-date midpoint price.

For example, in market A, the NBBO is calculated as 0.10×0.12 and the midpoint is 0.11. When the market moves up to a new NBBO 0.11×0.13, the new midpoint is 0.12 and the trading order data may need to be updated accordingly in order to be an effective midpoint peg strategy. If the HFT participant gets the new midpoint (0.12) before market A has time to update, the HFT participant may potentially buy shares at market A for 0.11 and instantly/simultaneously sell them on another market for 0.12 locking in a "risk free" arbitrage of 0.01. Such scenario may be different from an order that is re-priced (e.g., under the U.S. Securities and Exchange Commission's Regulation NMS ("Regulation NMS") or similar laws), wherein in market A, the NBBO is calculated as 0.10×0.12., market A also has a bid at 0.09. If the market moves and the new NBBO is 0.09×0.11 and market A doesn't update in time, it may not allow a sell order for 0.09 to match with the resting buy order for 0.09 (because Regulation NMS prohibits trading through the 0.10 bid). Alternatively, when there is an order pegged to the bid on market A and the NBBO is calculated at 0.10×0.12, if the market moves and the new NBBO is 0.09×0.11 and market A doesn't update in time, it may still have the order pegged to the bid 0.10; in this way, the HFT participant may sell at 0.10 and immediately look to buy on another market at 0.09.

In one implementation, the pegged limit price is determined by the market center with reference to the market data to which it has access. When the market center uses the consolidated market data feed to determine the NBBO while an HFT participant 102*c*, which may be co-located with the market center, uses proprietary market data feeds (from proprietary or 3$^{rd}$ party ticker plants, such as Exegy, Redline, Wombat, and the like), the HFT participant 102*c* may be able to process an NBBO update, submit an order, and execute against a midpoint pegged order (e.g., see 114, etc.) before the market center has processed the NBBO update.

For example, if the NBBO has changed from 0.10×0.12 to 0.08×0.10, the HFT participant 102*c* may execute its order book strategy 130 by immediately sending mid-point limit sell orders looking to execute at 0.11 (the midpoint of the original NBBO). If a market center with slower data feeds still does not know the NBBO has changed, it may trade a mid-point peg buy order against the HFT 102*c* midpoint sell order, at a price that is inferior to the latest NBBO. Thus, the pegged order may be executed outside the present NBBO, frustrating the intent of the order. If the market center had the same updated NBBO as the HFT participant, the pegged order would have been re-priced to the midpoint of the new NBBO (0.09) as well, and the HFT participant would not have been able to execute against the pegged order. This arbitrage strategy may similarly be used to take advantage of other order types, such as "hidden" orders that are priced more aggressively than the updated NBBO but were previously within the NBBO.

In one implementation, the TLL may adopt a similar infrastructure as shown in FIG. 1A to reduce such order book arbitrage, e.g., trading orders may not be submitted directly to the market center. Instead, they need to be submitted to a point of presence 110, from which it is transmitted to the market center. Meanwhile, the market center may use direct proprietary data feeds to update its own market data. In this way, all market participants 102*b* may be able to receive NBBO updates 117, and execute bid/offer requests via their trading terminal interface 119, based on the most-up-to-date midpoint peg data.

For example, if $t_a$ represents the time that it takes for the HFT participant 121 to receive and process a market data update 135, $t_b$ is the time for the HFT participant 121 to submit its arbitrage-strategy order to the market center, and $t_c$ is the time for the market center to receive and process the market data update, HFT participant 102c may enjoy arbitrage whenever the inequality $t_a+t_a<t_c$ holds. There are various methods by which the HFT participant 102c may reduce $t_a$ and $t_b$ relative to $t_c$. For example, market data may be disseminated through a consolidated market data feed including data from all market centers, but many market centers also offer proprietary data feeds of the center's own trade and quote data. Due to the nature of the consolidation process, the consolidated market data feed may generally be delayed relative to the proprietary feeds. Thus, if the market center is using the consolidated market data feed while the HFT participant 102c uses proprietary feeds, $t_a$ will lack the delay and may be significantly less than $t_c$. The third term, $t_b$, may also be reduced through "co-location", e.g., the HFT participant 102c places its servers in locations physically close to the market center, thus reducing the latency in transmission time.

In one implementation, the market center may attempt to decrease $t_c$ to reverse the inequality that allows the arbitrage strategy to take place, by using proprietary feeds and faster technology, but the fast pace of technological advancement may simply create a never-ending "arms race" in which participants and market centers would continue to reduce their latencies beyond the latest advancement by their counterparts. Thus, this may not be a cost-effective business strategy for a market center, so many do not attempt to compete with HFT participants' technologies. In an alternative implementation, the TLL provides an infrastructure, e.g., via the POP, to remove the arbitrage opportunity by increasing $t_b$ instead of any costly technological competition to reduce $t_c$.

In one implementation, $t_b$ may be increased by the latency from the point of presence 110 to the market center, so that $t_a+t_b>t_c$ and thus the arbitrage strategies such as the order book arbitrage strategy discussed in FIG. 1B may be far less effective within this infrastructure. The time an HFT participant takes to process a data update and send an order to the market center may be, at a minimum, the sum of the latency from the proprietary data feed to the point of presence 110 and the latency from the point of presence 110 to the market center. Because the sum of these two latencies is greater than the latency on a direct route from the proprietary data feed to the market center, the market center will receive and process the new data before it receives any order from an HFT participant based on the same data. Thus, the market center greatly diminishes the ability of HFT participants to perform order book arbitrage without attempting to compete with the HFT participants on system speed.

FIG. 1C provides a comparative diagram illustrating exemplary infrastructures of the TLL POP mechanism to reducing arbitrage within embodiments of the TLL. In one implementation, as shown at FIG. 1C(a), without the TLL/POP infrastructure, a HFT participant 121 (shown in the drawings, and referred to hereinafter, as "HFT 121") may choose to locate close to or even locate at the same place with a data exchange 122a-b where market data is generated and disseminated, and trading orders are executed, e.g., the exchange A 122a and exchange B 122b.

For example, when a broker 125 submits a trading order 131 (shown in the drawings as "Order 1 131") to exchange 122a at the data center 1 120a on behalf of their client 130 (e.g., a non-HFT trading entity), and a second order 132 to exchange 122b at the data center 2 120b. Due to the physical location advantage, the HFT 121 may receive the market data 135 including order execution information 131a with regard to the order 1 131 submitted by the broker 125 from exchange A 122a. The HFT 121 may internally synchronize such information and react to the market data, e.g., the HFT 121 may generate an order 3 and/or cancel any pending orders 133 at exchange B 122b based on the obtained information related to the execution of order 1 131. Therefore, due to the physical distance between the broker 125 and data center 2 120b, the HFT 121 may be able to act on the updated market information after the order 1 131 has been executed, before the order 2 132 arrives at exchange B 122b, rendering the order 2 132 an uncompetitive trading order based on out-of-date market data (e.g., prior to order 1 is executed, etc.).

In another implementation, with the TLL POP infrastructure as shown at FIG. 1C(b), the TLL may separate order acceptance and public source of the market data feeds from the market's execution center 122a. In one implementation, all trading orders may need to be submitted to a POP access point 110 and the POP may send the trading orders to the exchange TLL for execution 122a, e.g., the broker 125 may submit order 1 131 to the POP 110 in order to execute the order 1 131 at TLL. In one implementation, the TLL may publish market data (e.g., including the updated data reflecting order 1 execution) 135 via the POP 110, which may pass on such market data 135 to the HFT 121.

In one implementation, if the HFT 121 TLL obtains the updated market data 135 reflecting execution of order 1 131 via POP 110, even if HFT 121 reacts to the market change immediately, HFT 121 may then route the order to the exchange 122b at datacenter 2 120b. As such, the extra transmission time, e.g., from HFT 121 at data center 1 to HFT 121 at data center 2, may increase latency of HFT orders; by the time HFT 121 at data center 2 120b may be able to submit and/or cancel an order 3 133 based on market data 135 the execution of reflecting order 1 131, the broker's 125 order 2 132 may have arrived at data center 2 120b (e.g., order 2 132 may be submitted directly to data center 120b because it is not intended to be executed at TLL, etc.), and has been executed at exchange B 122b. Thus, the order 3 may not have any advantage in terms of updated market data over order 2 132.

For example, the transmission time of order 2 132 from broker 125 to the data center 2 120b may be 89 ms; and the transmission time latency (e.g., additional cable length, circuit resistance, etc.) caused by the POP access point 110 may comprise the time transmission of Market Data 135 from TLL 122a to the POP 110 to HFT 121, e.g., 30 ms, and the time transmission from the HFT 121 to data exchange B 122b, e.g., 60 ms, which may result in a total latency of 90 ms. In one implementation, the POP and/or TLL may not need to estimate, measure and/or signal the timing when an order is sent and/or received; instead, the physical configuration of POP may incur the additional latency as discussed above. Therefore, any order 3 may arrive at Exchange B after order 2 has arrived.

FIG. 1D shows another example of reducing latency arbitrage in order prediction within embodiments of the TLL. In one implementation, TLL 122a may dynamically route the orders based on the most-up-date market, and the market data 135 obtained from TLL 122a may include last trade feeds, which may be utilized by the HFT 121 for order anticipation. For example, as shown at FIG. 1D(b) when the HFT 121 obtains market data 135 from the TLL 122a to obtain the latest executed orders, as TLL 122a may route orders 134 to other data centers (e.g., data center 2 120b, etc.), the HFT 121 may predict orders 134 that may be possibly routed to and will be executed by data exchange B 122b at data center 2 120b. If without the POP access point 110, as shown in FIG. 1D(a), the HFT 121 may immediately generate orders 133 that compete against the routed orders 134, and send such orders 133 to data exchange 122b, which may render the routed orders 134 uncompetitive, e.g., a bid/offer included in orders 134 may not be successful, execute at an inferior price etc.

In another implementation, as shown at FIG. 1D(b), with the POP access point 110, the market data 135 including order 1 execution updates may be sent to the POP 110, which may in turn sent the market data 135 to HFT 121; and any orders 133 the HFT generated to compete against the routed orders 134, need to be routed on to data exchange 122b. Due to the latency from both the publishing of the latest market data 135 via the POP 110 to HFT 121 and/or the transmission time of order 1 133, by the time orders 133 could arrive at data exchange 122b, orders 134 have arrived and been executed at data exchange 122b, and thus would not be rendered at a disadvantage.

It is worth noting that although the examples given in FIGS. 1A-1D show an HFT market participant and a non-HFT market participant, such latency and/or order book arbitrage may take place between any combination of HFT and/or non-HFT participants, and the POP hardware access point may be applied to a variety of market participants. Further examples and variations of scenarios of managing latency arbitrage and order book arbitrage are provided in FIGS. 6A-6H.

Figure 2:
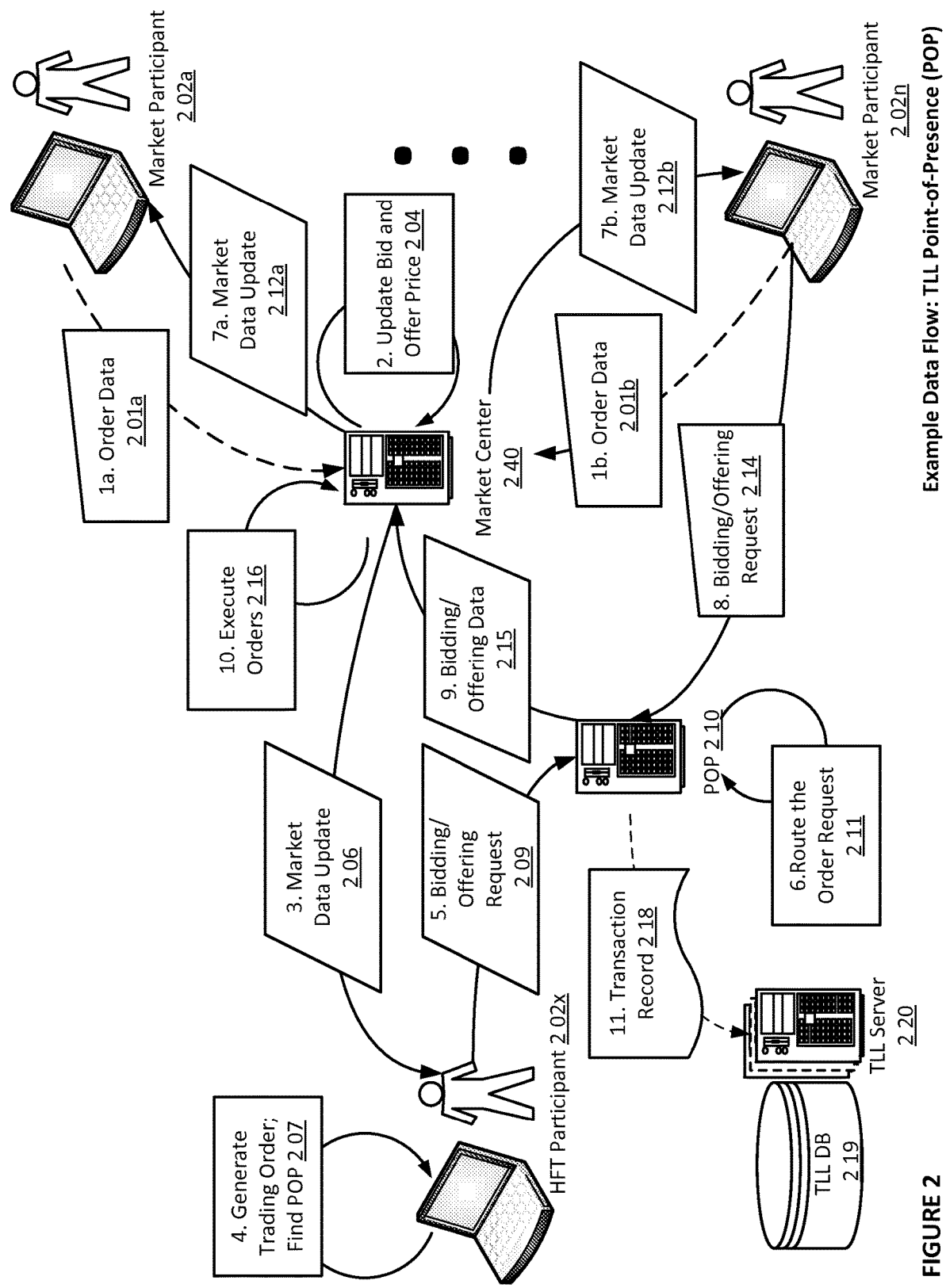
FIG. 2 provides a data flow diagram illustrating data flows between the TLL platform and its affiliated entities for TLL bidding data collection within embodiments of the TLL.

FIG. 2 provides a data flow diagram illustrating data flows between the TLL server 220 and POP 210 and its affiliated entities for TLL market data dissemination and trading order execution within embodiments of the TLL. Within embodiments, a TLL server 220, its affiliated and/or independent POP 210, a market center 240, market participants 202a-n, HFT participant 202x, TLL database 219, and/or the like, may interact via a communication network (e.g., Internet, communication network, payment processing network, telephonic network, cellular network, wireless local area network, 3G/4G network, etc.) for market data updates and/or trading order requests.

In one embodiment, various market participants 202a-n may communicate with a market center 240 for trading orders such as a bidding and/or offering request 201a-b. In one implementation, such market participants may include, but not be limited to individual traders, brokers, portfolio managers, and/or the like. In one implementation, such order data 201a-b may not be directly submitted from the market participant 202a-b to the market center 240, but may be routed via the POP 210, as will be discussed below.

In one implementation, the market center 240 may comprise one or more centralized and/or distributed electronic trading platform and/or market exchange, such as but not limited to NASDAQ, NYSE, BATS, Direct Edge, Euronext, ASX, and/or the like. In one implementation, the market center 240 may obtain and update bidding/offering data feeds 204, and provide such market data updates 206 to participants. In one implementation, such market data update 206 may comprise proprietary feeds, which are directly provided to HFT participant 202x. Exemplary real-time market data feeds may comprise a CSV file format, via the ITCH protocol, and/or other electronic trading protocols, including data feeds from various financial data vendors, such as but not limited to Google, Knoema, Netfonds, Oanda, Quandl, Yahoo, Xignite, and/or the like. In one implementation, the HFT participant 202x may parse the CSV file to obtain market data information. An example of the pseudo-code segment to test the CSV file from Quandl may take a form similar to the following:

```
library(tseries) # Loading tseries library
mtgoxusd <-
    read.csv('http://www.quandl.com/api/v1/datasets/BITCOIN/
    MTGOXUSD.csv?&trim_start=2010-07-17&trim_end=2013-07-
    08&sort_order=desc',
    colClasses=c('Date'='Date'))
```

In another implementation, the market center 240 may generate a (Secure) Hypertext Transfer Protocol ("HTTP(S)") POST message including market data feeds for the HFT participant 202x in the form of data formatted according to the XML. An example listing of market data feeds 206, substantially in the form of a HTTP(S) POST message including XML-formatted data, is provided below:

```
POST /market-data.php HTTP/1.1
Host: www.ad-exchange.com
Content-Type: Application/XML
Content-Length: 867
<?XML version = "1.0" encoding = "UTF-8"?>
<market_data>
    <order_id> 4SDASDCHUF ˆGD& </order_id>
    <timestamp>2014-02-22 15:22:44</timestamp>
    <exchange_id> NYSE_00123 </exchange_id>
    <exchange_name> NYSE_Euronext </exchange_name>
    ...
    <listing>
        <item_1>
            <id> KO </id>
            <bid> 38.56 </bid>
            <offer> 38.59 </offer>
            ...
        </item_1>
        <item_2>
            <id> KNM </id>
            <bid> 123.33 </bid>
            <offer> 124.01 </offer>
            ...
        </item_2>
        ...
    </listing>
    ...
</market_data>
```

In one implementation, the HFT participant 202x, upon obtaining market data feeds 206, may generate a trading order (in Step 207) based on their trading strategy, e.g., a bidding request based on the most-up-to-date bid and offer price, etc., and to find/query a POP for order submission (also in Step 207). For example, in one implementation, the TLL may route the trade order to a POP based on the participant's geo-location, intended trading exchange type, and/or the like. For example, the HFT participant 202x may issue PHP/SQL commands to query a database table (such as FIG. 6, POP 919c) for a POP. An example POP query (performed in Step 207) illustrating querying for a POP 210 based on the HFT participant's location and intended trading exchange, substantially in the form of PHP/SQL commands, is provided below:

```
<?PHP
header('Content-Type: text/plain');
mysql_connect("254.93.179.112?,$DBserver,$password); // access
database server
mysql_select_db("TLL_DB.SQL"); // select database table to search
//create query
$query = "SELECT POP_id FROM POPTable WHERE exchange_id
    LIKE '%' $NYSE OR zipcode LIKE $10036";
$result = mysql_query($query); // perform the search query
mysql_close("TLL_DB.SQL"); // close database access
?>
```

The HFT participant 202x may submit a bidding/offering request 209, and such request is delivered to the POP 210. For example, the trading order including the bidding/offering request 209 may be entered by an individual via an electronic trading user interface, e.g., see FIG. 4B, etc. In another example, trading orders may be entered via a blackbox trading system, order entries (e.g., FIX protocol, etc.), automatic data trading center, and/or the like. An example listing of the bidding/offering request 209, substantially in the form of XML-formatted data, is provided below:

```
POST /bidding_request.php HTTP/1.1
Host: www.HFT-trading.com
Content-Type: Application/XML
Content-Length: 867
<?XML version = "1.0" encoding = "UTF-8"?>
<bidding_request>
    <order_id> 4SDASDCHUF ^ GD& </order_id>
    <timestamp>2014-02-22 15:22:44</timestamp>
    <pop_id> NJ-001 </pop_id>
    <pop_exchange_id> NYSE </pop-exchange_id>
    ...
    <client_details>
        <client_IP> 192.168.23.126 </client_IP>
        <client_type>workstation</client_type>
        <client_model>Dell Workstation S3000 </client_model>
        <OS> UNIX </OS>
        ...
    </client_details>
    <instrument_id> KO </instrument_id>
    <bidding_price> 38.57 </bidding_price>
    ...
</bidding_request>
```

In one implementation, the POP 210 may be housed at the same place with a market center 240, e.g., based on geolocation proximity, etc. In another implementation, the POP 210 may be integrated with a centralized TLL server 220, e.g., all trading orders may be routed to a remote POP/TLL server prior to routing to the market center 240 for execution.

In one implementation, the POP 210, upon receiving a bidding/offering request 209 from the HFT participant 202x (and/or other participants), may pass on the order request 211 to TLL 220, which may route the order request to the market center 240 for execution. In one implementation, other market participants 202a-n, e.g., whose physical location is further from the market center 240, and/or receive a relatively slower consolidated market feeds, etc., may receive the market data updates 212a-b. In one implementation, the market participant 202n may similarly submit a bidding/offering request 214, which may be routed to the POP 210.

In one implementation, the POP 210 may receive the received bidding/offering requests (e.g., 209, 214, etc.), e.g., via a communication link such as a cable connection, etc., and submit the trade orders including the bidding/offering data 215 to the TLL 220 for execution, and/or being routed from TLL to the market center (e.g., another exchange, etc.) 240 for execution. In one implementation, such trade orders 215 may be sent in a batch, e.g., in a pseudo-synchronized manner, etc. In another implementation, the POP 210 may not need to "hold" and/or estimate the "time" to submit bidding/offering data 215 to the market center 240 for execution, as the re-routing via a transmission medium (e.g., cable, microwave, etc.) at POP 210 has inherently created latency so that trading orders 209 from the HFT participant 202x may not have arbitrage over trading orders 214 from other participants 202a-n.

In one implementation, the TLL 220 and/or a market center 240 may execute the received orders 216, e.g., to facilitate a transaction if any bidding/offering matches. In one implementation, the TLL may generate a transaction record 218 (e.g., trades executed at the TLL 220, and/or information relating to trades executed at other market center 240, etc.) for the TLL server 220 to store at the TLL database 219. In one implementation, the POP 210 may place a timestamp on the transaction record 218 as the trading order being passed on via POP. For example, such transaction record 218 may include timing parameters with regard to the HFT orders and orders from other market participants 202a-n for the TLL server 220 to analyze whether the arbitrage has been successfully reduced. Such record 218 may be generated periodically, intermittently and constantly, and/or upon requests from the TLL server 220.

An example listing of a transaction record 218 substantially in the form of XML-formatted data, is provided below:

```
POST /record.php HTTP/1.1
Host: www.TLL.com
Content-Type: Application/XML
Content-Length: 867
<?XML version = "1.0" encoding = "UTF-8"?>
<record>
    <timestamp> 2014-02-22 15:22:45</timestamp>
    <order_id> 4SDASDCHUF ^ GD& </order_id>
    <timestamp>2014-02-22 15:22:44</timestamp>
    <pop_id> NJ-001 </pop_id>
    <pop_exchange_id> NYSE </pop-exchange_id>
    ...
    <POP_receive_order> 2014-02-22 15:22:38 </POP_receive_order>
    <POP_send_order> 2014-02-22 15:22:42 </POP_send_order>
    <Exchange_ack> 2014-02-22 15:22:45 </Exchange_ack>
    ...
    <transaction>
        <timestamp> 2014-02-22 15:22:45</timestamp>
        <client_details>
        <client_IP> 192.168.23.126 </client_IP>
        <client_type>workstation</client_type>
        <client_model>Dell Workstation S3000 </client_model>
        <OS> UNIX </OS>
        ...
        </client_details>
        <instrument_id> KO </instrument_id>
        <bidding_price> 38.57 </bidding_price>
        <ask_price> 38.56 </ask_price>
        <shares> 100,000 </shares>
        <status> complete </status>
        ...
    </transaction>
    ...
</record>
```

Figure 3:
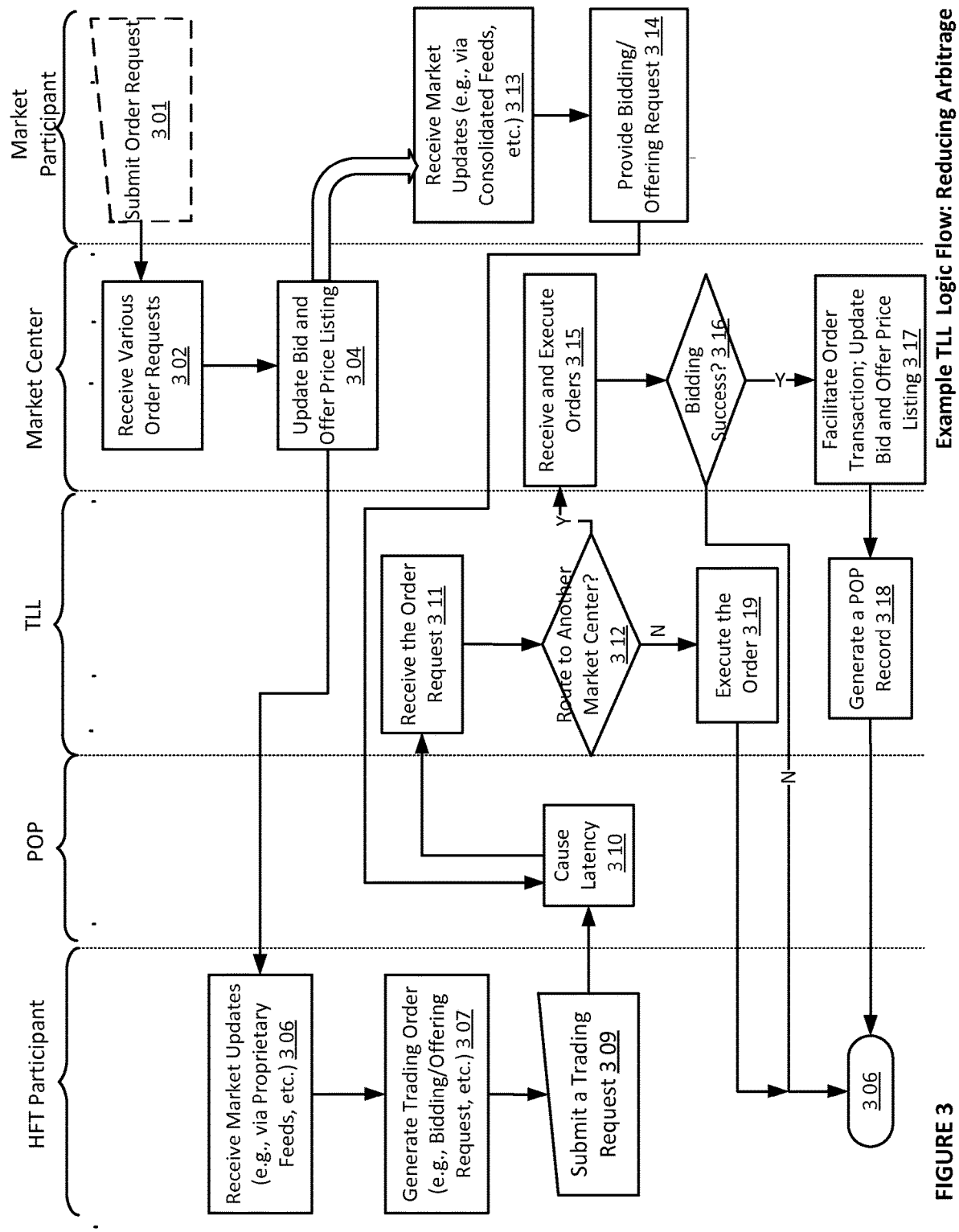
FIG. 3 provides a logic flow illustrating aspects of POP routing to reduce latency arbitrage within embodiments of the TLL.

FIG. 3 provides a logic flow illustrating aspects of latency arbitrage reducing via POP routing within embodiments of the TLL. Within embodiments, various market participants may submit order requests to a market center, e.g., 301. Such order requests may be directly submitted to the market center, and/or be submitted to the POP and passed on to TLL for execution as discussed in FIG. 2. In one implementation, the market center upon receiving order requests 302, may update the current bid and offer price listing 304. In another implementation, the market center may obtain bid and offer price listing data from a data exchange, e.g., NBBO, etc.

In one implementation, the market center may provide data feeds to various market participants, including HFT participants, and/or other non-HFT participants. In one implementation, as discussed in FIG. 1B, the HFT participants, upon subscribing to proprietary feeds, may receive market updates faster in Step 306, and thus may generate trading orders in Step 307 based on the received proprietary feeds. The HFT participant may submit a trading request in Step 309, which may be received at the POP access point to cause latency in Step 310, e.g., based on the physical location of the HFT participant, the type of financial instrument included in the trading request, the intended exchange, and/or the like. In one implementation, the POP may pass on the trading request to TLL, which may receive an order request in Step 311 and route the order request, and may not need to hold the order request from the HFT participant in Step 311. In one implementation, the TLL may execute the trading order at TLL, and/or may determine whether to route to another data center in Step 312 for execution. If not, the TLL may execute the order in Step 319.

In another implementation, other market participants, e.g., non-HFT participants, may receive market updates, e.g., via consolidated market data feeds 313, which may have relative latencies. In one implementation, the market participant may generate a trading order and provide such order including a bidding/offering request 314 to the TLL POP. In alternative implementations, for non-HFT market participants who do not enjoy a close physical location to the market center, the TLL may or may not request such participants to submit trading orders to the POP.

In one implementation, upon the TLL/POP releasing a trading order 312, the market center may receive and execute the order 315. For example, the market center may parse the order to retrieve the financial instrument ID, bidding/offering price, and determine whether it constitutes a successful bid 316. If yes, the market center may facilitate order transaction, and update the current bid and offer price listing based on the new transaction 317.

In one implementation, the TLL/POP may generate a POP record 318 (e.g., see 218 in FIG. 2, etc.), which may record the timing parameters of the order routing and latency, and may be used for analytics of arbitrage reducing performance.

Figure 4A:

FIGS. 4A-4B provide an exemplary UI diagram illustrating TLL POP routing system configuration and/or customer settings within embodiments of the TLL. FIG. 4A provides an exemplary management UI for POP allocation. For example, in one implementation, a TLL administrator may view the distribution of POP entities 411, e.g., arranged by the zip code and/or area code 412. In one implementation, as shown in FIG. 4A, the TLL dashboard may provide the location of each POP in the region, and details with regard to the POP entity 413, e.g., server IP, address, distance (transmission time) to the serving exchange/market center, etc. In one implementation, a TLL administrator may allocate an HFT participant 416 to one or more POP entities. For example, such allocation may be based on the HFT participant's geo-location, trading volume, trading pattern, intended exchange, and/or the like. Within implementations, the distances between the TLL and other market centers may be a factor in determining POP location; in other implementations, such distances may not be taken into consideration because the POP "distance" may be calibrated by the cable length etc. The location of the POP relative to other market centers may become critical if the POP is far away from other market centers and therefore the distance increases the latency too much and over compensates potentially resulting in inferior trading experience for participants.

For example, the TLL may set up different POP entities for the TLL administrator. For example, the TLL may allocate a POP located in New Jersey to the HFT participant for any orders intended for NYSE 417; or a POP located in New York for any orders intended for NASDAQ 418, and/or the like. In one implementation, the TLL may allow the administrator to test the allocation, e.g., by showing the estimated transmission time from the allocated POP to the intended data exchange, etc.

With reference to FIG. 4B, in some implementations, a customer of a broker may login to a web-based dashboard application to review the portfolio. For example, the customer may view a list of live bidding and offering feeds 401, and may view the customer investment profile 405 to modify settings 406-407.

For example, a customer may wish to set conditions on the execution of an order placed with a broker. Although a broker may need to generally abide by its customer's instructions, in present markets brokers may have a certain degree of discretion as to how the customer's order is executed, thus allowing the market to execute an order which may be different from the ultimate customer's instructions at the brokers' discretion.

In one implementation, the TLL may provide an UI to allow a broker's customer to set discretionary settings 407 directly with the market. These settings may indicate when the customer intends to trade based on one or more of the following factors: symbol, market capitalization, current spread as compared to historical spread, displayed liquidity, correlated instrument pricing, strategy type, average daily volume, order size as compared to average daily volume, minimum fill size, notional value, price, minimum trade size, discretionary price, and/or urgency, order type and/or the like.

In one implementation, the customer may then instruct the broker to route orders to the market with an indication identifying the customer. The market may recognize the indication, match the order to the discretionary settings previously set by the customer, and follow the customer's discretionary settings in executing the order, which may eliminate the ability of brokers to deviate from customer order instructions where technicalities create ambiguities and the resulting order handling potentially runs contrary to the customer's instructions to the broker or the customer's best interest.

For example, a customer may configure a "synthetic all or none" order type via the settings 416-418. In one implementation, the electronic trading order may be executed in an "all-or-none" (AON) manner, which may only execute when there is sufficient liquidity on the market to fill the entire order. If there is sufficient liquidity to fill only part of the order, an order marked AON may not be executed at all, while an order not marked AON may execute against the liquidity and remain partially unfilled. In one implementation, a limitation of this order type is that it may only execute against liquidity on a single market. For example, such AON order may not be filled with liquidity from more than one market.

In one implementation, the TLL may execute a "Synthetic AON" order type. For example, with this order type, a market participant may specify a minimum quantity to be executed and a price at which the participant would execute the order. The TLL may determine if the minimum quantity can be executed against the total of displayed and non-displayed liquidity on the TLL itself and displayed liquidity on all other trading venues to which the TLL routes orders. If there is sufficient combined liquidity to execute the order at a price no less favorable to the market participant than the specified price, the order may be partially executed at the TLL and partially routed to other trading venues such that the minimum quantity will be filled by the executed part of the order and the routed part of the order. It is possible the one or more of the routed orders will be partially filled, or not filled at all, so unlike the traditional AON order type, the Synthetic AON order is executed on a "best efforts" basis. To minimize the impact of the initial trade executed by the TLL on routed order executions and the ability of other participants to take advantage of the Synthetic AON order type by using the TLL execution as a signal and racing the TLL routed orders to other market centers, the TLL will, when routing the order(s), ensure that no market participant will receive information about the TLL order execution until the routed orders have travelled sufficiently far as to eliminate the possibility of being raced to their destination. This process may include use of the point of presence facility described above. In one implementation, the POP structure may improve the effectiveness of the Synthetic AON orders, although there may not be any general guarantee of a full fill.

In further implementations, the TLL may match and/or prioritize orders according to a variety of factors, e.g., price, display, broker, time priority, etc. The best priced order in the Order Book may have precedence over all other orders. At the same price, displayed orders may have precedence over non-displayed orders. At the same price and display status, a broker's resting orders may have precedence over other brokers' orders, when that broker's order is testing against the Order Book. Among a broker's own orders, orders marked as Agency may have precedence over orders marked Principal. Among all orders competing at the same priority level, the oldest order will have precedence. Among all displayed orders at a given price, precedence may be given first to orders marked Agency, in time priority, and then to orders marked Principal, in time priority, belonging to the same Subscriber as the order being processed, and then to all other displayed orders at that price in time priority; the oldest orders having the higher precedence. Among all non-displayed orders at a given price, precedence may first be given to orders marked Agency, in time priority, and then to orders marked Principal, in time priority, belonging to the same Subscriber, and then to all other non-displayed orders at that price in time priority; the oldest orders having the higher precedence. In one implementation, specific order condition parameters, such as Minimum Quantity, may be elected for non-displayed orders and Immediate Or Cancel ("IOC") orders. In the event that a resting order having precedence on the TLL's Order Book may not be executed due to its specific conditions, that resting order will surrender its precedence in the Order Book for the duration of that processing cycle.

In one implementation, each time the TLL initiates a re-pricing, display refresh, book recheck or routing action (collectively, "Book Action") on an order resting on the Order Book, it may do so in price/time priority, with the timestamp of the portion of the order upon which the action is taken being used to determine time priority, and with the order's, or portion of the order's, resting price on the Order Book being used to determine price priority.

In one implementation, each time the TLL re-prices a displayed order, or displayed portion of a reserve order, the TLL will assign a new time stamp to the order (or portion of the order), for the determination of time in price/time priority of the Order Book.

Figure 5A:
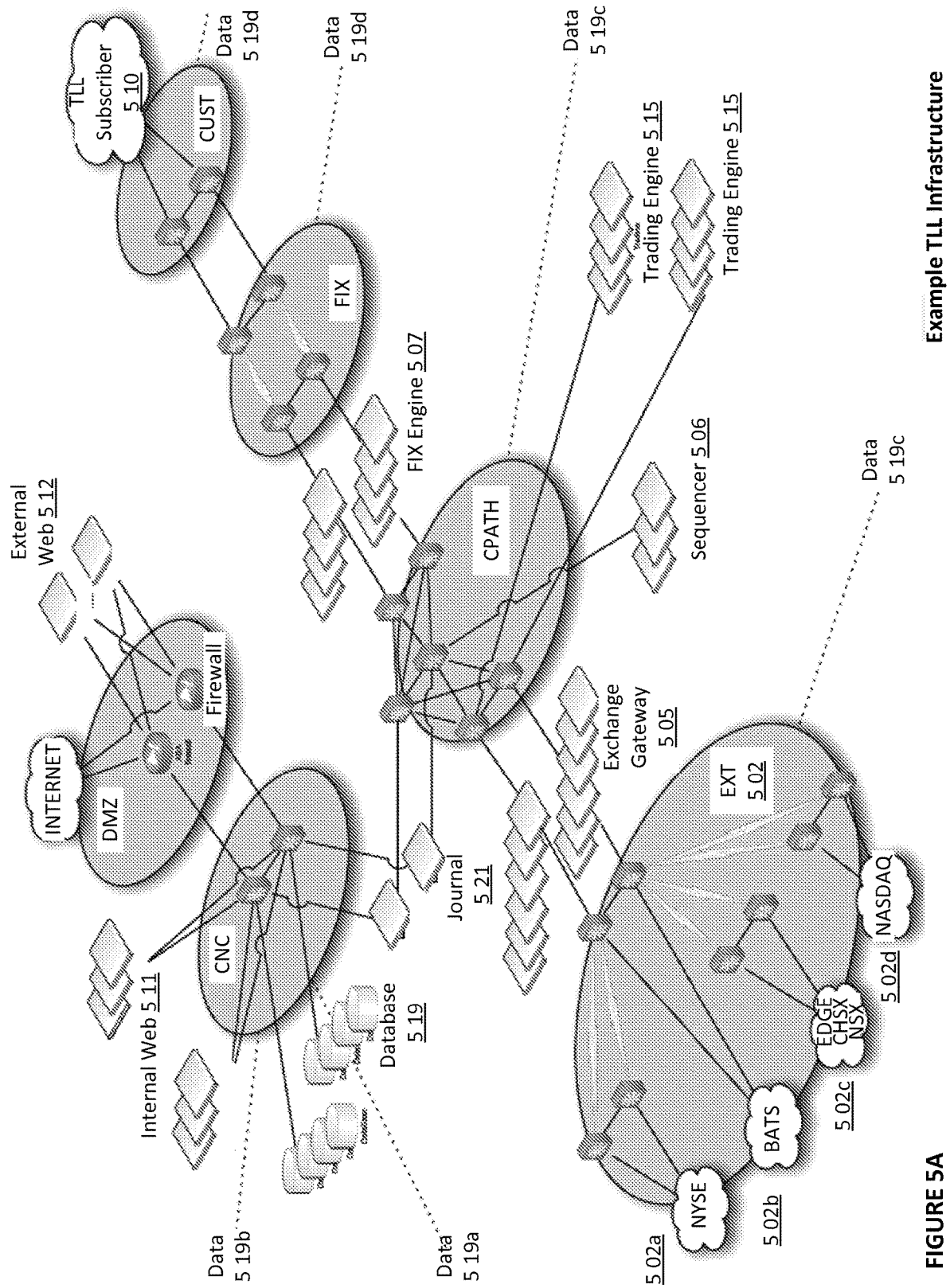
Figure 5C:
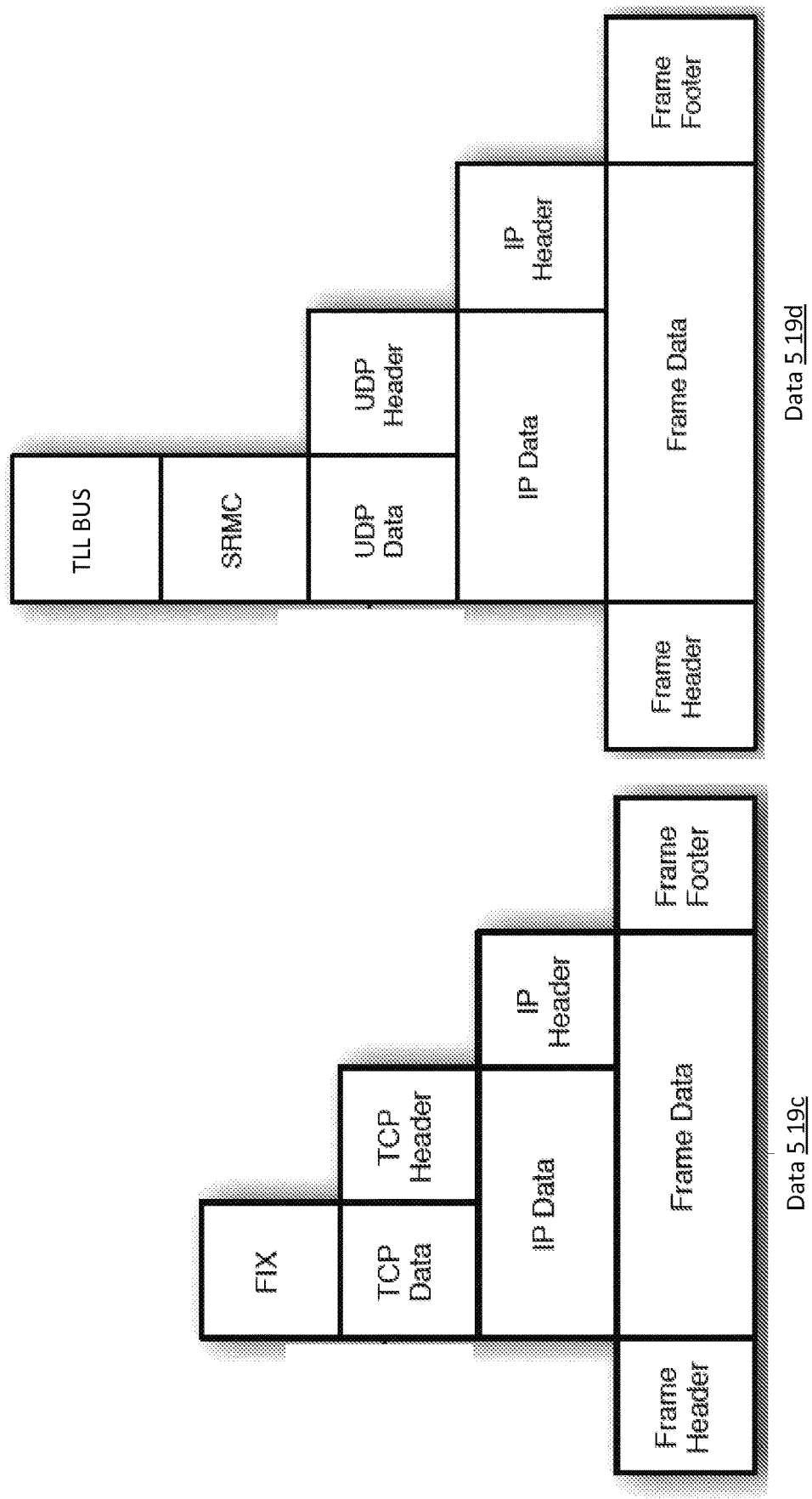

FIGS. 5A-5C provide exemplary data diagrams illustrating aspects of TLL network infrastructure within embodiments of the TLL. In one implementation, TLL subscribers 510, e.g., individual investors, trading entities, and/or other market participants, may be connected to POP access points, e.g., access points running FIX protocols, to communicate with a FIX engine 507. In one implementation, the POP FIX/CUST access points may comprise hardware structures located in the same and/or a separate data center with the trading engine 515. In one implementation, the FIX engine 507 may comprise logic components that receive and transmit data via FIX protocol. Exemplary data message packet structure 519d is provided in FIG. 5C.

For example, TLL subscribers 510 may electronically send orders to buy and sell securities traded on the TLL (e.g., acting as a data exchange itself, etc.) through the use of the FIX API. In one implementation, direct access to the TLL may be available to subscribers at an Internet Protocol ("IP") address via communications that are compliant with the FIX API provided by the TLL.

In one implementation, a sequencer 506 may parse the data and send data to a trading engine 515. Exemplary data message packet structure 519c is provided in FIG. 5C. In one implementation, the trading data (e.g., bidding/offering request, etc.) may be sent to an exchange gateway 505 to be executed at an exchange 502, e.g., NYSE 502a, BTLL 502b, EDGE, CHSX, NSX 502c, NASDAQ 502d, and/or the like. In one implementation, the TLL may send trading data to storage at a database 519; in one implementation, the TLL may publish trading data via the CNC which may publish data feeds via an internal web 511, and/or via the DMZ to publish data feeds at an external web 512, etc. Exemplary data message packet structures 519a-b are provided in FIG. 5B.

In further implementations, the TLL may provide a variety of routing options to route orders to another market center (e.g., see 134 in FIG. 1D, etc.). Routing options may be combined with various order types and TIF's, with the exception of order types and Time in Force (TIF's) whose terms are inconsistent with the terms of a particular routing option. Within implementations, the TLL may maintain one or more system routing tables for determining the specific trading venues to which the System routes orders, including orders routed with the intention of resting on an away trading venue, and the sequence in which the System routes them. The TLL may reserve the right to maintain a different system routing table for different routing options and to modify the system routing table at any time without notice.

For example, the TLL may implement a Route to Take protocol, e.g., a routing option under which the system checks an order against the order book for available shares and routes any remaining unexecuted shares as an immediate-or-cancel orders to destinations on the system routing table. If shares remain unexecuted after routing, they are posted on the order book. Once on the order book, should the order subsequently be locked or crossed by another accessible market center, the System may route the order or portion of the order to the locking or crossing market center if marked re-routable by the Subscriber (e.g., the client, an investor, etc.)

As another example, the TLL may implement a Route to Rest protocol, under which the TLL System may check an order against the Order Book for available shares and routes any remaining unexecuted shares as immediate or cancel orders to destinations on the System routing table. If shares remain unexecuted after routing, the System will split the display size of the order between the Order Book and another venue, as determined by the TLL routing table. For any execution to occur on the TLL during the Pre-Market Session or the Post-Market Trading Session, the applicable order price must be equal to or better than the highest Automated Quotation Bid or lowest Automated Quotation Offer ("NBBO"), unless the order is marked ISO or an Automated Quotation Bid is crossing an Automated Quotation Offer (or unless the execution falls within another condition, e.g., as analogous to an exception set forth in Rule 611(b) of Regulation NMS).

In one implementation, unless otherwise specified by Subscriber order instructions, incoming orders may first be tested for execution matches against the Order Book, and any unexecuted shares will be cancelled, posted on the Order Book, or routed executions may occur when an order to buy and an order to sell match on the Order Book and may occur when an order routed to an away venue is matched by that venue. The System will process incoming orders to the System in the sequence in which they are received, including unexecuted orders or portions of orders returning from orders routed to away venues. While orders or portions of orders are routed to away venues, those orders or portions of orders are not part of the System incoming order process queue, allowing the process of subsequent sequential orders to take priority.

In executing orders submitted to the Order Book, the System may not distinguish between orders submitted by Subscribers for their own accounts and orders submitted by Subscribers for their customers, with the exception of Broker Priority functionality. Within Broker Priority, priority is given to resting Agency orders over resting Principal orders for a given broker.

In one implementation, Subscribers may submit orders to the System from remote locations and have equal access to orders residing on the Order Book. Similarly, because orders on the TLL may be executed automatically, no Subscriber may have the ability to control the timing of execution other than to change or cancel an order prior to execution. An order to buy submitted to the Order Book may be automatically executed by the System to the extent that it is priced at an amount that equals or exceeds any order to sell for the same security submitted to the Order Book, and that any specific conditions elected on such order by the submitting Subscriber are satisfied. Such order to buy may be executed at the price of the lowest-priced order to sell having precedence on the Order Book.

In one implementation, an order to sell submitted to the Order Book may be automatically executed by the System to the extent that it is priced at an amount that equals or is less than any order to buy for the same security submitted to the Order Book, and that any specific conditions elected on such order by the submitting Subscriber are satisfied. Such order to sell shall be executed at the price of the highest-priced order to buy having precedence on the Order Book. In the event that less than the full size of a resting order is executed, whether displayed or non-displayed, the unexecuted size of the order may continue to reside on the Order Book, consistent with the Subscriber's instructions, and if displayed, may be redisplayed at such price. Such partially executed orders retain priority and precedence at the same price. Upon a change to the Order Book, the NBBO, or as part of the processing of inbound messages, the System may test orders on one or both sides of its market against the contra side of the Order Book to determine if new executions can occur as a consequence of the change in the TLL inside market or NBBO. Non-displayed resting orders with minimum quantity conditions, and/or more aggressive limits than the prices at which they are currently resting on the Order Book may be eligible to trade against orders in the updated Order Book, which were ineligible, or did not satisfy the orders' conditions, when they were originally booked. Resting orders are rechecked according to the booked price/time priority of each. Orders rechecking the Order Book may not trade through Protected Quotations, or resting orders on the contra side of the Order Book.

In the case where TLL does not have eligible shares priced equal to or better than the NBBO, or all such eligible shares have been exhausted and unexecuted shares remain, the System may process incoming orders based on routing eligibility. For orders marked eligible for routing and are marketable against the NBBO, the System may route to away Trading Centers displaying superior priced Protected Quotations in a manner consistent with Subscriber order instructions, order type and routing strategy definitions, and the "TLL routing table".

FIGS. 6A-6H provide exemplary diagrams illustrating various scenarios of managing latency arbitrage and order book arbitrage via a network access point that causes additional data transmission latency within embodiments of the EBOM. In one implementation, market participants may take advantage of data transmission patency differences between exchanges (and/or other market centers) that trade fungible securities. In one implementation, latency arbitrage may be applied in scenarios such as, but not limited to when a broker is responsible for routing orders, on behalf of an investor, between markets through a Broker Smart Order Router (BSOR); or when an exchange (or other market center) is responsible for routing orders, on behalf of both the broker and investor, between markets through an Exchange Smart Order Router (ESOR), and/or the like.

Figure 6A:
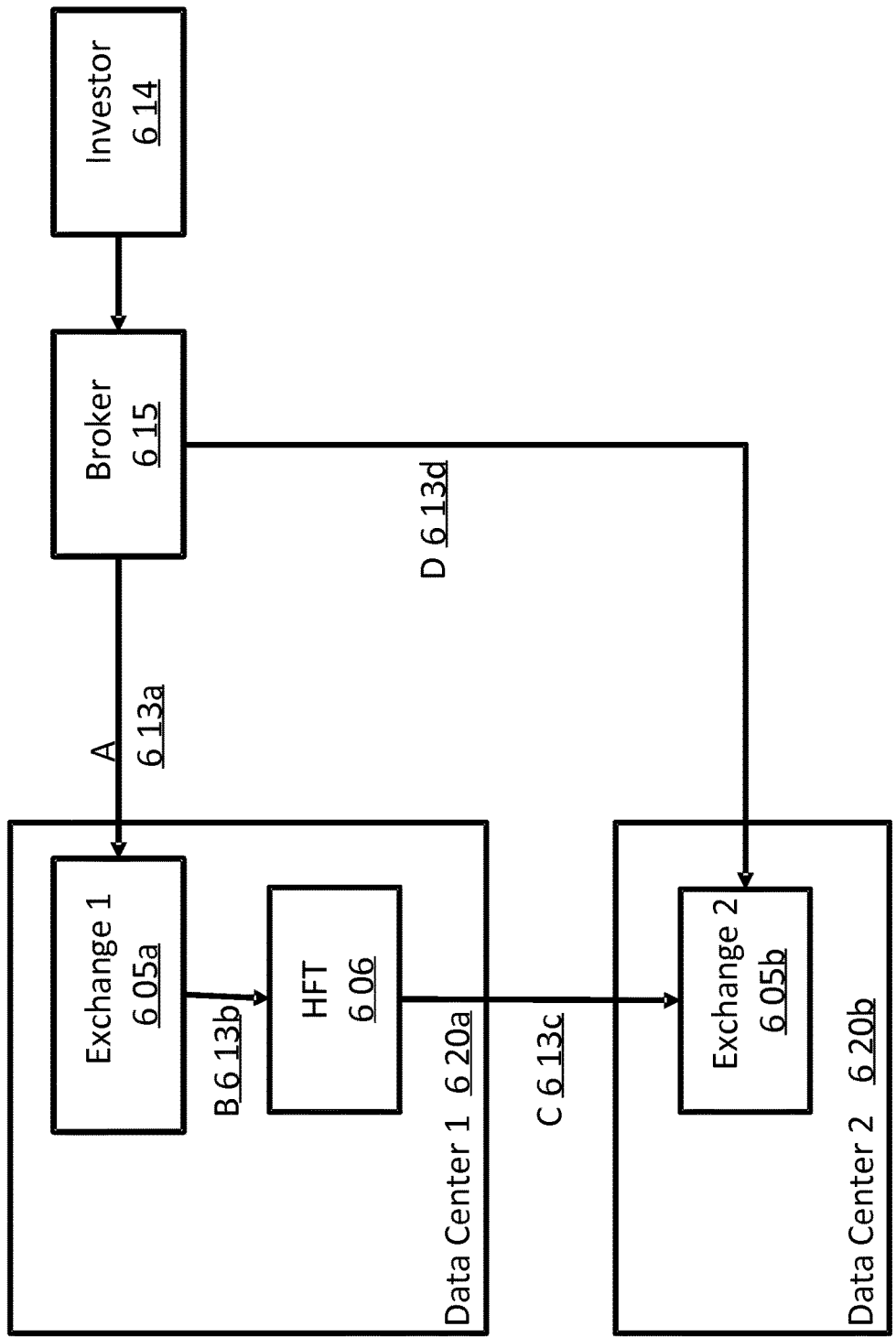

FIG. 6A illustrates an example showing aspects of latency arbitrage incurred via a BSOR. For example, Exchange 1 605a may have an offer to sell 1,000 shares of XYZ stock at $10.00 and Exchange 2 605b may have an offer to sell 2,000 shares of XYZ at $10.00 (the offer on Exchange 2 605b was previously entered by HFT 606. The national best offer is the combined offers prices of 3,000 shares of XYZ to sell at $10.00).

In one implementation, an investor 614 may want to purchase 3,000 shares of XYZ at $10.00 and may subsequently send an order to broker 615 to buy 3,000 XYZ at $10.00. Upon receiving investor's order, broker 615 may route a buy order A 613a to Exchange 1 605a to purchase 1,000 shares of XYZ at $10.00 and buy order D 613d to Exchange 2 605b to purchase 2,000 shares of XYZ at $10.00. Orders A 613a and D 613d may have different latencies due to physical distance (and thus different transmission time along the physical transmission medium such as cable, microwave, etc.) of Exchange 1 605a and Exchange 2 605b from the broker 615; other factors such as connectivity, network equipment, information technology infrastructure, network circuit resistance, and a variety of other reasons may cause different latencies in transmission time as well.

In one implementation, broker order A 613a may arrive at Exchange 1 605a and the investor 614 (e.g., through broker 615) indicating purchases of 1,000 shares on Exchange A at $10.00. In one implementation, HFT may receive a trade report B 613b from Exchange 1 605a. In one implementation, co-location allows HFT to receive that trade report B 613b in "tens of microseconds". In one implementation, HFT may then send order revision C 613c (of its previously entered order to sell 2,000 XYZ at $10.00) to Exchange 2 605b in an attempt to profit from knowledge that a trade has occurred on Exchange 1 605a in XYZ at $10.00, for example by anticipating that another buy order (D) is en route to Exchange 2 605b and adjusting order C 613c upward to a price of $10.01. In this example order D 613d with a limit to buy at $10.00 may not execute, and broker may be forced to send another order to buy at $10.01. The net result is that if a new buy order is executed on Exchange 2 605*b*, the investor 614 may end up paying $20.00 more to buy the remaining 2,000 shares of XYZ ($0.01*2000=$20.00). The latency of order C 613*c* may be determined by connectivity and method of information transportation (e.g. microwave vs. fiber). As such, if latencies (transmission time of A+ transmission time of B+ transmission time of C)<transmission time of D then the broker 615 (on behalf of investor 614) may not be able to execute their buy order of 2,000 shares of XYZ at $10.00 at Exchange 2 605*b*. As a result, the order may go unfilled at that moment in time, or the investor 614 may have to pay a higher price to purchase their remaining 2,000 shares.

FIG. 6B shows an example illustrating aspects of managing latency arbitrage via BSOR with inoculation of a POP access point within embodiments of the EBOM. In one implementation, Exchange 1 605A may have an offer to sell 1,000 shares of XYZ stock at $10.00 and Exchange 2 605*b* has an offer to sell 2,000 shares of XYZ at $10.00 (the on Exchange 2 605*b* was previously entered by HFT 606. The national best offer is the combined offers of 3,000 shares of XYZ to sell at $10.00). The investor 614 may want to purchase 3,000 shares of XYZ at $10.00 and send an order to the broker 615 to buy 3,000 XYZ at $10.00. The broker 615 receives the investor 614's order and routes buy order A to purchase 1,000 shares of XYZ at $10.00 to Exchange 1 605A and buy order D to purchase 2,000 shares of XYZ at $10.00 to Exchange 2 605*b*. Orders A and D have different latencies due to physical distances to Exchange 1 605A and Exchange 2 605*b* from the broker 615, connectivity, network equipment, and a variety of other reasons; other factors such as connectivity, network equipment, information technology infrastructure, network circuit resistance, and a variety of other reasons may cause different latencies in transmission time as well.

The broker 615's order A 613*a* arrives at Exchange 1 605A and the investor 614 (through the broker 615) purchases 1,000 shares on Exchange 1 605A at $10.00. HFT 606 receives trade report B 613*b* from POP 610. The EBOM POP Architecture POP 610 allows any EBOM subscriber (including HFT 606) to receive trade information (transmission time of Aii+ transmission time of B) in "hundreds of microseconds".

In one implementation, HFT 606 may then send order revision C 613*c* of its previously entered order to sell 2,000 XYZ at $10.00) to Exchange 2 605*b* in an attempt to profit from knowledge that a trade has occurred on Exchange 1 605A in XYZ, for example by anticipating that another buy order (D) is en route to Exchange 2 605*b* and adjusting order C upward to a price of 10.01. In this example order D with a limit to buy at $10.00 would not execute, and the broker 615 may be forced to send another order to buy at $10.01. The net result is that if a new buy order is executed on Exchange 2 605*b*, the investor may pay $20.00 more to buy the 2,000 remaining shares of XY XYZ ($0.01*2000=$20.00). The latency of order C may be determined by connectivity and method of information transportation (e.g. microwave vs. fiber).

However, the EBOM POP Architecture POP 610 may allows a BSOR the opportunity to protect the client's order from latency arbitrage adding latency (through distance or medium) to the amount of time before HFT 606 may receive trade report B and use it as a signal because (transmission time of A+ transmission time of Ai+ transmission time of Aii+transmission time of B+ transmission time of C)>transmission time of D. In this instance, the broker 615 (on behalf of the investor 614) may have enough time to execute buy order D 613*d* of 2,000 shares of XYZ at $10.00 on Exchange 2 605*b* prior to HFT 606's order revision C 613*c* reaching Exchange 2 605*b*. As a result, the order A 613*a* may be completely filled at the limit price and the investor 614 may not have to pay a higher price to purchase their remaining 2,000 shares via a new buy order as shown in FIG. 6A.

Figure 6C:
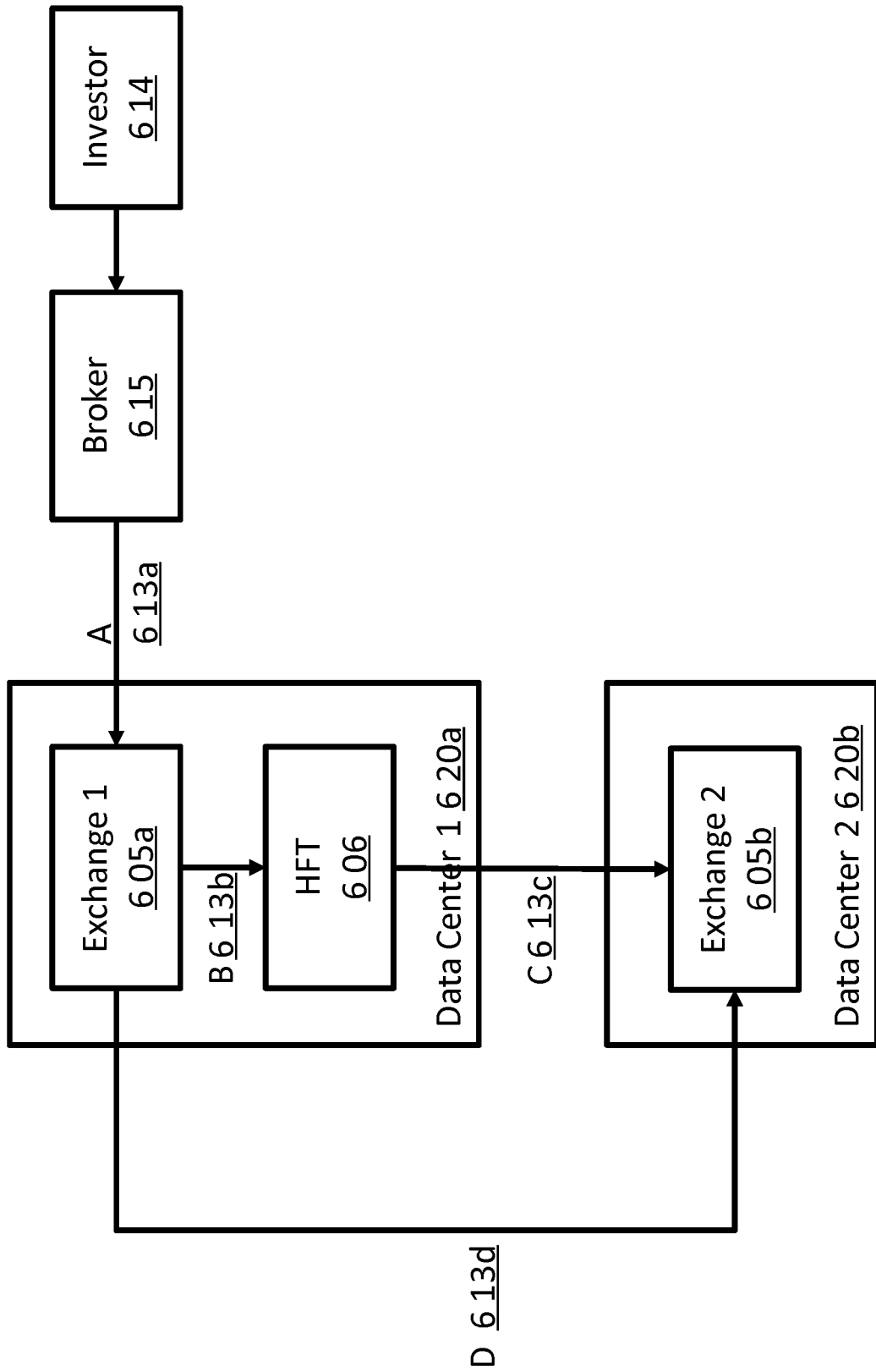

FIG. 6C provides an example illustrating latency arbitrage incurred via ESOR within embodiments of the EBOM. In one implementation, Exchange 1 605*a* may have an offer to sell 1,000 shares of XYZ stock at $10.00 and Exchange 2 605*b* has an offer to sell 2,000 shares of XYZ at $10.00 (the offer on Exchange 2 605*b* was previously entered by HFT 606. The national best offer is the combined offer prices of 3,000 shares of XYZ to sell at $10.00). The investor 614 may want to purchase 3,000 shares of XYZ at $10.00 and send an order to the broker 615 to buy 3,000 XYZ at $10.00. The broker 615 may want to use Exchange 1 605*a*'s Smart Order Router (ESOR) and after receiving the order, routes the entire order A 613*a* to buy 3,000 shares of XYZ at $10.00 to Exchange 1 605*a*. Exchange 1 605*a* is now responsible for routing buy order D 613*d* for 2,000 shares to Exchange 2 605*b* on behalf of the broker 615 (for the investor 614).

In one implementation, the broker 615's order A 613*a* may arrive at Exchange 1 605*a* and the investor 614 (through the broker 615) may purchase 1,000 shares on Exchange 1 605*a* at $10.00. After executing the order, Exchange 1 605*a* then routes the buy order D 613*d* to Exchange 2 605*b* for the remaining 2,000 shares using Exchange 1 605*a*'s ESOR.

In one implementation, HFT 606 may receive trade report B 613*b* from Exchange 1 605*a*. In one implementation, co-location allows HFT 606 to receive that trade report B 613*b* in "tens of microseconds". HFT 606 may then send order revision C 613*c* (of its previously entered order to sell 2,000 XYZ at $10.00) to Exchange 2 605*b* in an attempt to profit from knowledge that a trade has occurred on Exchange 1 605*a* in XYZ, for example by anticipating that another buy order (D) is en route to Exchange 2 605*b* and adjusting order C upward to a price of 10.01. In this example order D 613*d* with a limit to buy at $10.00 may not execute, and the broker 615 may be forced to send another order to buy at $10.01. The net result is that if a new buy order is executed on Exchange 2 605*b*, the investor may pay $20.00 more to buy the 2,000 remaining shares of XY XYZ ($0.01*2000=$20.00). The latency of order C 613*c* may be determined by connectivity and method of information transportation (e.g. microwave vs. fiber).

In one implementation, if latencies (transmission time of A+ transmission time of B+ transmission time of C)<transmission time of D then the broker 615 (on behalf of the investor 614) may not be able to execute their buy order of 2,000 shares of XYZ at $10.00 at Exchange 2 605*b*. As a result, the order may go unfilled at that moment in time, or the investor 614 may have to pay a higher price to purchase their remaining 1,000 shares via a new buy order.

Figure 6D:
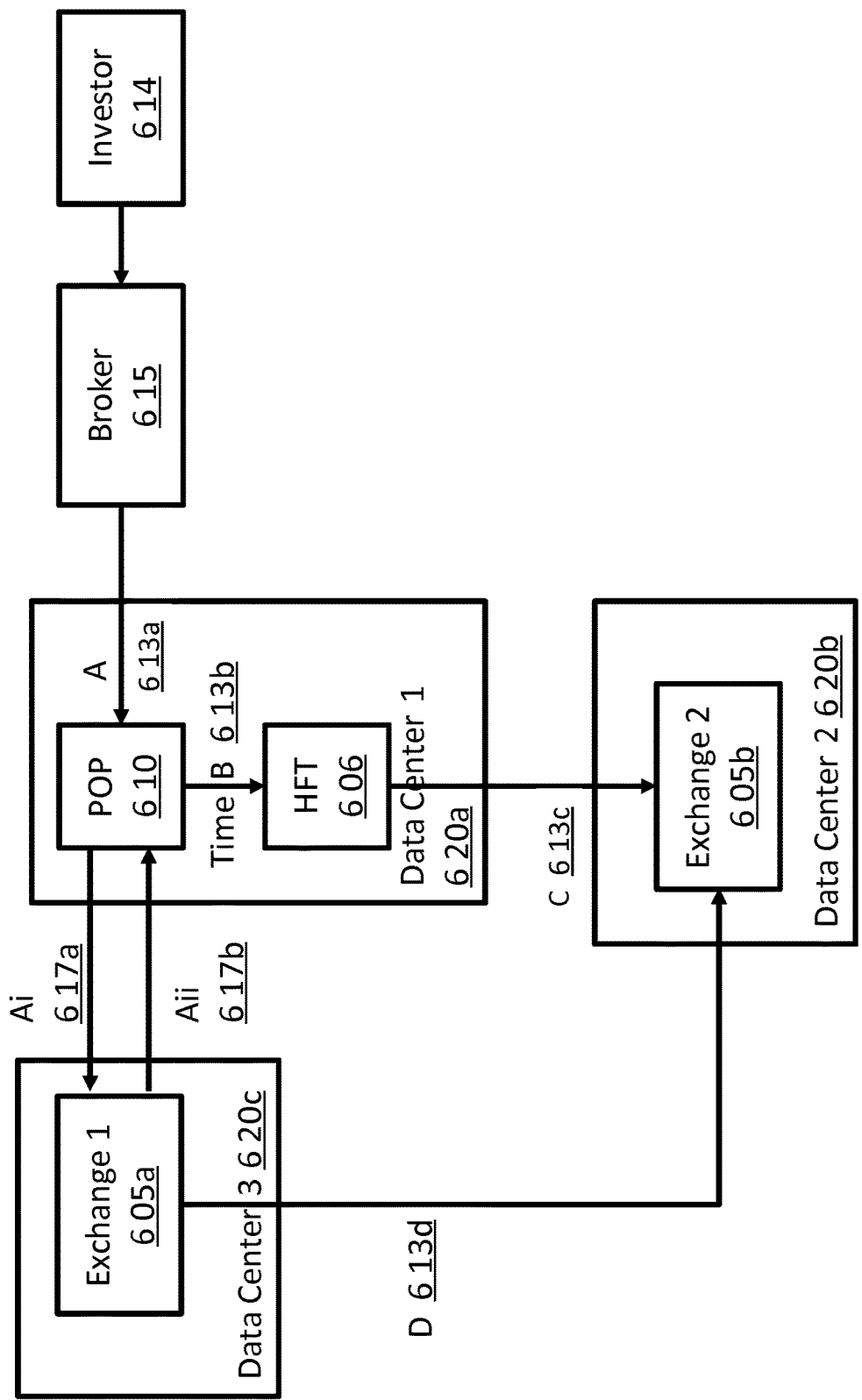

FIG. 6D provides an example illustrating managing latency arbitrage via ESOR with inoculation of a POP access point within embodiments of the EBOM. In one implementation, Exchange 1 605*a* may have an offer to sell 1,000 shares of XYZ stock at $10.00 and Exchange 2 605*b* has an offer to sell 2,000 shares of XYZ at $10.00 (the offer on Exchange 2 605*b* was previously entered by HFT 606. The national best offer is the combined offers of 3,000 shares of XYZ to sell at $10.00).

In one implementation, the investor 614 wants to purchase 3,000 shares of XYZ at $10.00 and sends an order to the broker 615 to buy 3,000 XYZ at $10.00. In one implementation, the broker 615 may want to use Exchange 1 605*a*'s Smart Order Router (ESOR) and after receiving the order, routes the entire order A 613*a* to buy 3,000 shares of XYZ at $10.00 to Exchange 1 605*a*. Exchange 1 605*a* is now responsible for routing buy order D 613*d* for the remaining 2,000 shares on behalf of the broker 615.

In one implementation, the broker 615's order A 613*a* arrives at Exchange 1 605*a* and the investor 614 (through the broker 615) purchases 1,000 shares on Exchange 1 605*a* at $10.00. After executing the order, Exchange 1 605*a* then routes the order D 613*d* to Exchange 2 605*b* using Exchange 1 605*a*'s ESOR. HFT 606 receives trade report B 613*b* from Exchange 1 605*a*. In one implementation, co-location allows HFT 606 to receive that trade report B 613*b* in "tens of microseconds". HFT 606 may then send order revision C 613*c* (of its previously entered order to sell 2,000 XYZ at $10.00) to Exchange 2 605*b* in an attempt to profit from knowledge that a trade has occurred on Exchange 1 605*a* in XYZ, for example by anticipating that another buy order (D) is en route to Exchange 2 605*b* and adjusting order C 613*c* upward to a price of 10.01. In this example order D 613*d* with a limit to buy at $10.00 may not execute, and the broker 615 may be forced to send another order to buy at $10.01. As such, the investor 614 may end up paying $20.00 more to buy XYZ ($0.01*2000=$20.00). The latency of order C may be determined by connectivity and method of information transportation (e.g. microwave vs. fiber).

However, the EBOM POP Architecture POP 610 allows an ESOR the opportunity to protect the client's order from latency arbitrage by adding latency (through distance or medium) to the amount of time before HFT 606 may receive trade report B 613*b* and use it as a signal because (transmission time of A+ transmission time of Ai+ transmission time of Aii+ transmission time of B+ transmission time of C)>transmission time of D. In this example, the broker 615 (on behalf of the investor 614) may have enough time to execute buy order D 613*d* of 2,000 shares of XYZ at $10.00 on Exchange 2 605*b* prior to HFT 606's order revision C 613*c* getting to Exchange 2 605*b*. As a result, the order may be completely filled and the investor 614 may not have to pay a higher price to purchase its remaining 2,000 shares via a new buy order as was the case in FIG. 6A.

FIGS. 6E-6H provide examples with regard to managing order book arbitrage. Within implementations, market participants may take advantage of Order Book Arbitrage, which is a strategy that allows an intermediary to profit from latency differentials between exchanges (or other market centers) that trade fungible securities. Order Book Arbitrage may be conducted passively or aggressively. For example, passive order book arbitrage may occur when an intermediary has the most up to date market data and leaves a previously submitted order resting passively at an inferior price on an exchange (or other market center) anticipating that the order may be executed by a slower participant with stale market data entering an aggressive order. On the other hand, aggressive order book arbitrage may occur when an exchange (or other market centers) is responsible for re-pricing orders resting passively on its own order book, and is slower to process market data changes at other exchanges (or other market centers) than an intermediary. An intermediary with the most up to date market data may execute trades on the slow exchange based on stale market data to the disadvantage of the orders on the exchange's (or other market centers) order book.

Figure 6E:
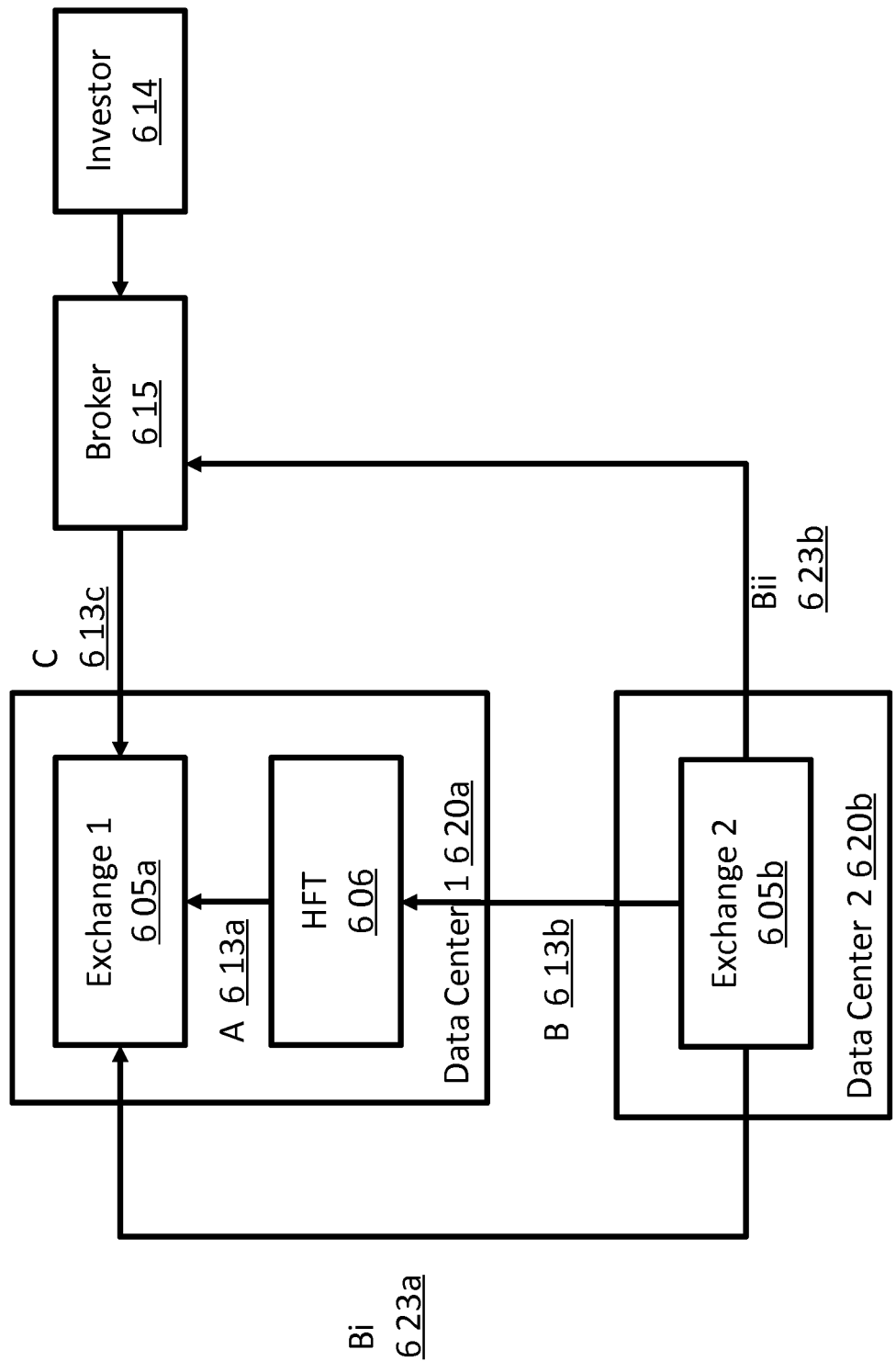

FIG. 6E provides an example illustrating passive order book arbitrage within embodiments of the EBOM. For example, in one implementation, the broker 615, HFT 606, Exchange 1 605*a* and Exchange 2 605*b* may know NBBO of XYZ as $10.00×$10.02. HFT 606 enters order A 613*a* to buy 1,000 shares of XYZ at $10.00 on Exchange 1 605*a*. Following executions of order A 613*a*, the market updates on Exchange 2 605*b* to $10.01×$10.02 and a quote update B 613*b*, Bi, and Bii is sent to HFT 606, Exchange 1 605*a*, and the broker 615, respectively, and the new NBBO becomes $10.01×$10.02. Because of the distance between them Exchange 1 605*a* and Exchange 2 605*b* now know different NBBO calculations, i.e. price dislocation of the respective exchange books: Exchange 1 605*a* ($10.00×$10.02) and Exchange 2 605*b* ($10.01×$10.02).

In one implementation, HFT 606 may receive the quote update B 613*b* so knows the new NBBO ($10.01×$10.02) on Exchange 2 605*b*. HFT 606 also knows that its order A 613*a* to buy 1,000 at $10.00 remains on Exchange 1 605*a*. Anticipating that a slower market participant (e.g. the broker 615) might try to sell XYZ on Exchange 1 605*a* at $10.00 because it has not received the most up to date market information Bii, HFT 606 leaves its buy order A 613*a* unchanged at $10.00.

In one implementation, if the broker 615 enters sell order C 613*c* to sell 1,000 shares of XYZ at $10.00 to Exchange 1 605*a* based on the previous NBBO ($10.00×$10.02) following a quote change B, Bi, Bii before the broker 615 has received Bii, and before Exchange 1 605*a* has received Bi, it is possible that order C 613*c* may receive an inferior priced execution ($10.00 vs. $10.01). In an example where Exchange 1 605*a* has an obligation to protect orders on its order book from trading at prices inferior to orders quoted on other markets (for example in the U.S. in compliance with Regulation NMS), Exchange 1 605*a* may receive quote update B 613*b*, know that there is a better priced bid ($10.01), and therefore not permit sell order C 613*c* to trade at $10.00 (an execution at $10.00 would be considered a "trade through" under Regulation NMS).

However, in a scenario where Exchange 1 605*a* receives sell order C 613*c* prior to receiving quote update B 613*b*, Exchange 1 605*a* may allow sell order C 613*c* to execute at $10.00 (because it is unaware of the quote change), a price inferior to the then current best bid of $10.01. In this case the investor 614 receives $10.00 less for the sale of XYZ (1,000*0.01=$10.00).

As such, during the interval after HFT 606 receives quote update B 613*b* 613*b* and leaves its order A 613*a* unchanged, HFT 606 may potentially buy XYZ at $10.00 and immediately sell at $10.01 on Exchange 2 605*b* making a profit at the expense of the investor 614.

Figure 6F:
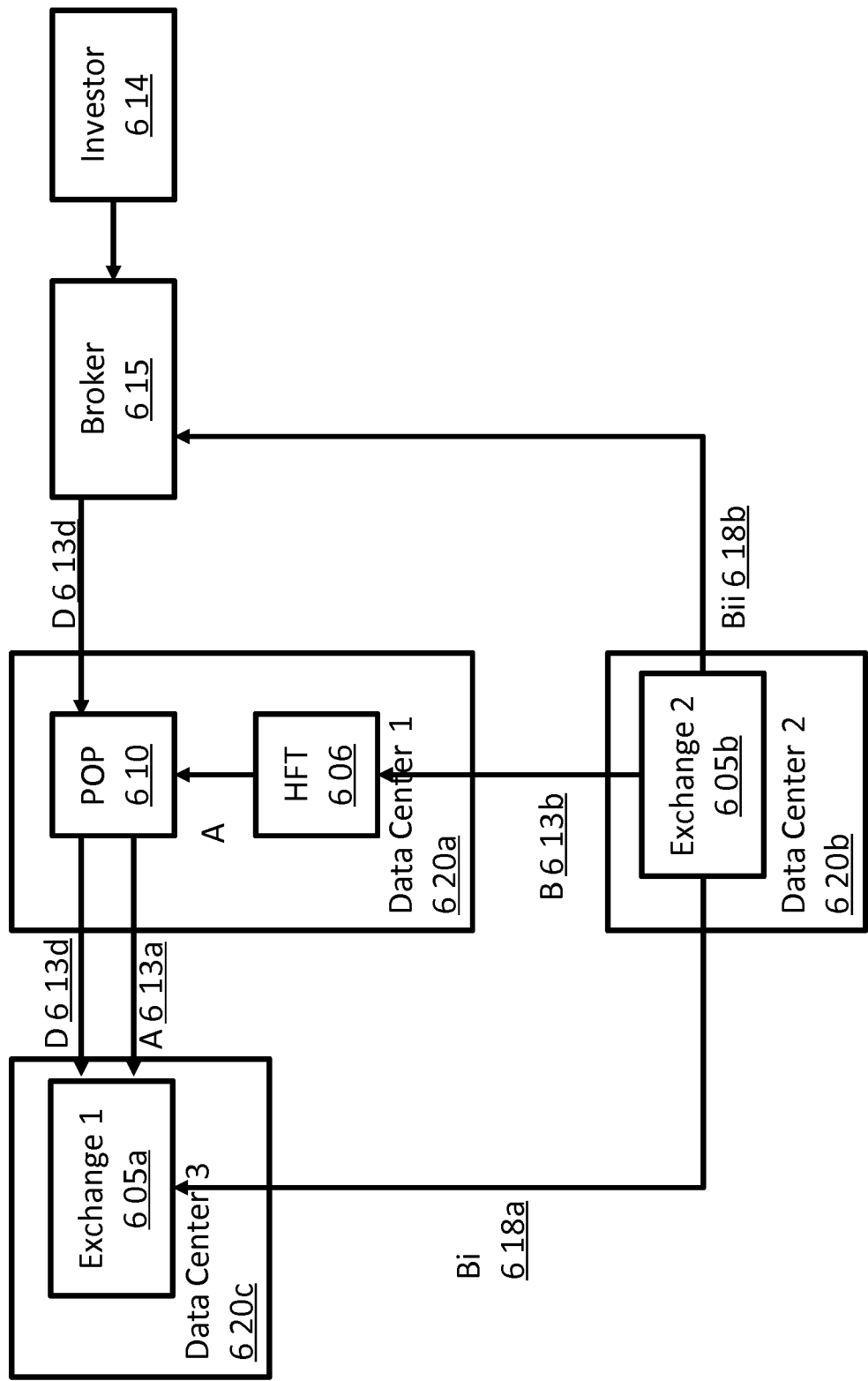

FIG. 6F provide an example illustrating managing passive order book arbitrage neutralized by a POP access point within embodiments of the EBOM. For example, in one implementation, the broker 615, HFT 606, Exchange 1 605*a* and Exchange 2 605*b* may know the NBBO of XYZ to be $10.00×$10.02. HFT 606 enters order A 613*a* to buy 1,000 shares of XYZ at $10.00 on Exchange 1 605*a*. The market updates on Exchange 2 605*b* to $10.01×$10.02 on Exchange 2 605*b* and a quote update B 613*b*, Bi, and Bii is sent to HFT 606, Exchange 1 605*a*, and the broker 615, respectively, and the new NBBO becomes $10.01×$10.02. Because of the distance between them Exchange 1 605*a* and Exchange 2 605*b* now know different NBBO calculations: Exchange 1 605*a* ($10.00×$10.02) and Exchange 2 605*b* ($10.01×$10.02).

In one implementation, HFT 606 may receive the quote update B 613*b* so knows the new NBBO ($10.01×$10.02). HFT 606 also knows that its order A 613*a* to buy 1,000 at $10.00 remains on Exchange 1 605*a*. Anticipating that a slower market participant (e.g. the broker 615) might try to sell XYZ on Exchange 1 605*a* at $10.00 because it has not received the most up to date market information Bii, HFT 606 leaves its buy order A 613*a* unchanged at $10.00 on Exchange 1 605*a*.

In one implementation, the broker 615 may then enter sell order C 613*c* on behalf of the investor 614 to sell 1,000 at $10.00 to Exchange 1 605*a*. In an example where Exchange 1 605*a* has an obligation to protect orders on its order book from trading at prices inferior to orders quoted on other markets (for example in the U.S. in compliance with Regulation NMS), Exchange 1 605*a* may receive quote update Bi 618*a*, knowing that there is a better priced bid ($10.01), and therefore not permit sell order C 613*c* to trade at $10.00.

In one implementation, the EBOM POP Architecture POP 610 may ensure that Exchange 1 605*a* may receive quote change Bi 618*a*, before the broker 615's order D 613*d* reaches Exchange 1 605*a*. Therefore Exchange 1 605*a* may know the most up to date market is $10.01×$10.02 and may not allow sell order C 613*c* to trade at $10.00.

As such, if HFT 606 receives quote update B 613*b* and leaves its order A 613*a* unchanged, the EBOM POP Architecture POP 610 may potentially prevent the investor 614 from trading on stale quote information and HFT 606 profiting at the expense of the investor 614.

Figure 6G:
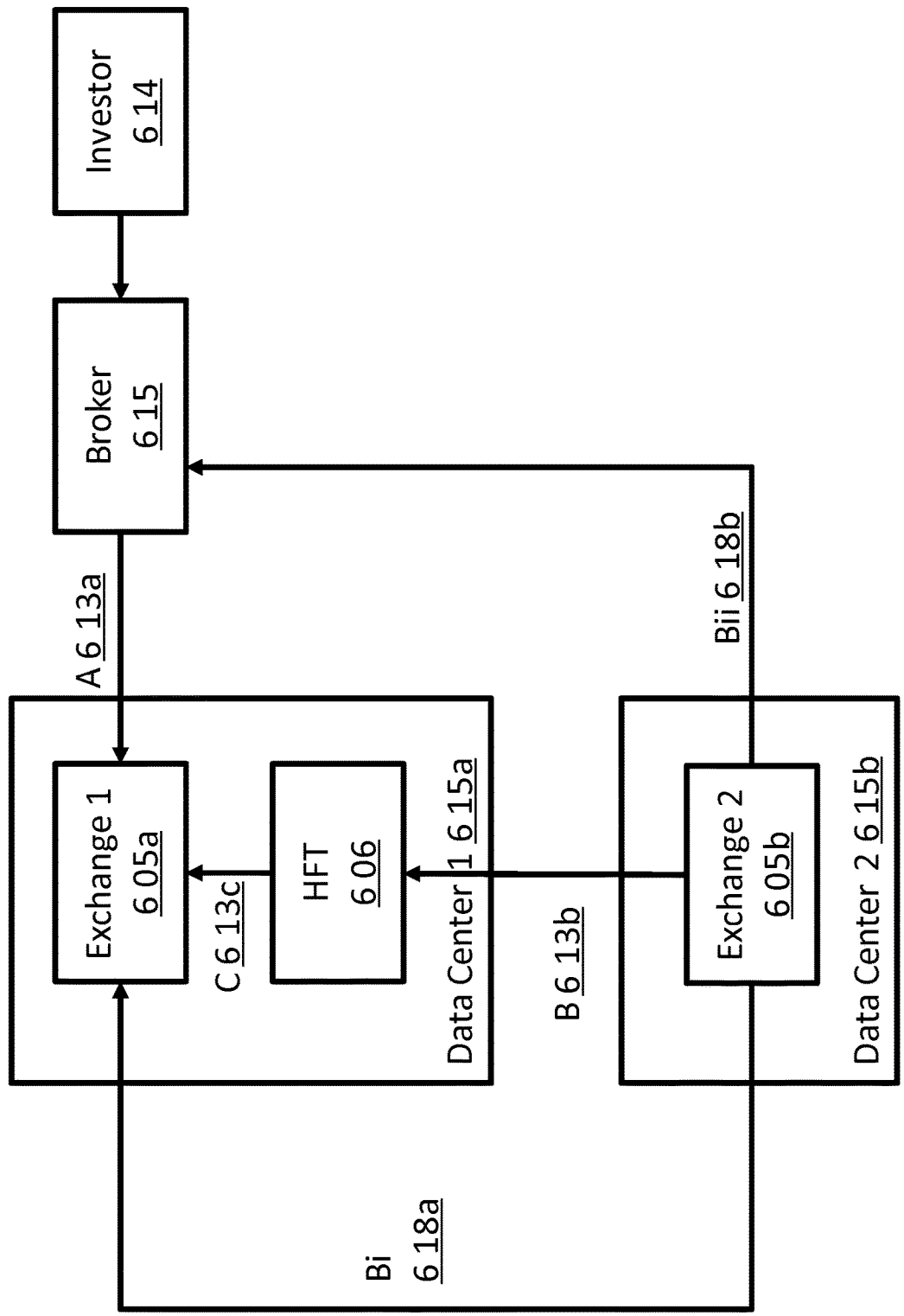

FIG. 6G provides an example illustrating aggressive order book arbitrage within embodiments of the EBOM. As shown in FIG. 6G, this example deals with stale quote arbitrage vs. midpoint pegged orders, but the same mechanism and therefore the same arbitrage opportunity may be applied to stale quotations at the National Best Bid (NBB) or National Best Offer (NBO).

In one implementation, the broker 615, HFT 606, Exchange 1 605*a* and Exchange 2 605*b* may know the NBBO of XYZ to be $10.01×$10.03. the broker 615 enters order A 613*a* with Exchange 1 605*a* on behalf of the investor 614 to buy 1,000 shares of XYZ pegged to the NBBO midpoint ($10.02). The market updates on Exchange 2 605*b* to $10.00×$10.02 and a quote update B 613*b*, Bi 618*a*, and Bii 618*b* is sent to HFT 606, Exchange 1 605*a*, and the broker 615, respectively. The new NBBO becomes $10.00×$10.02, and the new midpoint becomes $10.01. Because of the distance between them Exchange 1 605*a* and Exchange 2 605*b* now know different NBBO and midpoint calculations: Exchange 1 605*a* ($10.01×$10.03 with midpoint $10.02) and Exchange 2 605*b* ($10.00×$10.02 with midpoint $10.01).

In one implementation, HFT 606 may receive the quote update B 613*b* so knows the new NBBO and midpoint ($10.00×$10.02 and $10.01). HFT 606 also knows that a midpoint order on Exchange 1 605*a* may still be priced based on the previous NBBO ($10.01×$10.03 and $10.02). HFT 606 sends a sell order C 613*c* to Exchange 1 605*a* at the old midpoint of $10.02 and trades with the broker 615's order A 613*a* at an inferior midpoint price costing the investor 614 $10.00 (1,000*$0.01=$10.00).

Therefore if (transmission time of B+ transmission time of C)<transmission time of Bi HFT 606 may immediately sell XYZ at $10.02 on Exchange 1 605*a* and potentially immediately buy XYZ at the midpoint of $10.01 on Exchange 2 605*b* making a profit at the expense of the investor 614.

Figure 6H:
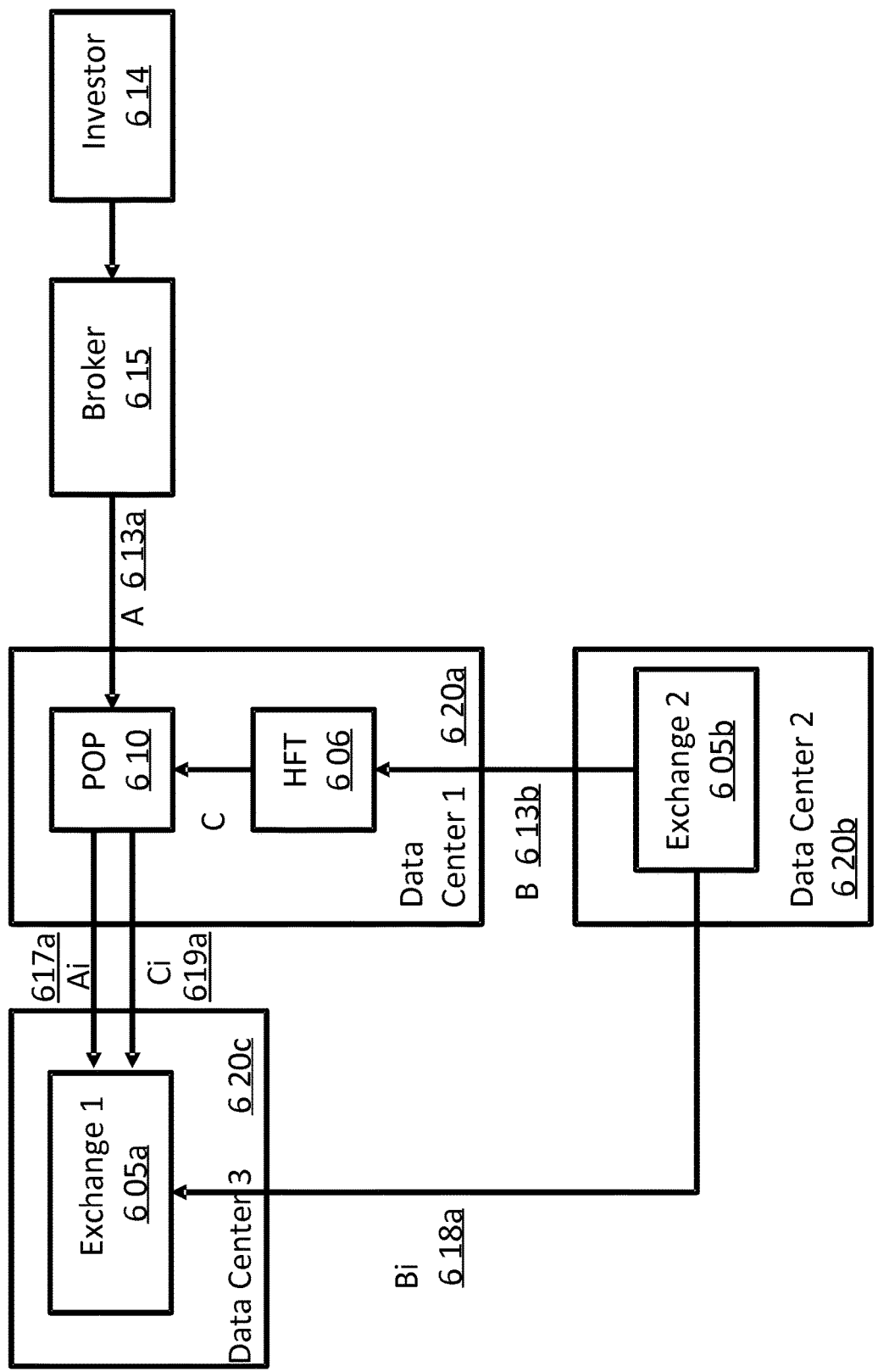

FIG. 6H provide an example illustrating managing aggressive order book arbitrage with inoculation of a POP access point within embodiments of the EBOM. Continuing on with the potential stale quote arbitrage from FIG. 6G, when a POP 610 is inoculated, as HFT 606's order C 613*c* must pass through the EBOM POP Architecture POP 610 if (transmission time of B+ transmission time of C+ transmission time of Ci)>transmission time of Bi, Exchange 1 605*a* may have timely received the quote change Bi and update its midpoint calculation to the most up to date information ($10.00×$10.02 and $10.01) and the broker 615's order A 613*a* may not execute at an inferior midpoint price.

Additional embodiments of the TLL may include:

Within embodiments, the TLL may be a marketplace for matching and executing orders to sell and buy securities from buyers and sellers, and may route such orders to other marketplaces for execution when a match is not available on the TLL. The TLL may be focused on serving buyers and sellers of cash equity securities issued in the United States; however, the principles of the system's organization may be applicable to the buying and selling of other securities, financial instruments, things of value, and/or the like in the United States and other national, geographic, and/or regulatory regions The TLL may comprise several components running on computer hardware including, but not limited to a client FIX gateway, matching engine, routing engine, exchange/venue FIX gateway, market data ticker plant, order and trade database(s) clearing, billing, surveillance systems and interfaces, and/or the like, which may communicate with one another via an internal message bus, and externally with other exchanges, vendors, securities brokers, etc. Below, we describe elements of the components and the system as a whole that are novel and useful.

The TLL may counter the advantages of certain trading strategies within the methods known as "high-frequency trading" (HFT) in transacting on existing trading venues.

Reliability

The TLL may deploy a client/server model, wherein a "client" may be a program that uses a service provided by other program(s), and the programs that provide the service may be called "servers." Servers may function by responding to client requests with data, status information, and/or the like. In some embodiments, a client may connect to a server that performs business process logic before interacting with other back-end services for more processing or storage, and/or responding to the server, which in turn may respond to the client.

TCP-to-Multicast (T2M) may be a way in which messages are distributed from a single front-end server to multiple back-end servers. In some embodiments, this may optimize resource utilization, maximize throughput, increase fault tolerance, and achieve other security and quality assurance (QA) benefits, etc.

T2M may be a component that may connect on a port where external clients connect to access services on the back-end. The program may maintain a connection from the client as per the TCP protocol and may transmit the data payload to back-end services via multicast (UDP protocol) delivery. Whereas TCP protocol may provide one-to-one communication, multicast may provide one-to-many communication allowing for multiple back-end services to receive the original data payload simultaneously from a single source before processing and/or transmitting to further back-end/downstream services.

One-to-many communication via T2M may allow a client to make a single TCP connection that may then fan out communication with N number of back-end resources. This one-to-many communication may be invisible to the client but achieves many benefits. Specifically, it may allow for at least one of: minimized deployment risk due to abstraction of business logic from architecture logic; duplication of client communication sessions over multiple servers; independent scaling of back-end services from front-end services; client does not make a direct connection to back-end services which hides the internal network structure and kernel network stack, resulting in higher system security; intraday capacity scaling, and load balancing without compromising client port connections; real-time seamless failover of client communication layers within a datacenter, or across datacenters that increases fault tolerance, resiliency, and disaster recovery capabilities; independent parallel stream for real-time QA analysis using original production data payload; and/or the like.

Physical Hardware and Network

Ensuring Simultaneous Information Delivery for Geographically Distinct Systems

Transmitting data from distinct geographical locations to a central point may require different lengths of time depending on the time and distance of the transmission. As a result, data submitted at the same time at two geographical locations to the central point arrives at different times. In some embodiments, this correction may be done using software, but such systems may be complicated, error-prone, and inaccurate.

Transmission of data across various channels may be limited by various constraints. For example, in one embodiment, this may be done by fiber-optic channels, and here, transmission speeds may be limited by the speed of light through the medium of the channel. In such an embodiment, the time to travel is calculated by dividing the distance that must be traversed by the speed of light through the medium. Accordingly, the time to travel can be equalized by adding additional length to the medium or changing the medium. Equalizing the length of the medium of transmission by adding length to the shorter channels may allow for simultaneous delivery of information. In some embodiments, this may guarantee simultaneous delivery within nanoseconds.

Ensuring Simultaneous Information Delivery to Geographically Distinct Trading Systems Many trading systems utilize optical technologies to transmit information to trading systems physically located in geographically distinct locations. At least partly because of the geographic distinctiveness of the trading systems involved combined with present telecommunications methodologies and regulations, there is no perfectly equidistant point from all target trading systems. As a result, many trading systems may target information delivery on a temporal plane, and, as a result, they may be forced to utilize complicated, error-prone, and inaccurate software-driven methods to accomplish this task.

As noted, the underlying information may actually sent via photonic transmission along multiple fiber-optic channels to each location, and receipt may be acknowledged along a separate fiber-optic channel following the same path, both of which may be subject to the limitations on the speed of light through the medium used in the fiber-optic channel. In some embodiments, the distance (d) traversed over the fiber-optic channel divided by the speed of light through the medium(s) of the channel determine the time to travel (t) required for information from its source to its destination. Without a perfectly equidistant point to to/from all target trading systems, the distance traversed over fiber optic channels of different lengths (but of the same medium) will be different, and therefore the information traveling from a source system will arrive at destination systems at different times.

Simultaneous delivery of information may be made possible by equalizing the distance information must traverse by adding additional length of fiber-optic cabling to each transmission-side fiber-optic channel, changing the medium of the channel, and/or the like, such that the delivery time of information (d/s=t) is equivalent across all channels. In one embodiment, by measuring the distance of a set of channels as provided by a telecommunications provider and equalizing the length by adding cable length to the shorter channel, delivery of information may be substantially simultaneous, i.e., for example, within nanoseconds, as opposed to milliseconds with some software-driven methods.

Application Buffer Usage Reporting for Congestion Notification and Avoidance in Networked Applications Bufferbloat may be viewed as the introduction of non-deterministic latency into networked applications by the use of excessively large buffers. In some embodiments, this may be achieved by setting latency targets and working to maintain those targets for a particular latency measurement. These techniques may only be used in systems utilizing TCP sockets, and have two important limitations: 1) they are incapable of effectively handling large fanout applications, and 2) they are also opaque to the application.

These two limitations—opacity and ineffective fanout—make TCP with the CoDel algorithm insufficient to handle the problems of bufferbloat within large distributed systems. Since such distributed systems are typically hosted on private networks where operators have complete control over proprietary applications, it may be more effective to directly publish information on the buffer utilization of each application to both upstream and downstream applications within a particular data path.

By publishing buffer utilization as, for example, a simple number from 0-255, each application may be made aware of the load on its immediate neighbors, and may make intelligent decisions about further data transmissions. For example, when buffer utilization reaches a predefined threshold, an application may stop transmitting additional data over the wire. This "pause" may cause an increase of buffer utilization of the paused application, which may in turn be published to upstream applications, and so on. By providing explicit notification of buffer utilization to applications, those applications may stop transmitting, preventing packet loss that may occur when an application continues to transmit data to downstream applications after their buffers become full and cannot accept new data. This may also avoid the excessive retransmission delays that may result when application attempt to recover the lost packets. Further, explicit buffer utilization notification may also ensure the end-to-end latency experience of the distributed system will oscillate at around 50% of the delay necessary to drain a single application's buffer.

An Automated Method for Ensuring Effective Cessation of Active Members of an Active/Passive Failover System The TLL may be an active/passive system including a feature where a set of actions may be required for the promotion of a passive system member to become the new active system member. In one embodiment of an active/passive system, only one member may be active and processing data at any given time while another is passively waiting to become active. Due to the nature of an active/passive system, the TLL may make a successful termination of activities by the "active" system during a failover. This termination, colloquially known as "shoot the other node in the head," or STONITH, may ensure that only one member remains active after a failover. This may help to ensure that the previous master does not attempt to re-assert control of the system or continue to operate as a second master, which may cause issues such as the incorrect duplication of messages due to the nature of an active/passive system.

STONITH may be accomplished either automatically, where a secondary node negotiates a shutdown with the primary system; or manually, where an administrator logs into the current active (master) node and executes a command to terminate the active node's operations. However, there are some situations where this methodology can fail.

In order to properly terminate an active node, the TLL may remotely terminate the connections to the hardware (e.g. server) upon which the offending node is running, at the far-side of the connections. When combined with strict cabling standards, the location of an active member of an active/passive system may algorithmically determined by passive members, regardless of the state of the active member. When a passive member detects the failure of an active node, the passive node may communicate directly with network devices to which the active node is connected and may disable any network ports to which the active node is connected. The active node may also, if desired, communicate directly with networked power distribution units and similarly remove power from the formerly active node. These two actions may prevent a formerly active node from attempting to re-assert itself as the active member of the system.

Computational Efficiency/Testing/Messaging

ID Mapping and Management at Client Gateway (Luggage+IexID)

Many trading system interfaces with external FIX clients may have difficulties dealing with order identifiers (FIX field ClOrdId) sent to the trading system. These identifiers are often only unique to an external system (e.g. system 1 and system 2 may both send an order with id=ABCD to the trading system) and largely vary between the many external systems in length and content. In some embodiments, to uniquely identify these orders, a solution may be to address the external system's order internally by combining an identifier for the customer (FIX field SenderCompID) plus the order id provided (e.g. system 1's order A='Customer1-ABCD'). While this is a valid approach, it presents a potential performance problem, as many systems must use a large string to uniquely identify external system orders in the system and create a cross-reference file which is stored in either a database, file system, or cached memory. This may create significant overhead for processes needing access to that ID and create technical challenges if ever needing to recover from a failed process.

In an alternative embodiment, the TLL may replace the external system's order identifier (ClOrdId) with a uniquely generated identifier based on an internal system format (IexID) and may expose the cross-referenced information on a multicast message stream. The external system original ClOrdID may be preserved so the mapping between the external systems id and IexID may be saved into the TLL, in some embodiments, using a different message called "luggage". The TLL may send non-critical "luggage" data outside the main data path. Certain destination endpoints such as the client FIX gateway itself or other reporting systems may also collect the "luggage" messages to decode (unmap) the IexID back into the ClOrdId as needed but largely, the system may not see the original external system order identifier. In some embodiments, this may allow for more efficient data processing in the system. The uniquely generated IexID may be done in a known efficient format known by all listeners on the multicast message stream, which may allow for consistent handling throughout and may expose the IexID to all systems interfacing with the message stream, as necessary.

Figure 7:
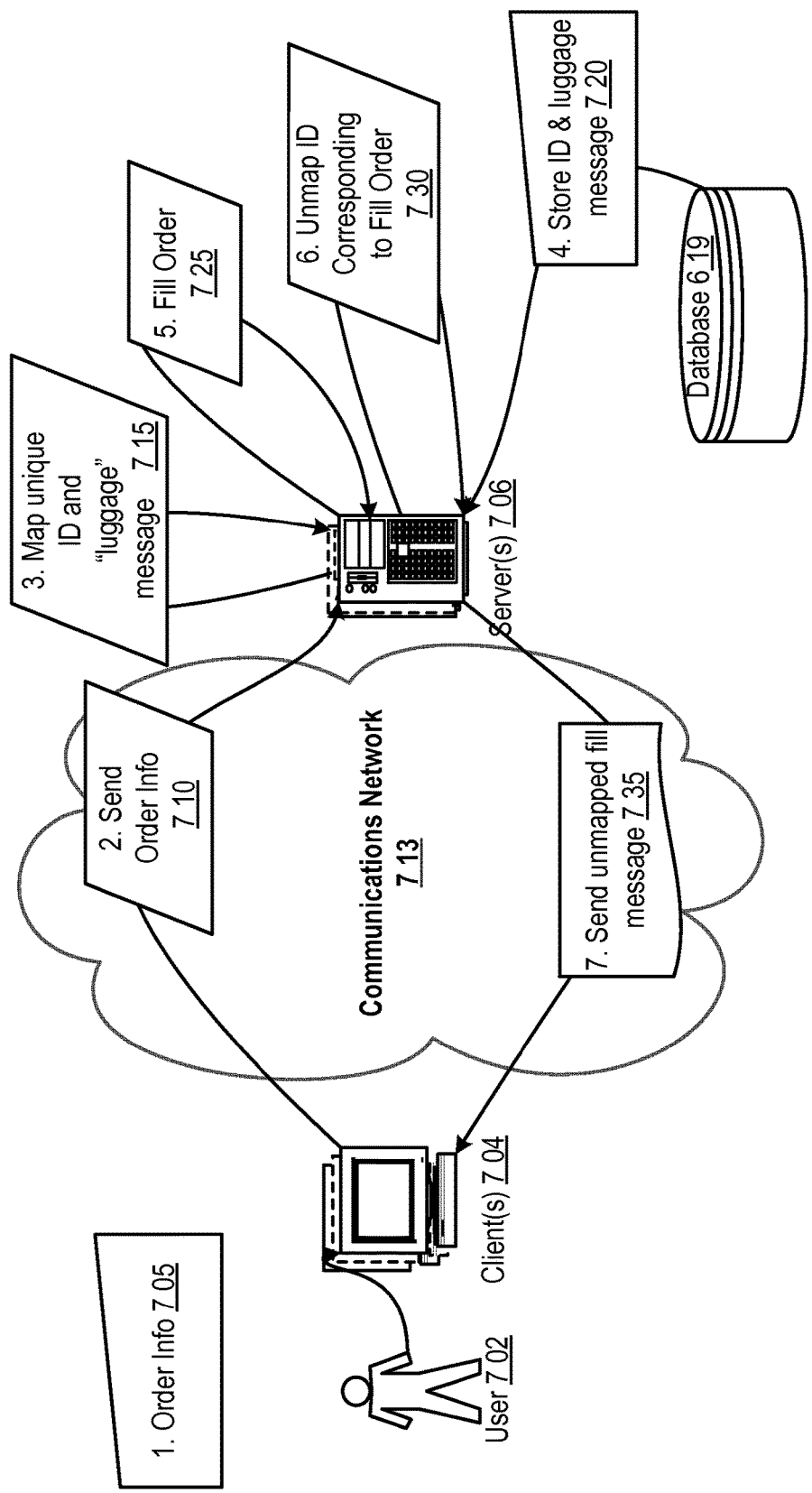
FIG. 7 provides a data flow diagram illustrating additional embodiments of the TLL.

FIG. 7 shows a sample data flow of an example embodiment, where Customer 1 702 inputs order info 705 and sends the order ABCD 710, which has an order identifier of Customer1-ABCD. The client FIX gateway may receive the order, maps the IDs 715, and sends the information into the system for matching. The TLL may generate a unique ID 715, such as internal order identifier 1001. The TLL may send a "luggage" message into the TLL 720, which may be saved for any interested components (Luggage [Customer=1, ClOrdId=ABCD, IexID=1001]). The TLL may send an order message with IexID=1001. Next, the order may be filled or matched 725. This may be sent by matching engine Client Gateway with ID=1001. The Client Gateway may reverse IexID=1001 into ABCD for customer 1 730 and may send a fill indicator with original identifiers to customer 735. The trade reporting application may also transform the fill and unmap the IDs based on "luggage" to the appropriate post trade systems.

Using Sequence Number as Unique Identifier of Messages

In a multi-process, multi-machine system, creating unique IDs can be a challenge. Simple approaches of using a counter may not be viable since it may result in the same ID being generated in multiple places, and some kind of state must be stored so that duplicate IDs are not generated if a process is restarted. In one embodiment, this may be solved by adding qualifiers to the IDs from where they are generated. For example, machine01.process.02.session01.[counter]. While this is relatively simple and there is no centralized point of failure, the identifier may be larger than it needs to be, tracking a session at restart may be difficult, and machines and processes may need to be uniquely named. In another embodiment, central ID generation may be used, where an identifier may be from a dedicated process, such as a service, database, and/or the like. While this is simple and allows for centralized control, the overhead of retrieving IDs and central point of failure and contention are potential problems.

In yet another embodiment, a message sequence number provided by the system's proprietary multicast middleware may be used as a unique identifier. All messages received by the TLL may have a guaranteed day-unique, monotonically increasing number on them. No additional call to a centralized ID system (database, file, or memory) may be needed. Additionally, the ID may provide a reference into the current system state at a state in time. This technique is utilized in several places in the TLL, but most notably when creating a unique customer order chain ID.

For example, configurations 1 to 10 may be sent through the TLL, where sequence number=10, and market data quote 1 to 3 may be sent through the TLL, where sequence number=13. Customer order 1 may arrive, sequence number=14. The TLL may create an order chain that may require a system unique ID. While the TLL may generate one or ask a central service for a new ID, the TLL uses the sequence number of the customer order message that caused the TLL to create the order chain. Order Chain ID=Sequence number=14. By so doing, the ID is unique and compact, and may not require additional computation. This sequence number may also represent a point in time in the state of the system, such that the TLL may determine the most current market data at the time the order was placed.

Sequenced Market Data

The speed and volume of equities market data in any trading system may be challenging, as there are hundreds of millions of data updates per day, and data may be most valuable when consumed immediately—old data may have less value. Trading systems may be designed to split processing between many processes and functions, such as by indicating Trading Engine 1 only looks at symbols starting with "A," or they may have applications that independently consume market data. Splitting the market data may introduce a problem with determinism, because processes interested in market data state may have different state from each other because they may be independently looking at the data and the system state may become inconsistent between processes. For example:

Market Data (MSFT)→Process 1→Process 1 processing order #2 knows MSFT @ $10.01;
Market Data (MSFT)→Process 2→Process 2 processing order #2 knows MSFT @ $10.02.

The TLL may, instead, send all the market data through middleware to be sequenced/serialized so the state of the market will be identical in each application across the entire system at any given time. For example:

Market Data (MSFT)→Sequencer→Process 1→Process 1 processing order #2 knows MSFT @ $10.01
Process 2→Process 2 processing order #2 knows MSFT @ $10.01

Identical state of the market data known throughout the TLL has multiple benefits. For example, on certain transactions like trades, the TLL may label the market data state on the trade message by noting the message identifier (sequence number) of the market data state update on the trade. (e.g. Trade 15 happened and Quote 52 represents the current market state). This may be a convenient and efficient way to identify the market state at a particular time. In the absence of sequencing market data, other solutions may include writing out the current market state at each consumer (inefficient) or doing time-based derivation of market state (imprecise and/or inaccurate).

Trigger Framework

The TLL Trigger Framework may enable complex business logic to be deployed in a tightly controlled, highly transparent, and uniform manner. In one embodiment, the goal is to build modularized logic that allows developers to focus on a specific task and can be re-used by many applications. The trigger framework may comprise 2 types of components: Conditions and Actions.

These two components may be arranged as a binary decision tree where conditions form the body and actions are the branches.

A condition may be an individual class that evaluates the current state of an object within the application and returns either true or false to express whether that particular condition has been met. The object may be a transient message such as a FIX Protocol NewOrderSingle request or a state-based data structure such as a ParentOrder object.

An action may be an individual class that executes business logic in response to a condition being met. In general, an action class may produce messages in response to a specific change in its state. The action may modify the object that was being evaluated and/or interact with other objects or applications.

Conditions and actions may be written as modularized components, and may be stitched together in a decision tree through a configuration file (e.g. in JSON format). Such a framework achieves efficiencies through extensive reusability of components, debugging, maintenance, and visual comprehension of the logic.

In an example workflow, a message may enter an application. That message may be added to a trigger queue, and/or the message may cause other objects to be added to a trigger queue. One by one, objects may be pulled from the trigger queue and evaluated. When an object is evaluated, if it is a state-based object, a relevant condition tree may be pulled based on its state; otherwise the default tree for that type of object may be loaded. The conditions in the relevant tree may then be evaluated, starting from the top. For example, if the condition evaluates to true, the ifTrue branch is followed and vice versa. The condition tree may be traversed until an action is reached and performed. Performing the action may cause state changes to be performed on the triggered object or other objects; it may create other objects; it may cause other objects to be added to the trigger queue; it may cause one or several messages to be published; or any combination of the above. Once the trigger queue is fully evaluated, the application may then process the next inputted message.

A condition may be evaluated on many different types of objects. For example, a condition that checks if an object's relevant security symbol is halted may be evaluated on a NewOrderSingle FIX message, a market data update message, a Parent Order object, a router object, etc.

Test Harness

The test harness may allow testing personnel to perform automated testing on applications. It may load an application to be tested and connect the harness to the application's input and output valves. A list of pre-written inject and expect messages, for example in JSON format, may be loaded. The inject messages may then be input into the application, which may result in output messages. As messages are outputted by the application, the output messages may be compared against a pre-loaded list of expect messages. In some embodiments, the test may have failed if the output messages do not match the expect messages, if the output messages are out of order, or if expected output messages have not been outputted by the test harness. Otherwise, the test may have been passed.

In some embodiments, the test harness may implement Message templates. The user may create message templates which can be reused across tests. When creating a test, each message may be designated by the test creator to simply reference a template to use, and the test harness may parse the message and automatically load up all of the values in the called template's fields. Additionally, if any field values are specified in the test, those specific values may override the values copied over from the template. This may simplify creation and modification of tests, as only the relevant fields on a message relating to a given test must be specified/modified. All other fields may be defaulted per the template design, saving time and effort.

In some embodiments, the test harness may allow for selective field validation on expect messages. Expect messages used for validation in the tests may not need to be full-formed messages; they may include any number of fields. Only the specified fields will be validated, and all other fields on the output message may be ignored. This feature allows the expect test to focus on validating specific fields, where more efficient, versus validating an entire message and may be particularly useful for dealing with dynamic fields such as timestamps which cannot be predicted effectively.

In some embodiments, the test harness may allow selective message validation on expect messages. A user may specify a list of message types to validate on a given test. All other message types output by the application may be ignored. This may filter out messages not relevant to the test, such as heartbeat messages.

In some embodiments, the test harness may allow for case creation. The test harness may have a mode which only consumes a list of inject messages, and injects them one by one into the application. Then, all messages that the application outputs may be collected and a new test case file is generated from both lists.

In some embodiments, the test harness may allow for mass case creation. The test harness may have a mode which consumes a list of setup inject messages as well as a list of independent individual messages. The test harness may load up the application to be tested, may inject the setup messages into the application, and may inject one message from the independent messages list. The test harness may then collect all the output from the application and may create a full-formed test case. Next, the test harness may restart the application and repeat the load>inject setup message>inject independent message>collect>create cycle with the next message from the independent messages list. This process may be repeated to until a test file has been created for each message in the independent messages list. In this way, the test harness may automatically generate a large number of similar tests, such as a test for every permutation of fields on a customer-sent order.

In some embodiments, the test harness may allow for multi-application testing. The test harness may have the ability to load up multiple applications and test their respective independent functionalities as well as the functionalities of each application interacting with other applications. The test harness may load a set of specified applications in a designated order. In some embodiments, this may be based on the flow of messages through a set of applications that interact sequentially. The test harness may then input an inject message into the first application in the set, may validate the output message, and then may inject the output message into the next application in the sequence, validate it, and so on.

The test harness may run an individual test or many tests at a time, in some embodiments restarting the application in between tests. It may be integrated with an automated build process to run through an entire list of test cases and produce a report each time a developer commits code.

Web User Interface for Dynamically Building Test Cases

The test builder user interface may provide a way to build test cases dynamically based on an arbitrary JSON data schema. In some embodiments, the test UI may locate a schema file that may be loaded in JSON format, and which may define a set of system message. Based on the format of the schema, a user may be presented with a list of potential messages. When a user selects a message, a form may be dynamically built based on the format of the message, which may be defined in the schema, along with any specified data validation rules. The user may then be presented with a list of predefined message templates that can be selected to populate the form. As the message forms are completed by the user, they may be added to a sortable list. The user may sort each message item in the order in which it should be injected into the test framework. A collection of completed messages may be saved as a template, and templates may be combined to form complex test cases. The user may specify whether a message should be treated by the test harness as an inject or expect message. If a user is unsure what the expected message should be, the UI may allow for partial test cases to be injected before completing the entire case. A partial test case may be served fvia REST to the server, which may invoke an instance of the test harness and may inject the partial set of test messages. The out put messages generated by the test harness may be returned to the UI and may be displayed to the user. The user may then verify each message. If the user approves a message, the message may be added to the current test case with a one-button click to complete the test case, which may then be saved as a template. Once the test case is completed, a single button click may generate a JSON formatted test case file that may be executed by the test harness and implemented in continuous build processes.

The test UI may provide a fully dynamic web based interface for building test cases executed by a stand-alone test harness. It may generate forms with full data validation based solely on a JSON formatted data schema. Partial test cases with as little as a single message may be injected into a stand-alone test harness, on the fly, to present the user with system output messages. Fully operational test cases may be generated with a single button click, which may be used by the test harness. Additionally, individual test cases may be combined to create new, highly complex test cases.

Method of Creating a Complex Data Query Using a Single UI Element

Some web applications may provide the user a way to query for multi-column data. In some embodiments, interfaces may provide discreet form elements which may allow users to enter search terms per data element type. Alternatively, single search boxes may be provided to allow users to enter a search term which may be applied across different data types.

In another embodiment, a structured search field may be used. The user may be presented with a single input box which follows structured input based on predefined schema.

In one embodiment, the user may select the input box and may be presented with a tooltip to indicate the current context of the box. The input box may include multiple data types separated by any type of character such as a space, such as, for example, Order Id, Venue, Broker, Price, Symbol.

In some embodiments, as the user advances in the select box by, for example, pressing the space bar, the context of the input box may be advanced to the next search term. A new tooltip may be presented, indicating to the user the search term.

In some implementations, as the user advances through the search box and the context changes, the box may be configured to display potential search values as a drop down under the box.

In some embodiments, with each advance of the user through the search box, a dynamic query may be performed against the underlying database, database view, and/or file, such that the final result may be displayed quickly to the user.

In various embodiments, the structured search field may: use multiple search terms in a single input box following pre-defined schemas; switch schemas on the fly, thereby changing the type of search terms or order in which terms may be input; display auto-complete search values for each search term as the user advances through the search box; allow users to advance through the search box by hitting the space bar, which may automatically input a search wildcard; allow users to navigate forward and backward through the search box; utilize user input in earlier search terms to drive the potential search values of later terms; display tooltips as the user advances through the box to indicate the search term at the cursor position; dynamically refine and optimize response times to complex queries across multiple columns; and/or the like.

Trading Logic Inventions

Midpoint Constraint

Pricing a stock trading execution may be done by using the price at which a passive order is posted (and ranked for the purposes of price priority) to the order book. In the case of two aggressively priced orders executing against each other, the result may be an execution at the price of the order which arrived and was entered into the order book first—specifically, the earlier order will pay their aggressive price while the latter will get "price improvement." In an alternative method, the TLL order book may not change the execution pricing calculation; rather it may limit how aggressively an order is allowed to book in the TLL Order Book.

The TLL may use a concept called the Midpoint Constraint. In the TLL Order Book, aggressive hidden, or non-displayed, orders may not be posted more aggressively than the midpoint of the national best bid/offer (NBBO). When two aggressively priced hidden orders enter the book and are repriced to the midpoint, such that the resulting execution may occur at the midpoint price. Because the buyer was willing to pay a higher price, and the seller was willing to sell at a lower price, both may receive a superior execution price, i.e., price improvement, resulting in a more equitable distribution of the spread (the difference between the bid and the offer price) between two aggressive counterparties regardless of the order in which their orders arrived in the TLL book.

The Midpoint Constraint may offer several other benefits as well. By limiting the price at which a booked order is ranked for price priority, the Midpoint Constraint may limit unnecessary competition for price priority in the hidden queue in the form of "pennying," where one party attempts to gain priority over another by submitting their own order with a marginally more aggressive limit price. The Midpoint Constraint may also limit directional information leakage resulting from the execution prices. An execution occurring at the midpoint between the bid and offer prices may be a direction neutral trade print, therefore it may be harder to discern at the time of execution in which direction the prices may move (higher or lower) and whether the new order represented an increase in supply or demand. It may also serve to maintain a fair and orderly ranking of aggressively priced conditional orders in the TLL Order Book.

The Midpoint Constraint may be implemented such that whenever a hidden order seeks to post to the TLL Order Book, its limit price may be compared to contra-side resting order(s) for potential execution. If no execution can be processed the order's limit price may be compared to the NBBO midpoint, and if the order price is more aggressive than the midpoint, it may be booked at the midpoint. If the order price is less aggressive than the midpoint, the order may be booked at its limit price. This process may be expedited by pre-processing the Midpoint Constraining price by calculating the midpoint of the NBBO when a market data change causes the midpoint to change. In some embodiments, this may be done by pre-calculating the constraining midpoint price, then applying it to orders as they seek to post to the TLL Order Book.

Minimum Quantity

Minimum quantity orders, when inbound (new), may be eligible to trade against a single order, or a multitude of counterparty orders, so long as the counterparty single order by itself or multitude of orders in aggregate satisfies the minimum quantity condition on the inbound order. However, if no single order or multitude of orders satisfies the minimum quantity condition of the inbound order, the inbound order may not execute and instead may be posted to the order book. Once such an order is posted to the order book, it may only execute passively against a single new inbound counterparty order that satisfies its minimum quantity condition in total. Once the inbound minimum quantity order has been inserted into the order book, if at some point in the future as market conditions change and/or new counterparty orders enter the book, the minimum quantity order may no longer be eligible to trade with a multitude of orders that satisfy the minimum quantity condition.

Book Recheck

Book Recheck may grant minimum quantity orders greater utility by allowing them additional opportunities to satisfy their minimum quantity condition with multiple counterparty orders after posting to the TLL Order Book. Book Recheck may work by iterating over eligible marketable orders in the TLL Order Book, in book priority order, and checking to see if any can currently trade against the opposing side of the book, treating orders on the opposing side of the book each as if they were a new inbound order. This may be a computationally intensive and costly process for an order book's matching logic.

In order to alleviate some of the computational cost to the order book's matching logic, an external process may cancel the orders being rechecked and send them back into the matching engine anew. This may result in a loss in time priority for the cancelled orders, should the recheck attempt not fully execute the order(s).

The TLL implementation may maintains references to the orders being rechecked so that Book Recheck may be performed without removing or reordering the orders in the order book, thereby allowing the orders that are rechecked to fully retain their time priority if not fully filled. These order references may be updated to adapt to both successful and failed recheck attempts, always ensuring that book priority is maintained throughout the process.

A successful Book Recheck process may be triggered by any number of events, including but not limited to new order instructions from subscribers, changes in the national best bid and offer, and other changes in market data variables. These data may be compiled and pre-processed into salient metrics such as aggregated share counts and various regulatory trading limits to ascertain, prior to performing the actual recheck operation, whether an execution is likely, unlikely, or guaranteed. In this way the pre-processing may further reduce the computational cost of the Book Recheck.

Minimum Quantity Tiers

Minimum quantity instructions may allow any round number share value between 0 and the order's total share count (a minimum quantity equal to the share count of the order is treated as an all-or-none order condition). While allowing a theoretically infinite number of minimum quantity conditions offers the greatest flexibility to the subscriber, it may also be impractical. In an order book with many orders, interspersed with orders with minimum quantity conditions, the process of comparing orders for potential execution may theoretically become unbounded. In other words, it may create a theoretically infinite number of comparisons of order combinations within the book to determine if any pair of orders or multitude of orders can be combined to meet the minimum quantity condition(s) of orders being compared thus that a trade can be executed. Since the minimum quantity instruction may vary infinitely across the order book, there may be no way to determine how many shares are available to a given inbound order without traversing the book to determine whether each resting order has a minimum quantity instruction that is satisfied. In addition, if the order book contains many orders that are unwilling to trade with the inbound order (i.e. have a minimum quantity instruction that is not satisfied), there is no efficient way to isolate those orders without traversing and skipping each individually.

The TLL may have effective minimum quantity, and minimum quantity tiers. A set number of valid minimum quantity tiers may constrain the number of permutations and capture the most commonly elected minimum quantity valued (e.g. 200, 300, 500, 1000, 5000, 10000 shares). Should the minimum quantity instruction on a subscriber's order not align with any tier, the TLL Matching Engine and Order Book may operate using the effective minimum quantity, rounding down the value to the next lowest tier. The subscriber's prescribed value may be maintained and persisted, but for matching logic purposes the effective value is used.

Consolidating minimum quantity instructions to a finite set of commonly used values may allow for a better execution experience for minimum quantity orders as the probability of a near-miss in satisfying a minimum quantity instruction may be lowered due to using standardized values. For example, an order with minimum quantity of 575 shares may not match with an order with minimum quantity of 550 shares, 525 shares and so on. The near misses may be caused by use of too fine a granularity on minimum quantity, which results in two orders not matching where, had the subscribers entering the order known there was a counterparty so close in size, they may have been willing to trade. By constraining the minimum quantity options to tiers, this problem is reduced. For example, by enforcing tiers in increments of 100 shares from 100-1000 (100, 200, 300, 400, 500, etc.) the orders in the previous example will all be rounded down to a minimum quantity condition of 500 and become eligible to trade with each other. This may balance the objective of the order to set a minimum trade size constraint, while not inadvertently preventing it from trading with willing counterparties of similar size.

The TLL Order Book may manage and store minimum quantity orders by tiers, as well. The TLL Order Book may be partitioned by minimum quantity tiers into a finite number of individually sorted order books. The result of partitioning by minimum quantity may be that the minimum quantity instruction all of the orders in a given book is the same, and thus the matching logic may evaluate more expeditiously how many shares are available in a given book to a given inbound or rechecking order since every order in said book may uniformly be willing or unwilling to trade with the inbound or rechecking order. Applying this concept to each partition of the TLL Order Book may allow the TLL to evaluate in constant time how many shares are available to an inbound or rechecking order.

Minimum quantity tiers may also be useful in the course of execution. In the course of re-consolidating the partitions for execution in overall book priority, if a given partition has a minimum quantity that is not satisfied by the inbound order, the TLL Matching Engine may not draw from that partition at all. Consolidating only those partitions that may be willing to trade may essentially filter the entire order book based on which orders are willing to trade with the inbound order. This may eliminate the need to visit and skip individual orders based on their minimum quantity instruction and increase computational efficiency.

Minimum Quantity Participation

Minimum quantity implementation may be limited if a resting minimum quantity order is not at the front of the order queue. Even if a sufficiently large aggressive counterparty order does arrive, it may be that said order, as it executes against resting orders ahead of the subject order in book priority, may not have enough shares remaining by the time it gets to the subject minimum quantity order. For example, a buy order for 100 shares may be in the order book ahead of a 1000 share order with a minimum quantity of 500 shares. An inbound sell order arrives to sell 500 shares and trades 100 with the first buy order, leaving 400 shares remaining. Because the subject minimum quantity order will trade with no fewer than 500 shares, it will not trade with the 400 remaining shares of the inbound sell order, even though the original size of the sell order met the 500 share minimum quantity condition. In an extreme example, a block buy order for 100,000 shares with a minimum quantity condition of 100,000 shares is resting in the order book behind an odd lot buy order for 75 shares. An inbound sell order for 100,000 arrives and executes with the 75 share buy order leaving 99,925 shares remaining. Because the 99,925 does not meet the 100,000 share minimum quantity condition of the buy order resting in the book, the two block orders will not match.

The TLL may use a new variation of minimum quantity behavior called Participation. The behavior of a minimum quantity order on the TLL, when inbound, may be identical to the implementation recited above. However, when resting in the order book, an order's minimum quantity condition may be evaluated against the share count of the inbound order at the start of the execution process, rather than its remaining share count when it attempts to execute against the minimum quantity order. This may help serve the underlying purpose of why the minimum quantity instruction exists in the first place—the notion of maintaining a certain balance between executing shares and giving up signals/trading information and the notion of interacting with sufficiently large interest.

In the block order example above, the 100,000 inbound sell order trades with the 75 share buy order and because its original order size of 100,000 share meets the minimum quantity order of the resting 100,000 buy order, the resting 100,000 share buy order will "participate" in the trade and execute 99.925 shares.

Participation, in conjunction with a partitioned order book, may allow the matching logic to quickly evaluate, independent of the number of orders in the order book, whether the order book contains sufficient trading interest to satisfy the minimum quantity instruction on an inbound or rechecking order, minimizing the amount of computation and time wasted in the case of no execution.

TLL+1

TLL+1 may select a venue and route orders to be posted on trading venues. As such, TLL+1 may choose which venues to send orders to in order to maximize the chance of getting executions while balancing explicit costs, such as execution fees and the like, and avoid quote impact given a desire to always represent a portion of the order on a specific venue.

TLL+1 may function as follows: when the TLL smart order router makes the decision to split an order to rest at multiple venues, it may choose the preferred venue and, in some cases, at least 1 additional venue. There can be a multitude of different reasons for preferring one venue; for example, where the TLL is a market venue itself, it may be preferable to execute orders on the TLL market versus sending them to away venues to be executed. The reason for choosing an additional venue may be that the preferred venue might not be a broker's top choice for sending it orders, so by choosing an additional attractive venue to advertise a piece of an order, the likelihood of receiving an execution may be increased. The additional venue may be chosen based on the state of the market and the potential fees charged to the contra-side broker if the order was to be executed in part at each venue. The TLL smart order router may choose among the venues currently represented at the inside of the market (national best bid or offer). By submitting an order to join the order book of a venue that's already present at the national best bid or offer, introducing a new venue to the inside quote may be avoided, i.e. no quote impact. Of these venues, the most cost-effective venue may be chosen for the contra-side broker were a trade to occur. Most brokers make routing decisions at least partly based on economics, so if orders routed to away venues by TLL are represented at the most cost-effective venue that has liquidity at the inside price, TLL orders may be executed on the away venue prior to the orders at the other trading venues.

If the order has reserve liquidity, i.e. a portion of the order is to be displayed and a portion is to remain hidden, the reserve liquidity may remain on the preferred venue. This may provide the most control over the hidden portion of the order.

If the displayed portion of a reserve order is filled, i.e., either the piece at the preferred venue or the piece at the additional venue, the reserve liquidity at the preferred venue may be decremented and a new displayer order may be sent to the venue where the original order was filled. The logic may function similarly to the common refresh methodology of reserve orders, except the order has two (or a multitude of) displayed portions at two different market centers instead of just one.

Finally, if either lit portion gets fully filled when there is no remaining reserve liquidity, the remaining lit shares at the other venue may be re-routed to the venue where the order was fully filled.

Binary Search Tree

The system described herein relates to a tree data structure implemented either within the volatile memory of a general-purpose computer or upon a physical computer-readable medium. The tree consists of a plurality of data nodes. Each data node contains a numeric key, zero or more data values corresponding to that key (which may be a null value), and references to two other data nodes designated as child nodes, namely a left child node and a right child node. Each reference may be a null reference. The child nodes of a parent node, the child nodes of that child node, and so on, are known as the descendants of the parent node. If a parent node has a left child node that is not null, the numeric keys of the left child node and each of its non-null descendants must be less than the numeric key of the parent node. Similarly, if the right child node is not null, the numeric keys of the right child node and each of its non-null descendants must be greater than the numeric key of the parent node. The tree has a node designated as the root node, which is the child node of no other node.

All numeric keys may fall within a bounded range. The range of potential numeric keys for each of a node's children and its descendants can be determined from the range of potential values for the node itself. In the present data structure, the values of each child node of a parent node are computationally generated from the range of potential values for that node. When a key and its corresponding data value are added to the tree, the tree is traversed from the root node to the location where the key is located. If a null reference to a child node is reached in the traversal, a new data node is created with the computationally generated value for the key, zero data values, and null references to the left and right child nodes, and the null reference in the traversed node is replaced by a reference to the new node. When the node with the key to be added is reached, a reference to the corresponding data is added to the reached node. In this manner, the tree structure is predetermined by the deterministic generation of keys at each location. With selection of the method to be used for key generation, an automatically balanced tree with a known maximum node depth can be precisely generated, regardless of the order in which keys are inserted into the tree. Because the maximum node depth is fixed and the tree is never rebalanced, the worst-case insertion time is significantly lower than in trees requiring rebalancing, and the tree is thus made suitable for applications requiring high reliability such as financial trading systems.

In a preferred embodiment of the invention, the method by which key values are predetermined is to select the median of the range of possible key values of the node, but other methods may be used within the scope of the invention. Optionally, the root node and layers of child nodes below it may be initially created with manually determined key values, with the descendants of these nodes having predetermined key values as described above.

As another option, if all nodes with non-null data have keys within the range of possible values for a node other than the root node, that other node can be designated as the "temporary root node" and used as a source for all tree traversals instead of the original root node. If a key outside the temporary root node's range is added to the tree, the temporary root node designation is removed and either the original root node or a newly designated temporary root node can then be used as the source for tree traversals.

A further implementation is to supplement the tree with an array of references to nodes that are likely to have values. For example, in the case of the order book of a securities trading venue, the array would contain bid and offer prices within a range of the previous day's closing price of the security. The index into the likely node array would be calculated from the numeric key value. When a node is accessed with a "likely" key, the array is used in preference to the tree, with the tree only used in case of insertions and "unlikely" keys outside the range of the array.

The invention as described may be used for purposes of organizing buy and sell orders for securities by the prices specified in such orders. For such purposes, the prices of the orders are used as the numeric keys and other information about the orders is stored as the associated data. The tree is to be used in conjunction with a linked list of all nodes ordered by price, with special links to the nodes with the current highest-priced order to buy and the lowest-price order to sell, known as the "best bid and offer". The tree would be used to aid in rapid insertion of new orders without any need to traverse the linked list. Removal of executed orders would be accomplished using the linked list, since executions occur most often at the best bid and offer. Nodes with no orders or child nodes remaining are pruned from the tree and the linked list.

However, the invention's applications are broader than this particular application, and the scope of the invention should be read broadly to encompass all possible embodiments of the invention.

Figure 8A:
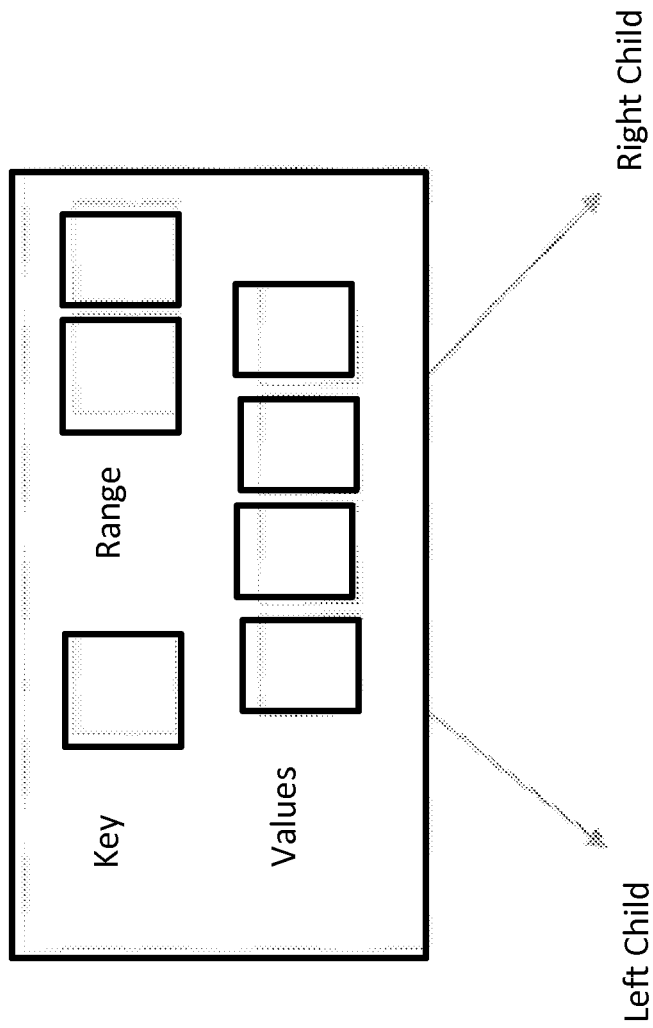

FIG. 8A depicts a node in the tree structure and its contents: a numeric key, a range of keys that can be located beneath the node, an array of values, and references to the left child and right child nodes.

Figure 8B:
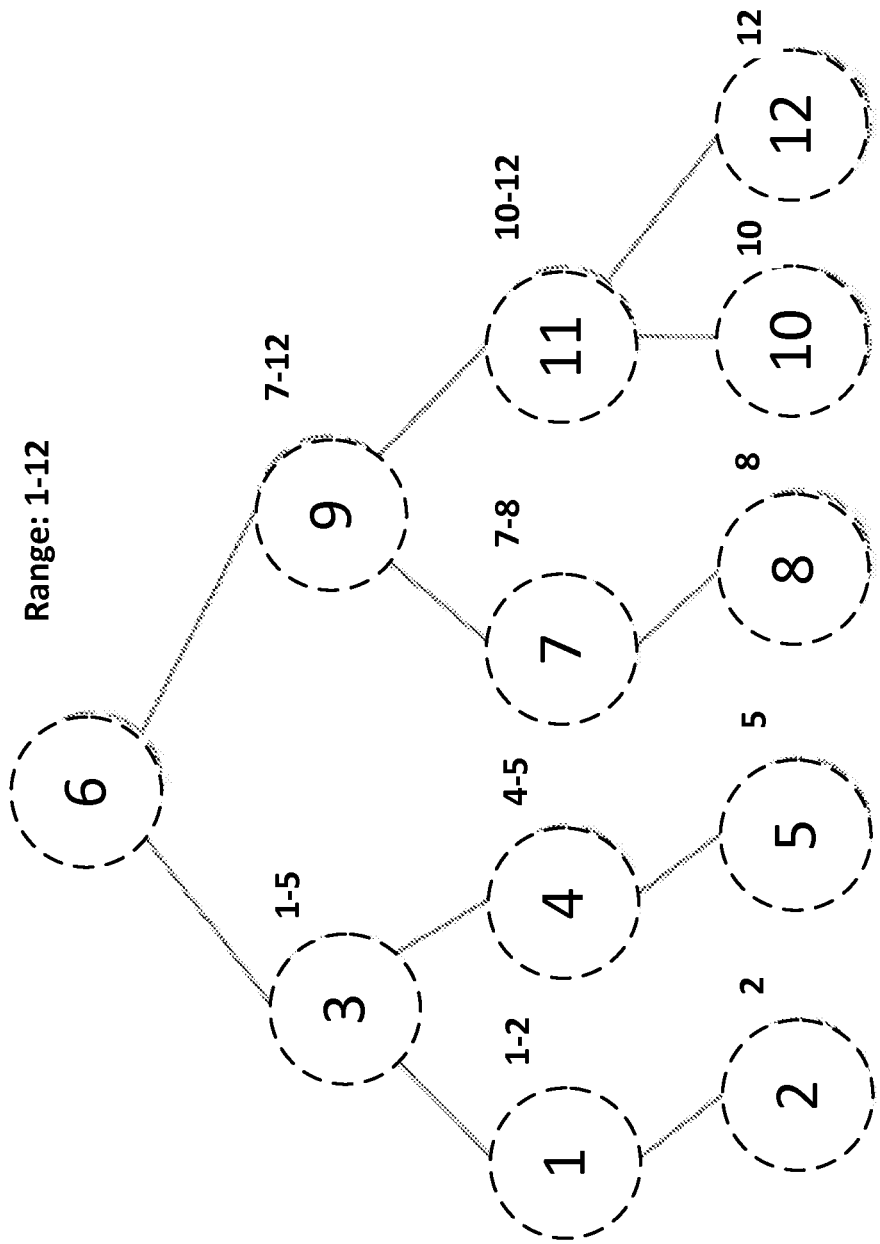

FIG. 8B depicts a fixed skeleton of a tree whose possible keys are all integers from 1 to 12, inclusive. The rule to generate each node's value is to take the midpoint of the range of potential values, rounding down if the midpoint is not a possible key. Although the key values of nodes in each position are predetermined, only the needed nodes are allocated and instantiated in the tree as implemented. This conserves memory relative to pre-allocated data structures such as arrays.

Figure 8C:
Figure 8C:
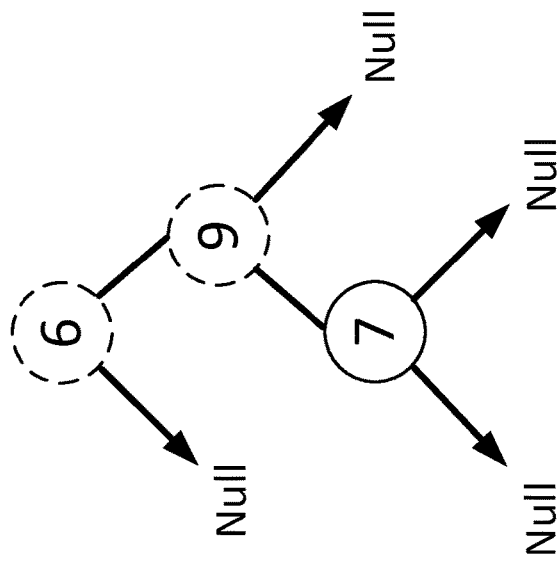
Figure 8C:
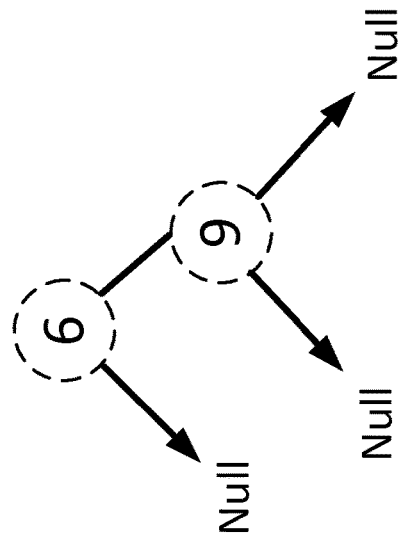

FIGS. 8C to 8D depict the creation of a new tree with the 1-12 range and midpoint rule of FIG. 8B and the insertion of a value with key 7. At first the root is null, as shown in FIG. 3a, and the root's range is the full range of the tree, 1-12. In 8D, the root is created and assigned the key 6, the rounded-down midpoint of the range 1-12. Because 7 is a greater key value than 6, it must be inserted below the right child of the root node. In FIG. 3c the right child of the root is created with range 7-12 and rounded-down median value 9. Here, 7 is less than 9, so it must be placed under the left child of node 9. Finally, in FIG. 8D, the left child of node 9 is created with range 7-8 and rounded-down median 7. This is the key we sought to insert, so the associated value is added to the key node and the operation is complete. Note that although nodes 6 and 9 are present in the tree, they have no values associated with them, and they are represented in a different shade from node 7, which has an associated value.

FIG. 8D depicts the insertion of another value with key 5 to the tree as depicted in FIG. 3d. In FIG. 8D.a, the traversal begins at the root node with key 6. 5 is less than 6 so the left child is chosen. In subsequent figures the null child pointers are omitted for clarity. In FIG. 8D.b the left child is created as a new node, with range 1-5 and value 3; the value with key 5 must be placed under the right child of this node. FIG. 8D.c shows the creation of the right child of node 3, with range 4-5 and value 4. Finally, FIG. 8D.d shows the creation of node 5, the right child of node 4 with range 5-5, and the insertion of the value at that node. There are now six nodes in the tree, two of which have values and four of which do not. The placement of the nodes corresponds precisely to their placement in the skeleton tree in FIG. 2, as the tree guarantees all keys and nodes will have the same positions regardless of the order in which they inserted into the tree.

TLL Controller

Figure 9:
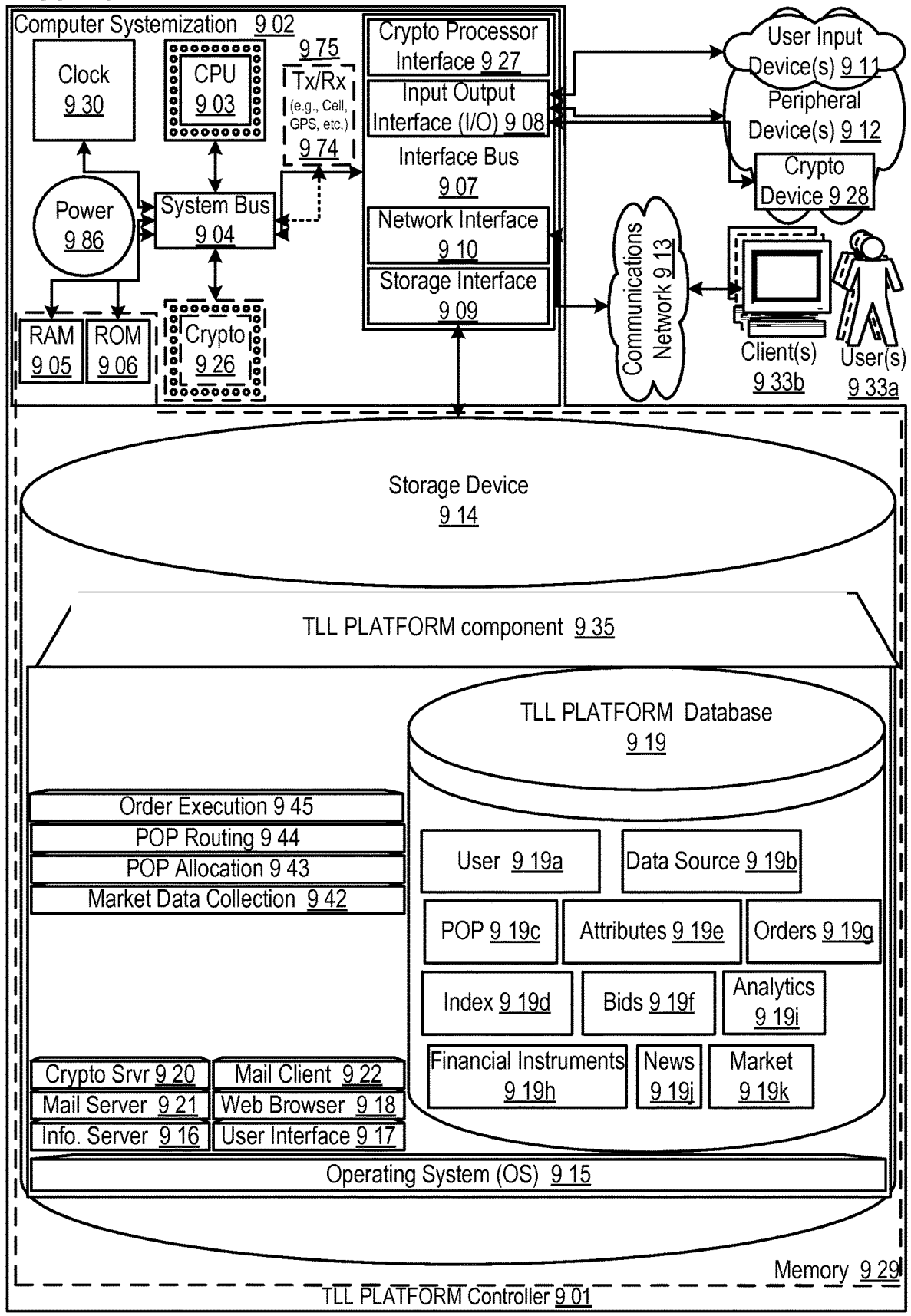
FIG. 9 shows a block diagram illustrating example aspects of a TLL controller.

FIG. 9 shows a block diagram illustrating example aspects of a TLL controller 901. In this embodiment, the TLL controller 901 may serve to aggregate, process, store, search, serve, identify, instruct, generate, match, and/or facilitate interactions with a computer through various technologies, and/or other related data.

Users, e.g., 933a, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the TLL controller 901 may be connected to and/or communicate with entities such as, but not limited to: one or more users from user input devices 911; peripheral devices 912; an optional cryptographic processor device 928; and/or a communications network 913.

For example, the TLL controller 901 may be connected to and/or communicate with users, e.g., 933*a*, operating client device(s), e.g., 933*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The TLL controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 906, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 964 may be connected to the system bus. In another embodiment, the cryptographic processor and/or transceivers may be connected as either internal and/or external peripheral devices 912 via the interface bus I/O. In turn, the transceivers may be connected to antenna(s) 965, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing TLL controller to determine its location)); Broadcom BCM4329FKUBG transceiver chip (e.g., providing 802.11n, Bluetooth 2.1+EDR, FM, etc.), BCM28150 (HSPA+) and BCM2066 (Bluetooth 4.0, GPS, etc.); a Broadcom BCM4650IUB8 receiver chip (e.g., GPS); an Infineon Technologies X-Gold 618-PMB9800 (e.g., providing 2G/3G HSDPA/HSUPA communications); Intel's XMM 6160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM6/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i6), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the TLL controller and beyond through various interfaces. Should processing requirements dictate a greater amount speed and/or capacity, distributed processors (e.g., Distributed TLL), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the TLL may be achieved by implementing a microcontroller such as CAST's R8051XC2 microcontroller; Intel's MCS 51 (i.e., 8051 microcontroller); and/or the like. Also, to implement certain features of the TLL, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TLL component collection (distributed or otherwise) and/or features may be implemented via the microprocessor and/or via embedded components; e.g., via ASIC, coprocessor, DSP, FPGA, and/or the like. Alternately, some implementations of the TLL may be implemented with embedded components that are configured and used to achieve a variety of features or signal processing.

Depending on the particular implementation, the embedded components may include software solutions, hardware solutions, and/or some combination of both hardware/software solutions. For example, TLL features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the TLL features. A hierarchy of programmable interconnects allow logic blocks to be interconnected as needed by the TLL system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the TLL may be developed on regular FPGAs and then migrated into a fixed version that more resembles ASIC implementations. Alternate or coordinating implementations may migrate TLL controller features to a final ASIC instead of or in addition to FPGAs. Depending on the implementation all of the aforementioned embedded components and microprocessors may be considered the "CPU" and/or "processor" for the TLL.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the TLL thereby providing an electric current to all the interconnected components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 906 may accept, connect, and/or communicate to a number of interface adapters, frequently, although not necessarily in the form of adapter cards, such as but not limited to: input output interfaces (I/O) 908, storage interfaces 909, network interfaces 910, and/or the like. Optionally, cryptographic processor interfaces 926 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 910 may accept, communicate, and/or connect to a communications network 913. Through a communications network 913, the TLL controller is accessible through remote clients 933*b* (e.g., computers with web browsers) by users 933*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed TLL), architectures may similarly be employed to pool, load balance, and/or otherwise increase the communicative bandwidth required by the TLL controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the TLL controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the TLL controller may be embodied as an embedded, dedicated, and/or monitor-less (i.e., headless) device, wherein access may be provided over a network interface connection.

Cryptographic units such as, but not limited to, microcontrollers, processors 926, interfaces 926, and/or devices 928 may be attached, and/or communicate with the TLL controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 6100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the TLL controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 929 may include ROM 906, RAM 905, and a storage device 914. A storage device 914 may employ any number of computer storage devices/systems. Storage devices may include a drum; a (fixed and/or removable) magnetic disk drive; a magneto-optical drive; an optical drive (i.e., Blueray, CD ROM/RAM/RecoTLLble (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 916 (user interface); Web browser component(s) 918 (Web browser); database(s) 919; mail server component(s) 921; mail client component(s) 922; cryptographic server component(s) 920 (cryptographic server); the TLL component(s) 935; and/or the like (i.e., collectively a component collection). These components may be stored and accessed from the storage devices and/or from storage devices accessible through an interface bus. Although non-conventional program components such as those in the component collection may be stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the TLL controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the TLL controller to communicate with other entities through a communications network 913. Various communication protocols may be used by the TLL controller as a subcarrier transport mechanism for interaction, such as, but not limited to: multicast, TCP/IP, UDP, unicast, and/or the like.

Information Server

An information server component 916 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TLL controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TLL database 919, operating systems, other program components, user interfaces, Web browsers, and/or the like.

Access to the TLL database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TLL. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TLL as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/6/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 916 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the TLL equipped nodes. The combined application may be nugatory on systems employing standard Web browsers.

Mail Server

A mail server component 921 is a stored program component that is executed by a CPU 903. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the TLL Access to the TLL mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 926, cryptographic processor device 928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1966 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the TLL may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the TLL component to engage in secure transactions if so desired. The cryptographic component facilitates the secure accessing of resources on the TLL and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The TLL Database

The TLL database component 919 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the TLL database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the TLL database is implemented as a data-structure, the use of the TLL database 919 may be integrated into another component such as the TLL component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-k. A Users table 919a may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a TLL. A Data Source table 919b may include fields such as, but not limited to: source_ID, source_name, source_server_IP, device_domain, source_url, source_security_protocol, source_ftp, device_securekey, and/or the like. A POP table 919c may include fields such as, but not limited to: pop_id, pop_address, pop_server_ip, pop_exchange, pop_transmition_time, pop_history, and/or the like. An Index table 919d may include fields such as, but not limited to: index_id, index_name, index_attribute, index_value, index_rate, index_volume, index_timestamp, index_source, and/or the like. An attribute table 919e may include fields such as, but not limited to: geo-location, industry, size, daily_volume, strategy_type, max_size, min_size, trade_order_id and/or the like. A Bids table 919f may include fields such as, but not limited to: bid_id, bid_time, bid_attribute, bid_ad_type, bid_ad_name, bid_ad_description, bid_rate, bid_result, and/or the like. An Order table 919g may include fields such as, but not limited to: order_id, order_name, order_participant, order_user_id, order_volume, order_bid_id, order_status, order_pop_id, order_latency, order_routing, and/or the like. A Financial Instrument table 919h may include fields such as, but not limited to: instrument_id, instrument_type, instrument_Reg, instrument_structure, instrument_asset_id, instrument_index, instrument_index_value, instrument_exchange_id, and/or the like. An Analytics table 919i may include fields such as, but not limited to: Analytics_id, analytics_time, analytics_ad_id, analytics_source_id, analytics_plot, analytics_prejection, analytics_map, analytics ULtemplate, analytics_buy_point, and/or the like. A News table 919j may include fields such as, but not limited to: news_id, news_time, news_date, news_title, news_source, news_geo, news_zipcode, news_type, news_industry, news_target_audience, news_impact_audience, news_description, news_tag, and/or the like. A market data table 919k includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the TLL database may interact with other database systems. For example, employing a distributed database system, queries and data access by search TLL component may treat the combination of the TLL database, an integrated data security layer database as a single database entity.

In one embodiment, user programs may contain various user interface primitives, which may serve to update the TLL. Also, various accounts may require custom database tables depending upon the environments and the types of clients the TLL may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-k. The TLL may be configured to keep track of various settings, inputs, and parameters via database controllers.

The TLL database may communicate to and/or with other components in a component collection, including itself, and/or facilities of the like. Most frequently, the TLL database communicates with the TLL component, other program components, and/or the like. The database may contain, retain, and provide information regarding other nodes and data.

The TLLs

The TLL component 935 is a stored program component that is executed by a CPU. In one embodiment, the TLL component incorporates any and/or all combinations of the aspects of the TLL discussed in the previous figures. As such, the TLL affects accessing, obtaining and the provision of information, services, transactions, and/or the like across various communications networks. The features and embodiments of the TLL discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the TLL's features and facilities, and in many cases reduce the costs, energy consumption/requirements, and extend the life of TLL's underlying infrastructure; this has the added benefit of making the TLL more reliable. Similarly, many of the features and mechanisms are designed to be easier for users to use and access, thereby broadening the audience that may enjoy/employ and exploit the feature sets of the TLL; such ease of use also helps to increase the reliability of the TLL. In addition, the feature sets include heightened security as noted via the Cryptographic components 920, 926, 928 and throughout, making access to the features and data more reliable and secure.

The TLL component may transform a bidding/trading request (e.g., see 203 in FIG. 2) via TLL components, such as but not limited to market data collection 942, POP allocation 943, POP routing 944, order execution 945 and/or the like into transaction record (e.g., see 218 in FIG. 2) and/or the like and use of the TLL, with reduced latency and/or order book arbitrage.

The TLL component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the TLL server employs a cryptographic server to encrypt and decrypt communications. The TLL component may communicate to and/or with other components in a component collection, including itself, and/or facilities of the like. Most frequently, the TLL component communicates with the TLL database, operating systems, other program components, and/or the like. The TLL may contain, communicate, generate, obtain, and/or provide program component, system, user, and/or data communications, requests, and/or responses.

Distributed TLLs

The structure and/or operation of any of the TLL node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the TLL controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the TLL controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
index.jsp?topic=/com.ibm.IBMDI. doc/
referenceguid295.htm and other parser implementations:

http:pubiib.boulder.ibm.com/infocenter/tivihelp/v2r1/index.jsp?topic=/com.ib.IBMDI. doc/
referenceguide259.htm all of which are hereby expressly incorporated by reference herein.

In order to address various issues and advance the art, the entirety of this application for TRANSMISSION LATENCY LEVELING APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a TLL individual and/or enterprise user, database configuration and/or relational model, data type, data transmission and/or network framework, syntax structure, and/or the like, various embodiments of the TLL may be implemented that allow a great deal of flexibility and customization. For example, aspects of the TLL may be adapted for data network bandwidth management. While various embodiments and discussions of the TLL have been directed to Electronic Trading Platform, however, it is to be understood that the embodiments described herein may be readily configured and/or customized for a wide variety of other auction-based systems, applications and/or implementations.

What is claimed is:

1. A computer system for TCP-to-multicast (T2M) communications in a computer network having a front-end server and a plurality of back-end servers services, the computer system being part of a marketplace for matching and executing orders to buy and sell securities, the computer system comprising:
   at least one computer processor configured as part of the front-end server in the computer network;
   at least one first communication interface operably coupled to the computer processor and configured for one-to-one communications with each of one or more client computers based on Transmission Control Protocol (TCP); and
   at least one second communication interface operably coupled to the computer processor and the first communication interface and configured for one-to-many communications with the plurality of back-end servers, whereby a message corresponding to at least a portion of marketplace order information received from one of the one or more client computers via the at least one first communication interface is transmitted simultaneously, via the at least one second communication interface, to each of the plurality of back-end servers based on User Datagram Protocol (UDP), wherein the plurality of back-end servers are distinct from the front-end server in the computer system and provide processing or storage resources for processing or storing the message, wherein at least two back-end servers are configured to receive the message simultaneously,
   wherein a number of the plurality of back-end servers is scaled independently from the front-end server based on a quantity of information received via the at least one first communication interface, and
   wherein at least one of the back-end servers of the plurality of back-end servers is configured to perform an intermediate processing function different than another one of the plurality of back-end servers using the message, wherein the at least one back-end server is configured to receive the message and to:
      modify the message to label the message with a message identifier, wherein the message identifier comprises a unique sequence or serial number associated with the message that serves as an order identifier to update a market state based on an order associated with the message;
      transmit, via a multicast protocol, the modified message in parallel to a plurality of downstream client computers, the downstream client computers including at least one of the one or more client computers; and
      display, using the order identifier, the modified message to indicate the market state across the computer system at a given time.

2. The computer system according to claim 1, wherein the at least one first communication interface is configured for maintaining a TCP connection with each of the one or more client computers via a single communication port.

3. The computer system according to claim 1, wherein the plurality of back-end servers provide multiple back-end services.

4. The computer system according to claim 1, wherein at least one of the plurality of back-end servers is configured to transmit the message to at least one further back-end server.

5. The computer system according to claim 1, wherein the one-to-many communications with the plurality of back-end servers are shielded from the one or more client computers.

6. The computer system according to claim 5, wherein the message is streamed to each back-end server of the plurality of back-end servers independently and in parallel for real-time quality analysis.

7. The computer system according to claim 1, wherein the at least one back-end server is configured to perform at least one logical processing function using the modified message.

8. A method for a computer system to implement TCP-to-multicast (T2M) communications in a computer network having a front-end server and a plurality of back-end servers, the computer system being part of a marketplace for matching and executing orders to buy and sell securities, the method comprising:
   receiving, by the front-end server, marketplace order information from each of one or more client computers via one-to-one communications based on Transmission Control Protocol (TCP); and
   transmitting, via one-to-many communications, a message corresponding to at least a portion of said marketplace order information simultaneously to each of the plurality of back-end servers based on User Datagram Protocol (UDP), wherein the back-end servers are distinct from the front-end server and provide processing or storage resources for processing or storing the message, wherein at least two back-end servers are configured to receive the message simultaneously, wherein a number of the plurality of back-end servers is scaled independently from the front-end server based on a quantity of information received by the front-end server, and wherein at least one of the back-end servers of the plurality of back-end servers is configured to perform an intermediate processing function different than another one of the plurality of back-end servers using the message, wherein the at least one back-end server is configured to receive the message and to:

modify the message to label the message with a message identifier, wherein the message identifier comprises a unique sequence or serial number associated with the message that serves as an order identifier to update a market state based on an order associated with the message;

transmit, via a multicast protocol, the modified message in parallel to a plurality of downstream client computers, the downstream client computers including at least one of the one or more client computers; and display, using the order identifier, the modified message to indicate the market state across the computer system at a given time.

9. The method according to claim 8, further comprising: maintaining a TCP connection with each of the one or more client computers via a single communication port.

10. The method according to claim 8, wherein the plurality of back-end servers provide multiple back-end services.

11. The method according to claim 8, further comprising: transmitting, by at least one of the plurality of back-end servers, the message to at least one further back-end server.

12. The method according to claim 8, wherein the one-to-many communications with the plurality of back-end servers are shielded from the one or more client computers.

13. The method according to claim 12, further comprising:

streaming the message to each back-end server of the plurality of back-end server independently and in parallel for real-time quality analysis.

14. The method according to claim 8, wherein the at least one back-end server is configured to perform at least one logical processing function using the modified message.

15. A non-transitory computer-readable medium having code for causing at least one computer processor to implement TCP-to-multicast (T2M) communications in a computer network having a front-end server and a plurality of back-end servers, the at least one computer processor being part of a marketplace for matching and executing orders to buy and sell securities, the computer-readable medium comprising:

code for receiving, by the front-end server, marketplace order information from each of one or more client computers via one-to-one communications based on Transmission Control Protocol (TCP); and code for transmitting, via one-to-many communications, a message corresponding to at least a portion of said marketplace order information simultaneously to each of the plurality of back-end servers based on User Datagram Protocol (UDP), wherein the plurality of back-end servers are distinct from the front-end server and provide processing or storage resources for processing or storing the message, wherein at least two back-end servers are configured to receive the message simultaneously, wherein a number of the plurality of back-end servers is scaled independently from the front-end server based on a quantity of information received by the front-end server, and wherein at least one of the back-end servers of the plurality of back-end servers is configured to perform an intermediate processing function different than another one of the plurality of back-end servers using the message, wherein the at least one back-end server is configured to receive the message and to:

modify the message to label the message with a message identifier, wherein the message identifier comprises a unique sequence or serial number associated with the message that serves as an order identifier to update a market state based on an order associated with the message;

transmit, via a multicast protocol, the modified message in parallel to a plurality of downstream client computers, the downstream client computers including at least one of the one or more client computers; and display, using the order identifier, the modified message to indicate the market state across the computer system at a given time.

16. The computer-readable medium according to claim 15, further comprising:

code for maintaining a TCP connection with each of the one or more client computers via a single communication port.

17. The computer-readable medium according to claim 15, wherein the plurality of back-end servers provide multiple back-end services.

18. The computer-readable medium according to claim 15, wherein at least one of the plurality of back-end servers is configured to transmit the message to at least one further back-end server.

19. The computer-readable medium according to claim 15, wherein the one-to-many communications with the plurality of back-end servers are shielded from the one or more client computers.

20. The computer-readable medium according to claim 15, wherein the message is streamed to each back-end server of the plurality of back-end servers independently and in parallel for real-time quality analysis.

21. The computer-readable medium according to claim 15, wherein the at least one back-end server is configured to perform at least one logical processing function using the modified message.

* * * * *